/ United States Patent / Fayfield et al.

(10) Patent No.: US 12,184,750 B2
(45) Date of Patent: Dec. 31, 2024

(54) DISTRIBUTED COMMUNICATION AND CONTROL SYSTEM USING CONCURRENT MULTI-CHANNEL MASTER UNIT PRELIMINARY CLASS

(71) Applicant: Banner Engineering Corp., Minneapolis, MN (US)

(72) Inventors: Robert T. Fayfield, Orono, MN (US); Sabrina Kawalec, Minneapolis, MN (US); Mark Rue, Plymouth, MN (US); Paul Fabian, Minneapolis, MN (US); Arthur Padget, Minneapolis, MN (US); Charles Dolezalek, Blaine, MN (US); Luke Karnas, Minneapolis, MN (US); William Theunissen, Minneapolis, MN (US); David Franke, Minneapolis, MN (US); Robert Schlosser, Minneapolis, MN (US); Kent Dahlen, Minneapolis, MN (US); Matthew Schmitt, Minneapolis, MN (US); Nick Olsen, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 0 days.

(21) Appl. No.: 18/703,106

(22) PCT Filed: Oct. 21, 2022

(86) PCT No.: PCT/US2022/078548
§ 371 (c)(1),
(2) Date: Apr. 19, 2024

(87) PCT Pub. No.: WO2023/070107
PCT Pub. Date: Apr. 27, 2023

(65) Prior Publication Data
US 2024/0340361 A1    Oct. 10, 2024

Related U.S. Application Data

(63) Continuation-in-part of application No. 35/516,910, filed on Apr. 21, 2022 (U.S. filing date under 35 (Continued)

(51) Int. Cl.
H04L 69/18 (2022.01)
H04L 67/00 (2022.01)
H04L 69/08 (2022.01)

(52) U.S. Cl.
CPC .............. *H04L 69/18* (2013.01); *H04L 67/34* (2013.01); *H04L 69/08* (2013.01)

(58) Field of Classification Search
CPC .......... H04L 69/18; H04L 67/34; H04L 69/08
See application file for complete search history.

(56) References Cited

U.S. PATENT DOCUMENTS 7,380,025 B1 * 5/2008 Riggins ............... H04L 41/0853
                                                          710/10
8,182,139 B2   5/2012 Fiennes et al.
(Continued)

FOREIGN PATENT DOCUMENTS

CN    111065946 A    4/2020
CN    213239243 U    5/2021
(Continued)

OTHER PUBLICATIONS

Agrowtek, Agrowtek HX8 GrowNET 8-Port Hub, accessed Oct. 5, 2021, https://hydrobuilder.com/grow-room-environment/atmosphere-controllers/environment-controller-parts-accessories/agrowtek-hx8-grownet-8-port-hub.html?msclkid=0d9331d683121498859f508a419e3a2d.
(Continued)

*Primary Examiner* — Michael Won
(74) *Attorney, Agent, or Firm* — Thompson Patent Law Offices PC

(57) ABSTRACT

Apparatus and associated methods relate to a stackable distributed communication and control hub (DCCH) con-
(Continued)

figured to provide a wide viewing angle for instantly inspecting multiple connections when multiple DCCHs are stacked. In an illustrative example, a DCCH may include multiple connection ports distributed on one or more edge surfaces. An offset bracket, for example, may couple two DCCHs, each at a coupling surface of the corresponding DCCH. Upon coupling, the DCCHs are held at substantially parallel planes. For example, a first DCCH is offset from a second DCCH in two directions. In a first direction, respective planes are offset along a vertical axis by a predetermined first offset. In a second direction, the DCCHs are offset by a predetermined second offset, orthogonal to the first direction. Various embodiments may advantageously allow visual status of the connection ports visible in at least one viewing angle along the vertical axis.

50 Claims, 51 Drawing Sheets

Related U.S. Application Data

U.S.C. 384), and having an international filing date of Apr. 21, 2022, now Pat. No. Des. 1,030,453, and a continuation-in-part of application No. 35/516,907, filed on Apr. 21, 2022 (U.S. filing date under 35 U.S.C. 384), and having an international filing date of Apr. 21, 2022.

(60) Provisional application No. 63/270,938, filed on Oct. 22, 2021.

(56) References Cited

U.S. PATENT DOCUMENTS

| | | | |
|---|---|---|---|
| 8,391,300 | B1 | 3/2013 | Dropps et al. |
| 10,128,612 | B1 | 11/2018 | Casto |
| 10,333,229 | B2 | 6/2019 | Schadeck et al. |
| 10,502,920 | B2 | 12/2019 | Coenegracht et al. |
| 2011/0292206 | A1* | 12/2011 | Newton ............ H04L 61/5014 348/143 |
| 2011/0299413 | A1* | 12/2011 | Chatwani ............ H04L 49/65 370/254 |
| 2013/0148511 | A1* | 6/2013 | Banga ............... H04L 41/082 370/250 |
| 2013/0148654 | A1* | 6/2013 | Sayani ............... H04L 49/356 370/389 |
| 2014/0355651 | A1 | 12/2014 | Hong et al. |
| 2016/0091682 | A1 | 3/2016 | Wakileh et al. |
| 2017/0031704 | A1* | 2/2017 | Sudhakaran ......... G06F 16/128 |
| 2019/0079486 | A1 | 3/2019 | Ott et al. |
| 2020/0057223 | A1 | 2/2020 | Dannoux et al. |
| 2021/0218233 | A1 | 7/2021 | Leon et al. |

FOREIGN PATENT DOCUMENTS

| | | |
|---|---|---|
| EP | 2863196 A1 | 4/2015 |
| EP | 3279626 A1 | 2/2018 |
| WO | 2023070107 A2 | 4/2023 |
| WO | 2023070107 A3 | 4/2023 |

OTHER PUBLICATIONS

Agrowtek, Agrowtek LX2 ModLINK for RS-485 Modbus RTU, accessed Oct. 5, 2021, https://hydrobuilder.com/grow-room-environment/atmosphere-controllers/environment-controller-parts-accessories/agrowtek-lx2-modlink-for-rs-485-modbus-rtu.html.

Airgate, AirGate-Modbus—Wireless Modbus Gateway, accessed Oct. 5, 2021, https://www.iothrifty.com/products/airgate-modbus-wireless-modbus-gateway.

Applied Measurement, Overmolded Thermistor Probe, accessed May 22, 2022, https://appliedmeasurement.com.au/product/overmolded-thermistor-probe/.

Automation Systems Interconnect, ASI XCAPIP03 Universal Programmable Signal Converter/Signal Isolator with 19 Inputs, 7 Outputs, accessed May 22, 2022, https://www.amazon.com/XCAPIP03-Universal-Programmable-Converter-Isolator/dp/B011NHUI6E.

Babel, Babel Buster MX-1-GE Modbus Transparent Pass-Through Gateway, WayBackMachine, Dec. 4, 2023, https://web.archive.org/web/20211019175125/https://buy.csimn.com/product.asp?itemich205.

Balluff, IO-Link interface, accessed Apr. 15, 2022, www.balluff.com.

Banner, Comtrol Compatability Report, Comtrol IO-Link Master, May 9, 2016, 34 pages.

Banner, In-line converters by Banner translate Modbus info into IO-Link data | Frasers, accessed Oct. 5, 2021, https://www.frasersdirectory.com/redwire/in-line-converters-by-banner-translate-modbus-info-into-io-link-data/.

Bihl+Wiedemann, IO-Link with Bihl+Wiedemann: Easy, Flexible & Cost-efficient, accessed Oct. 5, 2021, https://www.bihl-wiedemann.de/US/applications/io-link.html.

Chapter II Demand filed in related International Application No. PCT/US2022/078548, Aug. 29, 2023, 56 pages.

Comtrol, IO-Link Technology Enables Industry 4.0 and IIoT Solutions, Informational Flyer, Mar. 2019, 4 pages.

Comtrol, MultiLinkTM—Simultaneously Provides IO-Link Device Access to Multiple Controllers, accessed Oct. 5, 2021, https://comtrol.com/io-link-master-gateways/io-link-competency-center/multilink-simultaneously-provides-io-link-device-access-to-multiple-controllers.

IFM, Converter between analogue signals and IO-Link, accessed Oct. 5, 2021, https://media.ifm.com/CIP/mediadelivery/asset/50c99b9924a86a47abfeb3021a743f33/e2_DP2200_DP1222_e_19-20_n.pdf.

International Preliminary Report on Patentability in related International Application No. PCT/US2022/078548, dated Feb. 19, 2024, 24 pages.

International Search Report and Written Opinion of the International Searching Authority in related International Application No. PCT/US2022/078548, dated Jun. 12, 2023, 33 pages.

KK Systems, PPC-4-H2-C—Programmable Converters, accessed May 22, 2022, https://www.kksystems.com/programmable-protocol-converters/ppc-4-h2-c.html.

Mcmaster, McMaster-Carr, accessed Oct. 5, 2021, https://www.mcmaster.com/.

Omega, Layer N FAQ, accessed Oct. 5, 2021, https://www.omega.com/en-us/resources/layer-n-faq.

Omega, Layer N Long Range Wireless Universal Smart Probe Interface, accessed Oct. 5, 2021, https://www.omega.com/en-us/iiot-wireless-systems/interfaces/p/IF-006-Series.

Omega, Layer N Smart Probe to Modbus RTU RS-485 serial Interface, accessed Oct. 5, 2021, https://www.omega.com/en-us/iiot-wireless-systems/interfaces/if-002-interface/p/IF-002?gclid=666cc726335e1689eafba67a8d2c4bd5&gclsrc=3p.ds&msclkid=666cc726335e1689eafba67a8d2c4bd5&utm_source=bing&utm_medium=cpc&utm_campaign=Omega-PLA-US-BNG-IIoT-and-Wireless_Systems&utm_term=4585375811377020&utm_content=IIoT-and-.

Omega, What is Edge Computing?, accessed Oct. 5, 2021, https://www.omega.com/en-us/resources/what-edge-computing.

Remke, Mini-Link Distribution Box, 6 Outlets, with 3 pole connector feed, accessed Oct. 5, 2021, https://www.remke.com/products/3400002-mini-link-distribution-box-6-outlets-with-3-pole-connector-feed/.

Response Under Rule 66 in related International Application No. PCT/US2022/078548, dated Jan. 19, 2024, 41 pages.

Seneca, What you need to know about the "ModBUS Pass-Through" function, May 20, 2020, https://web.archive.org/web/20210923001353/https://blog.seneca.it/en/what-you-need-to-know-about-the-modbus-pass-through-function/.

(56) References Cited

OTHER PUBLICATIONS

Sosa, C, Monitoring NTC thermistor circuit with single-ended ADC, 2019, accessed Oct. 5, 2021, https://www.ti.com/lit/an/sbaa338a/sbaa338a.pdf?ts=1713512953970.
Wikipedia, Modbus, Dec. 4, 2023, https://en.wikipedia.org/w/index.php?title=Modbus%26oldid=1047843491.
Written Opinion of the International Preliminary Examining Authority in related International Application No. PCT/US2022/072154, dated Nov. 21, 2023, 24 pages.

* cited by examiner

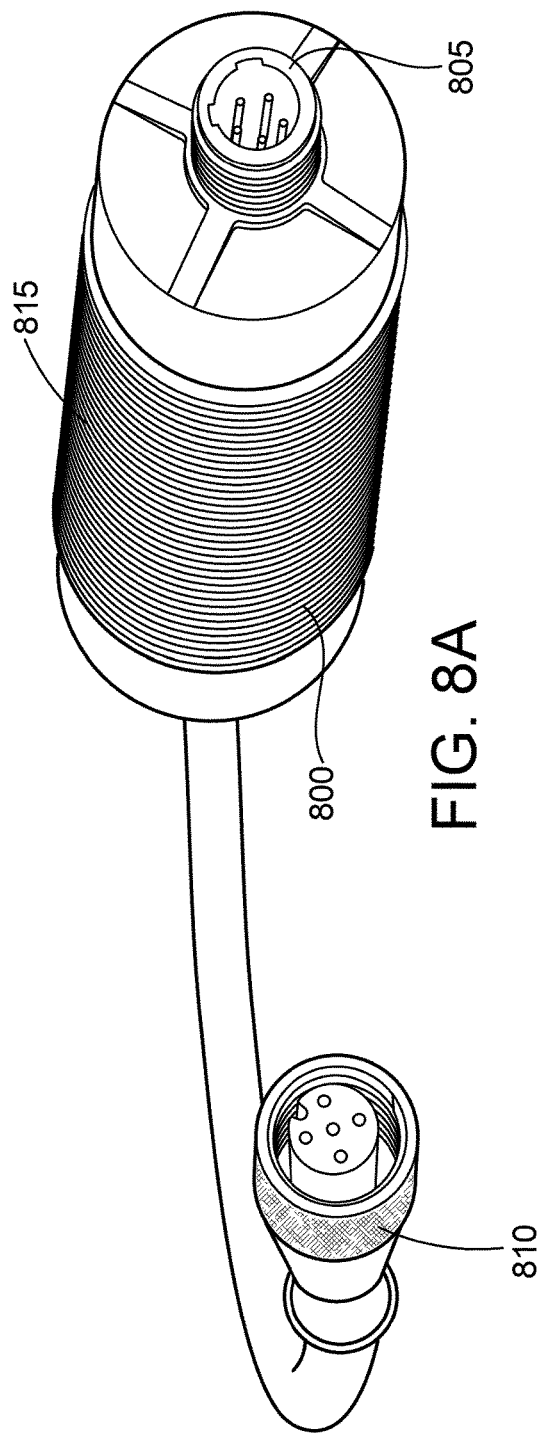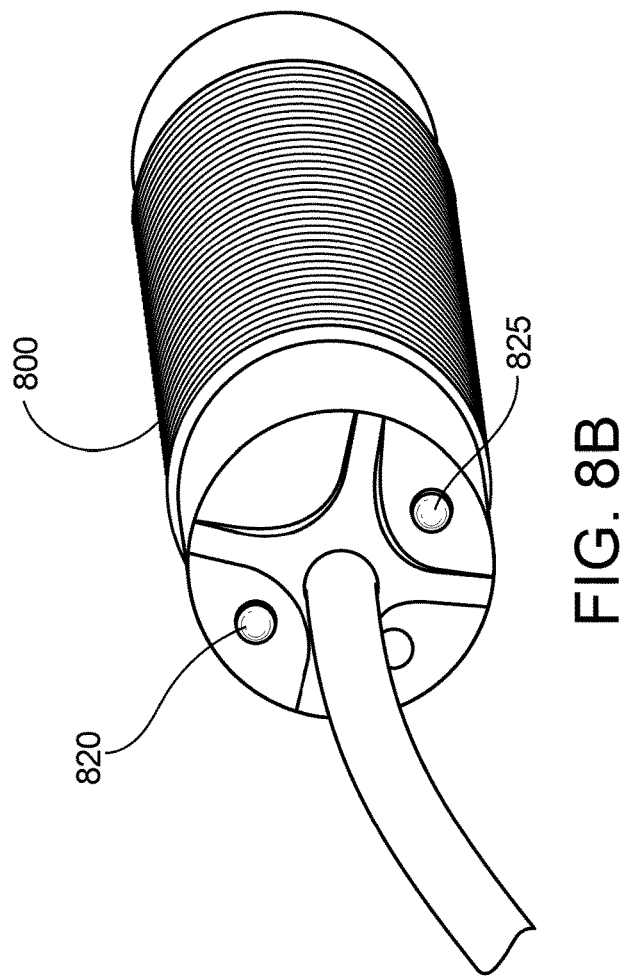

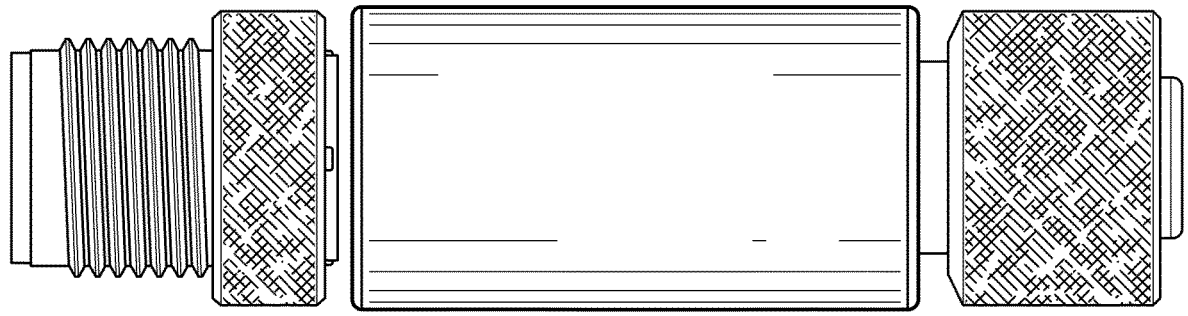
FIG. 10A
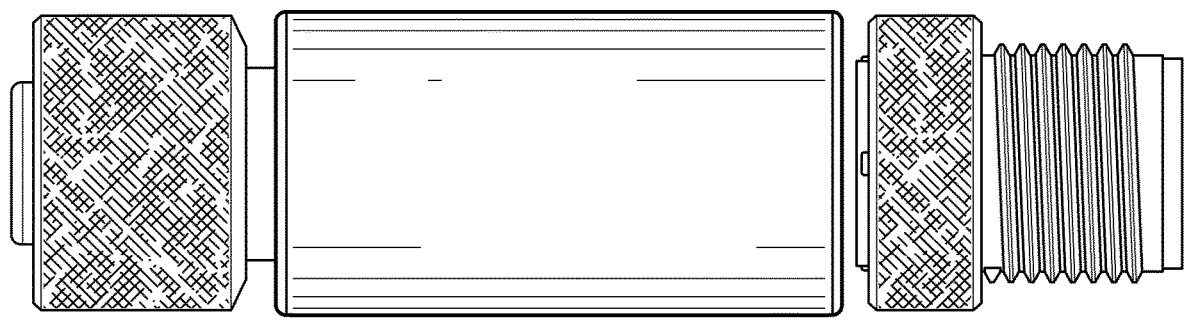
FIG. 10B
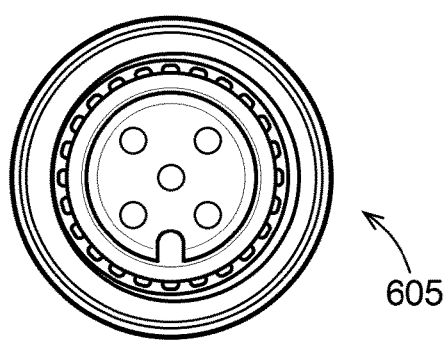 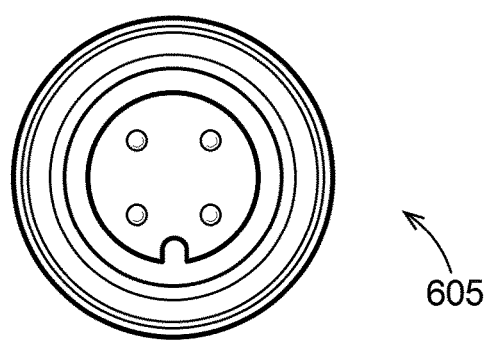
FIG. 10C   FIG. 10D

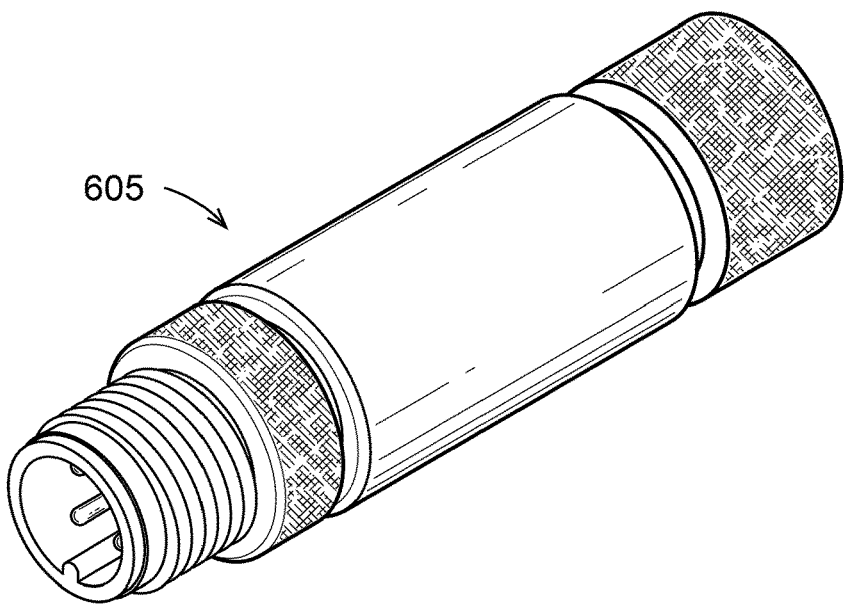
FIG. 11A
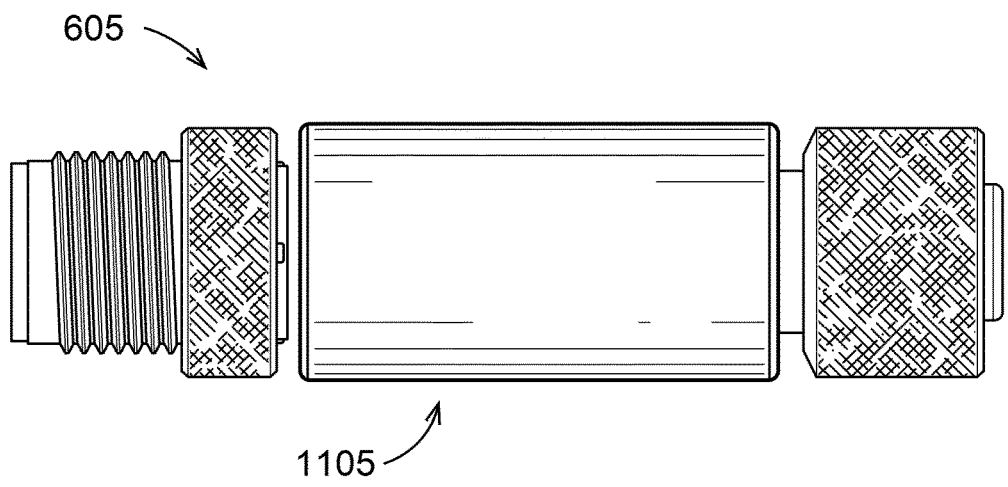
FIG. 11B
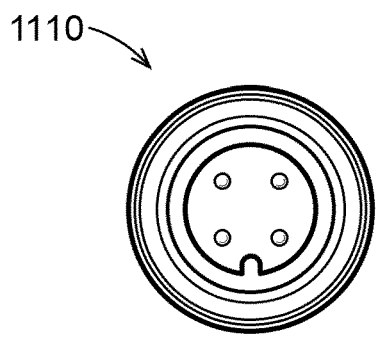 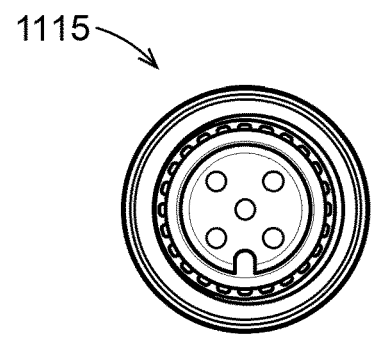
FIG. 11C   FIG. 11D

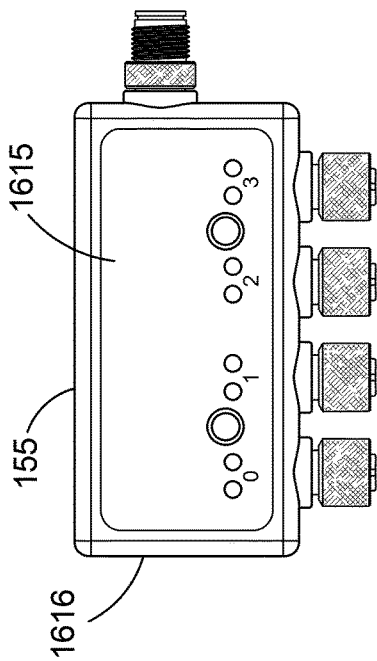
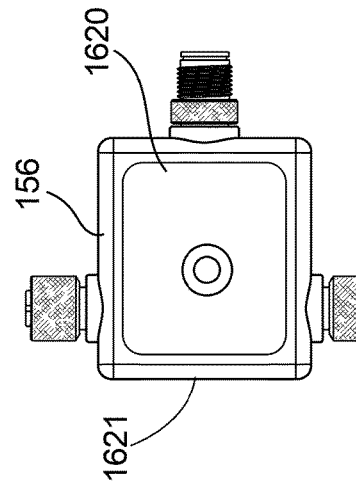
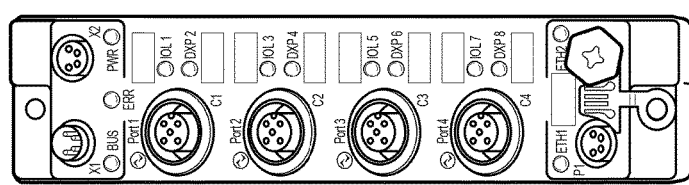
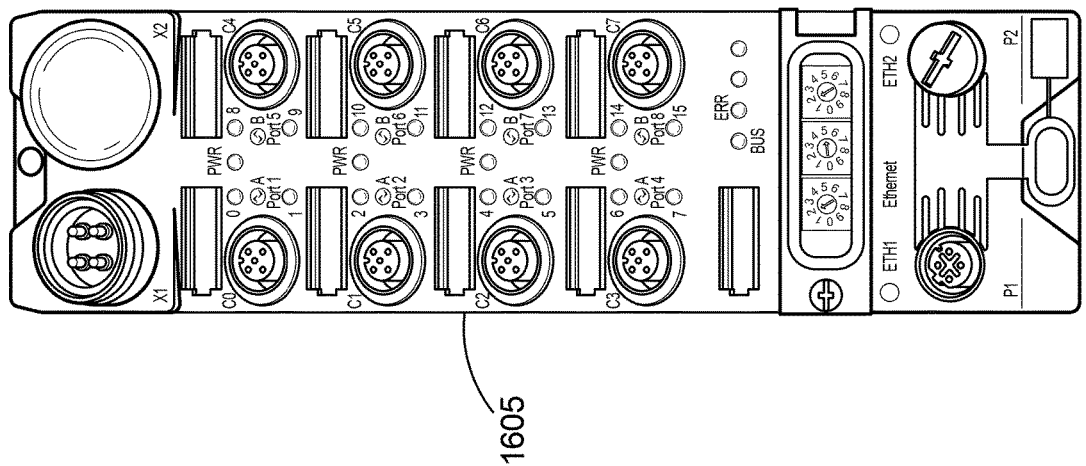

DISTRIBUTED COMMUNICATION AND CONTROL SYSTEM USING CONCURRENT MULTI-CHANNEL MASTER UNIT PRELIMINARY CLASS

CROSS-REFERENCE TO RELATED APPLICATIONS

This application is a national stage application under 35 U.S.C. 371 of and claims the benefit of PCT/US2022/078548, titled "Distributed Communication and Control System using Concurrent Multi-Channel Master Unit," filed by Robert T. Fayfield, et al. on Oct. 21, 2022, which claims the benefit of U.S. Provisional Application Ser. No. 63/270,938, titled "Distributed Communication and Control System using Concurrent Multi-Channel Master Unit," filed by Robert T. Fayfield, et al., on Oct. 22, 2021;

which application both is a Continuation-in-Part of and claims priority to WIPO Application Serial No. DM/222576, titled "COMMUNICATION HUB," filed by Banner Engineering Corp. on Apr. 21, 2022, which application also claims the benefit of U.S. Provisional Application Ser. No. 63/270,938, titled "Distributed Communication and Control System using Concurrent Multi-Channel Master Unit," filed by Robert T. Fayfield, et al., on Oct. 22, 2021, and also is a Continuation-in-Part of and claims priority to WIPO Application Serial No. DM/222908, titled "COMMUNICATION HUB OFFSET STANDOFF BRACKET," filed by Banner Engineering Corp. on Apr. 21, 2022, which application also claims the benefit of U.S. Provisional Application Ser. No. 63/270,938, titled "Distributed Communication and Control System using Concurrent Multi-Channel Master Unit," filed by Robert T. Fayfield, et al., on Oct. 22, 2021.

This application incorporates the entire contents of each of the foregoing application(s) herein by reference.

TECHNICAL FIELD

Various embodiments relate generally to networked communication.

BACKGROUND

A manufacturing facility and/or factory may include a great number of devices. These devices may include various actuators and sensors. For example, the actuators may include machinery, conveyor belts, conditioning facilities (e.g., air conditioners, humidifiers), status indicators, and other actuators useful for manufacturing a particular product in the factory. The sensors may, for example, include temperature sensor, touch sensors, tracking sensors, safety sensors, and others. These actuators and/or sensors may be installed specifically at a manufacturing floor, such as for producing a product.

For various products, production of the product may include more than one manufacturing process. Each manufacturing process may include various procedures. In some cases, each manufacturing procedure may include a discrete set of actuators and sensors. For example, each set of actuators and sensors may require a separate control system.

As an illustrative example, in garment manufacturing, a manufacturer may employ multiple automatic cutters, controlled by a cutter controller, in a cutting department, and a separate production tracking system for each production line. Generally, the cutter controller and the production tracking system may use different communication protocols. Sometimes, a factory management may then require workers to manually input data collected from various systems in the factory into a third computer system to analyze and manage overall production processes in the factory.

Other facilities may use actuators and/or sensors. For example, warehouses (e.g., distribution warehouses) may use actuators and/or sensors. Office buildings may, for example, deploy actuators and/or sensors. In some examples, retail facilities may deploy actuators and/or sensors. Military installations may, for example, use actuators and/or sensors. Residential facilities (e.g., multi-family dwellings, single-family dwellings, hotels) may use actuators and/or sensors. Hospitality facilities (e.g., restaurants, hotels, hospitals) may use actuators and/or sensors. Medical and/or research facilities may, for example, use actuators and/or sensors. Educational facilities may, for example, use actuators and/or sensors.

SUMMARY

Apparatus and associated methods relate to a stackable distributed communication and control hub (DCCH) configured to provide a wide viewing angle for instantly inspecting multiple connections when multiple DCCHs are stacked. In an illustrative example, a DCCH may include multiple connection ports distributed on one or more edge surfaces. An offset bracket, for example, may couple two DCCHs, each at a coupling surface of the corresponding DCCH. Upon coupling, the DCCHs are held at substantially parallel planes. For example, a first DCCH is offset from a second DCCH in two directions. In a first direction, respective planes are offset along a vertical axis by a predetermined first offset. In a second direction, the DCCHs are offset by a predetermined second offset, orthogonal to the first direction. Various embodiments may advantageously allow visual status of the connection ports visible in at least one viewing angle along the vertical axis.

Various embodiments may achieve one or more advantages. For example, some embodiments may include a second offset bracket releasably couples a third DCCH that is offset with respect to the first DCCH in a third direction to advantageously provide a wide view angle to the connections of all three stacked DCCHs. Some embodiments may, for example, include threaded inserts at the offset bracket such that a lead-in passage for a fastener may advantageously be provided.

Apparatus and associated methods relate to a dynamically reconfigurable DCCH configured to identify and configure each of its multiple connection ports independently and automatically. In an illustrative example, the DCCH may include a controller circuit and multiple independent reconfigurable connection ports (IRCPs). For example, the DCCH may be connected to multiple edge devices and controllers at the IRCPs. The edge devices and controllers may use different communication protocols. Upon receiving a signal at a IRCP, for example, the control circuit may retrieve a first predetermined set of rules to determine whether the IRCP is to be operated as a master port, a slave port, or a pass-through port. Based on a second set of rules, for example, the control circuit may determine a communication protocol of the IRCP. Various embodiments may advantageously avoid human intervention in setting up each of the multiple IRCPs of the DCCH.

Various embodiments may achieve one or more advantages. For example, some embodiments may automatically associate a preconfigured virtual address to a device address of the edge device to advantageously provide a reference address to the edge device. Some embodiments, for example, may include an interrupt thread to advantageously improve response time of the DCCH. Some embodiments may include, for example, a user rule engine to advantageously allow customization of the DCCH response. For example, some embodiments may include globally accessible shared registers to advantageously allow system-wide access to measurement values of edge devices.

Apparatus and associated methods relate to an in-line signal processing device (ISPD) configured to serially connect two or more devices through one or more ISPD. In an illustrative example, an ISPD may include an overmolded housing, and two connection ports. The electronic circuit may, for example, include a data register and a processing circuit configured to generate a signal based on a predetermined conversion. For example, the overmolded housing may encapsulate the electronic circuit entirely in one-piece such that a total thickness of the in-line signal processing device is less than a predetermined multiple of a maximum dimension of the connection ports. Various embodiments may advantageously provide a dust tight ISPD.

Various embodiments may achieve one or more advantages. Some embodiments may include, for example, a status indicator configured to advantageously provide a visual indicium of a status. For example, some embodiments may include a substantially transparent layer of polymeric material to advantageously allow the status visual indicium to emit through the overmolded housing. Some embodiments may, for example, include a sensing circuit to advantageously provide sensor function at the ISPD. Some embodiments may include, for example, function parameters for selecting customized responses of the ISPD.

Apparatus and associated methods relate to a self-calibrating inline thermistor. In an illustrative example, an internal sensor circuitry may be coupled to an analog-to-digital converter (ADC). For example, at each measurement cycle, the inline thermistor dynamically calibrates by reading a reference voltage, an input voltage, and a ground voltage of the ADC. Various embodiments may advantageously eliminate a need for an external reference voltage to conserve circuit size.

Various embodiments may achieve one or more advantages. Some embodiments may include, for example, an IO-link protocol to advantageously communicate with other IO-Link compatible devices. For example, some embodiments may include a Modbus protocol to advantageously couple to a control network.

The details of various embodiments are set forth in the accompanying drawings and the description below. Other features and advantages will be apparent from the description and drawings, and from the claims.

BRIEF DESCRIPTION OF THE DRAWINGS

FIG. 8A and FIG. 8B depict an exemplary in-line converter.

FIG. 9A, FIG. 9B, FIG. 10A, FIG. 10B, FIG. 10C, and FIG. 10D depict various views of an exemplary in-line converter.

FIG. 11A, FIG. 11B, FIG. 11C, FIG. 11D, and FIG. 12 depict an exemplary in-line converter and associated exemplary electrical and logical architectures of the exemplary in-line converter.

FIG. 15A, FIG. 15B, FIG. 16A, FIG. 16B, FIG. 16C, and FIG. 16D depict exemplary communication hubs.

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a distributed communication and control architecture is introduced with reference to FIGS. 1-2. Second, that introduction leads into a description with reference to FIGS. 3-5 of some exemplary embodiments of a distributed communication and control system. Third, with reference to FIGS. 6A-12C, an in-line converter is described in application to exemplary distributed communication and control systems. Fourth, with reference to FIGS. 13-14B, the discussion turns to exemplary embodiments that illustrate a compact form factor in-line thermistor. Fifth, and with reference to FIGS. 15A-28, this document describes exemplary apparatus and methods useful for implementing and using a distributed communication and control hub. Sixth, this disclosure turns to describes exemplary apparatus and methods of stackable distributed communication and control hub with reference to FIGS. 29A-42. Seventh, the document introduces various control systems and applications using the distributed communication and control architecture with reference to FIGS. 43-46. Finally, the document discusses further embodiments, exemplary applications and aspects relating to methods and apparatus of distributed communication and control systems.

Figure 1:
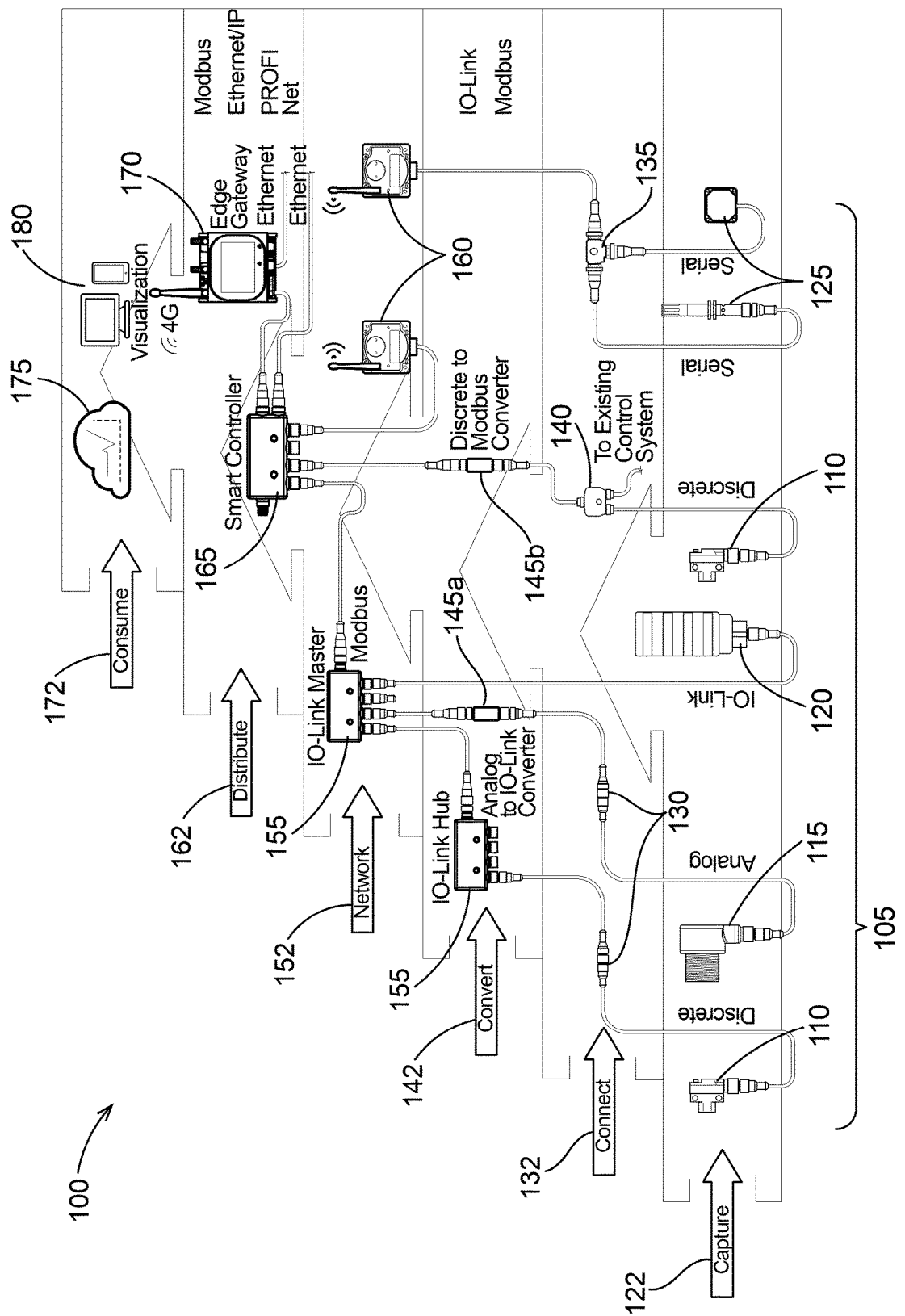
FIG. 1 depicts an exemplary distributed communication and control architecture in an illustrative use-case scenario.

FIG. 1 depicts an exemplary distributed communication and control architecture in an illustrative use-case scenario. A system 100 includes edge devices 105. The edge devices 105 may, for example, include inputs and/or outputs. In the depicted example, the edge devices 105 include discrete sensors 110. The edge devices 105 further include an analog sensor 115. The edge devices 105 include an IO-link tower light 120. The edge devices 105 further include serial Modbus devices 125 (e.g., sensors). The edge devices 105 may, for example, form a capture layer 122 of the system 100. The capture layer 122 may, for example, include data collection and/or display. For example, the capture layer 122 may include sensors. The capture layer 122 may include indicators. The capture layer 122 may, for example, include interfaces (e.g., human-machine interfaces, machine-machine interfaces).

In the depicted example, the edge devices 105 are connected in a connect layer 132. As depicted, some of the edge devices 105 are connected into the system 100 by in-line connectors 130. By way of example and not limitation, some implementations may include one or more of the in-line connectors 130 configured to perform signal/protocol conversion, as may be advantageous. Some of the edge devices 105 are connected into the system 100 by multi-branch connectors 135 (e.g., 'tee' connectors). Some of the edge devices 105 may be connected both to the system 100 and to one or more other systems and/or devices via a splitting connector 140. Connectors may, for example, include standard connectors (e.g., BNC, bayonet, 4-pin, 3-pin, M8, M12). Connectors may, for example, include proprietary connectors. In some embodiments the connectors may be integrated into the edge devices 105 and/or other members of the system 100.

Some of the edge devices 105 may, for example, transmit and/or receive signals in different forms and/or according to different protocols. As depicted as an illustrative example, some edge devices 105 may be analog (e.g., +10V, +20V, current-based), some may be discrete (e.g., binary, discrete digital values), some may use serial communication protocols, some may use various digital protocols, or some combination thereof. The system 100 may use one or more predetermined communication protocols. For example, the system 100 may be configured to receive and/or transmit data to the edge devices 105 using at least a first protocol. The first protocol may, for example, include IO-Link (e.g., currently administered in North America by "PI North America" trade association, and at least partially defined by the International Electrotechnical Commission (IEC) 61131-9). The system 100 may be configured to receive and/or transmit data between communication hubs, control devices, and/or remote systems using at least a second protocol. The second protocol may, for example, include Modbus (e.g., as at least partially defined by specifications published by the Modbus Organization, Massachusetts, USA). In various embodiments signals may be received, transmitted, interpreted, and/or generated between a first protocol, a second protocol, or other protocols.

For example, a convert layer 142 may include one or more conversion devices. As depicted, in-line converters 145 may be configured to receive signals in the first protocol and generate corresponding signals in a second protocol and/or a third communication protocol(s), vice versa, or some combinations thereof. In some embodiments, for example, the in-line converters 145 may be configured to facilitate a 2-way communication between one or more of the edge devices 105 and one or more upstream devices in native communication protocol(s) of each device. In the depicted example, a first in-line converter 145a is configured to receive analog signals (e.g., from the analog sensor 115) and generate corresponding signals according to the IO-Link protocol, and vice versa. Further in the depicted example, a second in-line converter 145b is configured to receive discrete signals (e.g., from the discrete sensors 110) and to generate corresponding signals according to the IO-Link protocol, and vice versa.

Further depicted in the convert layer 142 is a communication hub 155. The communication hub 155, in the depicted example, is configured to communicate at least in the IO-Link protocol. For example, the communication hub 155 may be configured (as depicted) as an IO-Link hub. The communication hub 155 is depicted, for example, as serving as a hub to receive and/or transmit signals from the discrete sensors 110. Further ports of the communication hub 155 connected to the discrete sensors 110 may, for example, be configured to each communicate with one or more other devices (e.g., edge devices 105, communication devices, control devices).

A network layer 152, as depicted, includes one or more communication control devices. For example, a second communication hub 155 is depicted as being coupled to the first communication hub 155, to the first in-line converter 145a, and to the IO-link tower light 120. The communication hub 155 may, for example, be configured with one or more ports as IO-Link master devices (e.g., initiating read and/or write operations). The second communication hub 155 may, for example, control communication between connected devices.

Further included in the depicted network layer 152 is a wireless communication device 160. The wireless communication device 160 may, for example, include one or more base units and/or one or more remote units. For example, a remote unit of the wireless communication device 160 is depicted as being coupled to the multi-branch connector 135, and thereby connected to the serial Modbus devices 125. The remote unit may wirelessly communicate with the base unit of the wireless communication device 160. The base unit may connect to an upstream device. Accordingly, various remote edge devices 105 may be advantageously coupled to the system 100.

A distribute layer 162, as depicted, includes a control hub 165. The control hub 165 may, for example, communicate in the second protocol. In the depicted example, the control hub 165 is configured to communicate at least in the Modbus protocol. The control hub 165, as depicted, is coupled to the communication hub 155, the base unit of the wireless communication device 160, and the second in-line converter 145b. Accordingly, the control hub 165 is coupled to at least 6 of the edge devices 105, in the depicted example. The control hub 165 may be configured to receive data from the edge devices 105. The control hub 165 may be configured to generate data based on the received data, received commands, predetermined data, predetermined instructions, or some combination thereof. The control hub 165 may, for example, be configured to transmit received and/or generated data in response to received requests, predetermined instructions, predetermined data, or some combination thereof. The control hub 165 may, for example, apply one or more predetermined rules to received data. The control hub 165 may, for example, receive instructions from one or more external control devices (e.g., programmable logic controller (PLC), remote control system, operator interface). In some embodiments, the control hub 165 may, for example, transmit data to remote devices (e.g., via an ethernet).

In the depicted example, the distribute layer 162 further includes a remote communication gateway 170. The remote communication gateway 170 may, for example, transmit and/or receive data between the control hub 165 and remote input, visualization, and/or control systems. For example, the remote communication gateway 170 may be configured to transmit data between the control hub 165 and remote visualization and/or cloud systems. In various exemplary embodiments, the remote communication gateway 170 may include, by way of example and not limitation, gateways that may be commercially referred to as "Edge Gateway" and/or "DXM Fusion Gateway," for example.

In the depicted example, a consume layer 172 includes a cloud network 175. The consume layer 172 also includes one or more visualization devices 180. The one or more visualization devices 180 may, for example, include general purpose devices (e.g., servers; personal computers; mobile computing devices such as smartphones, tablets, laptops, smart watches). The one or more visualization devices 180 may, for example, include purpose-built devices (e.g., dedicated interfaces). The one or more visualization devices 180 may, for example, include dynamically generated interfaces (e.g., via a cloud platform). For example, the one or more visualization devices 180 may be coupled to the cloud network 175. The cloud network 175 may, for example, operably couple one or more systems (e.g., physically separated, physically remote) to the system 100. In some embodiments, the cloud network 175 may provide selected data to the system 100 and/or to the one or more visualization devices 180 (e.g., to a manager, an engineer, quality assurance personnel). The cloud network 175 may, for example, apply remote processing (e.g., machine learning algorithms) to data from the system 100 (e.g., originating from the edge devices 105). In some embodiments, the cloud network 175 may provide data and/or commands back to the system 100 (e.g., via the remote communication gateway 170, to edge control and/or communication devices such as the control hub 165, to one or more centralized control systems and thence to the system 100).

Accordingly, various embodiments may advantageously enable a decentralized system of potentially disparate edge devices to be quickly and/or cost-effectively coupled into a cohesive communication and/or control system. Various embodiments may advantageously permit edge processing in a decentralized system. Such embodiments may, for example, reduce latency times. Some embodiments may, for example, reduce central processing device burden. Some embodiments may advantageously permit (substantially) real-time communication and processing between local devices (e.g., indicators, actuators, sensors) in response to received data. Some embodiments may advantageously permit selected transmittal of key data to upstream visualization, monitoring, and/or control devices. Various such embodiments may advantageously reduce communication bandwidth requirements and/or system communication costs (e.g., of cabling, labor, accidentally disconnected cables, trip hazards).

Various embodiments may, for example, advantageously enable process optimization (e.g., by providing remote access and/or monitoring to more devices, by providing edge processing for responsive processes not previously capable due to processing delays and/or communication infrastructure costs). Various embodiments may, for example, advantageously enable enhanced dashboards and/or visualization (e.g., by providing greater access to edge devices). Various embodiments may, for example, advantageously provide enhanced condition monitoring. For example, some embodiments may advantageously enable predictive maintenance (e.g., to minimize downtime) due to enhanced data collection, connectivity, and/or processing.

Various embodiments may advantageously enable rapid and/or cost-effective modernization of equipment. For example, distributed connectivity, conversion, and/or processing may advantageously unlock valuable information from legacy devices.

Various embodiments may advantageously provide easy (field) integration of a variety of devices into new and/or existing systems. For example, some embodiments may advantageously provide an easily expandable system configured to collect and/or monitor data remotely.

Figure 2:
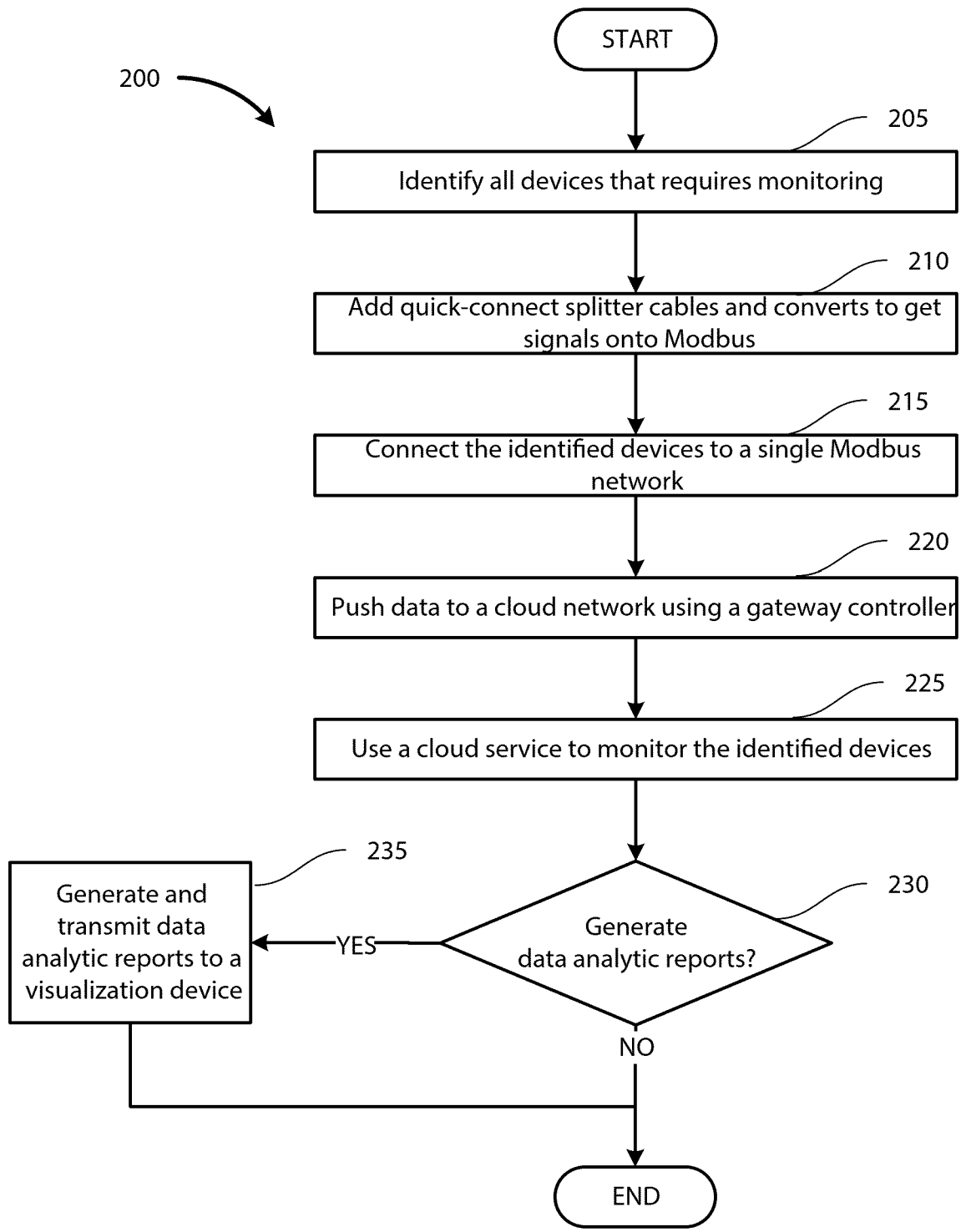
FIG. 2 is a flowchart showing an exemplary method for connecting a distributed communication and control system to multiple devices.

FIG. 2 is a flowchart showing an exemplary method 200 for connecting a distributed communication and control system to multiple devices. For example, the method 200 may be used to install the system 100 when a new factory is being set up. In some examples, the method 200 may be used to install the system 100 in an existing factory with legacy equipment. For example, the system 100 may be set up to monitor both new compatible equipment and legacy equipment that may require signal conversion. In some implementations, the method 200 may be at least partially automatically performed by one or more computing devices (e.g., running an auto-configuration software).

In this example, the method 200 begins when all devices that require monitoring are identified in step 205. Next, in step 210, quick connect splitter cables and converters are added to get signal on to Modbus. For example, the splitting connector 140 and the in-line converters 145 may be used to connect the edge devices 105 onto a Modbus network.

In step 215, the identified devices are connected to a single Modbus network. For example, the edge devices 105 may be connected to a Modbus network in the network layer 152. After the identified devices are connected to a single Modbus network, data is pushed to a cloud network using a gateway controller in step 220. For example, data collected in the capture layer 122 may be transmitted up to the distribute layer 162 and to the cloud network 175 via the remote communication gateway 170. In step 225, a cloud service is used to monitor the identified devices.

In a decision point 230, it is determined whether data analytic reports are to be generated. If data analytic reports are to be generated, in step 235, data analytic reports are generated and transmitted to a visualization device (e.g., the one or more visualization devices 180), and the method 200 ends. If data analytic reports are to be generated, the method 200 ends.

Figure 3:
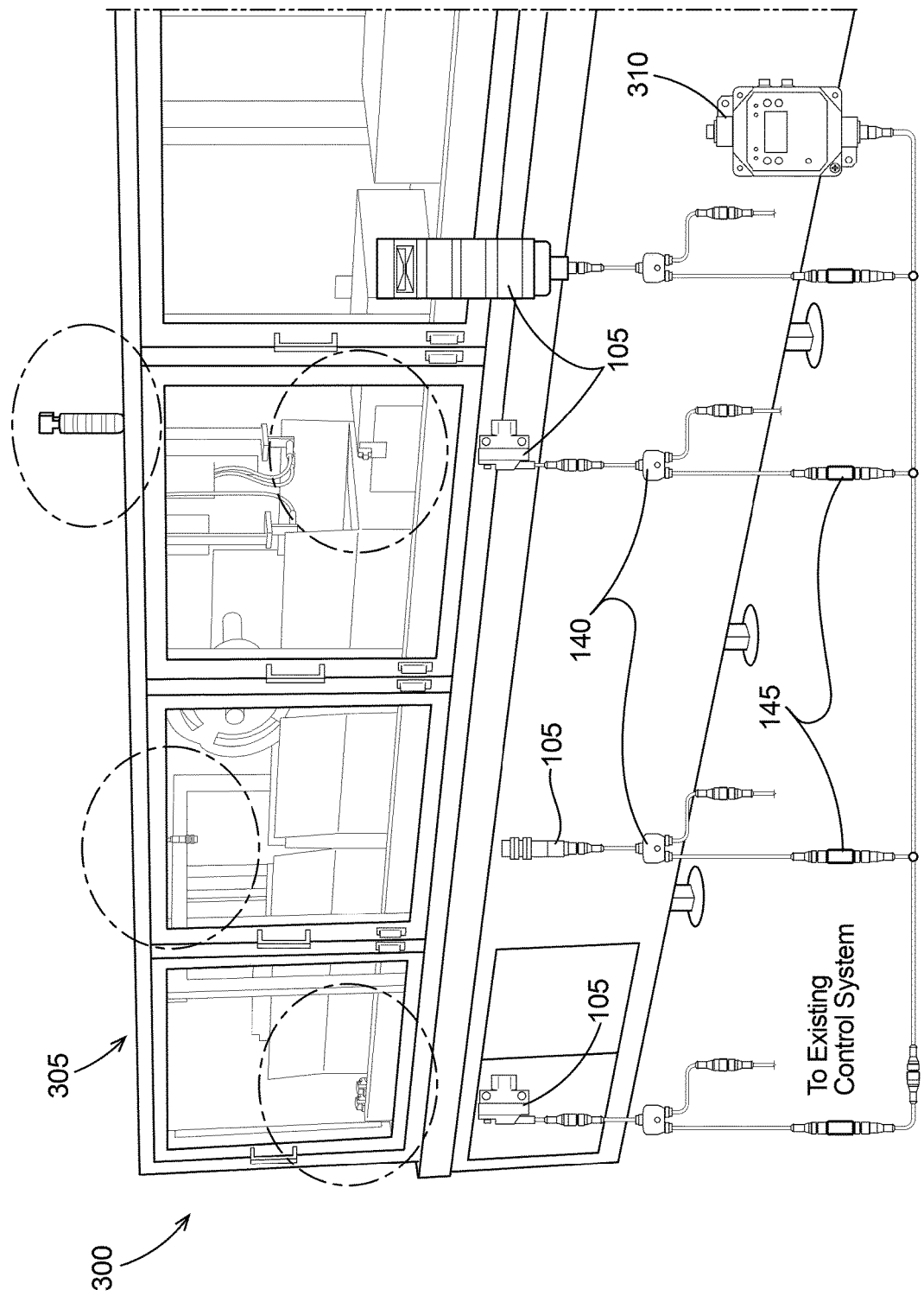
FIG. 3, FIG. 4, and FIG. 5 depict exemplary distributed communication and control systems in illustrative use-case scenarios.
Figure 4:
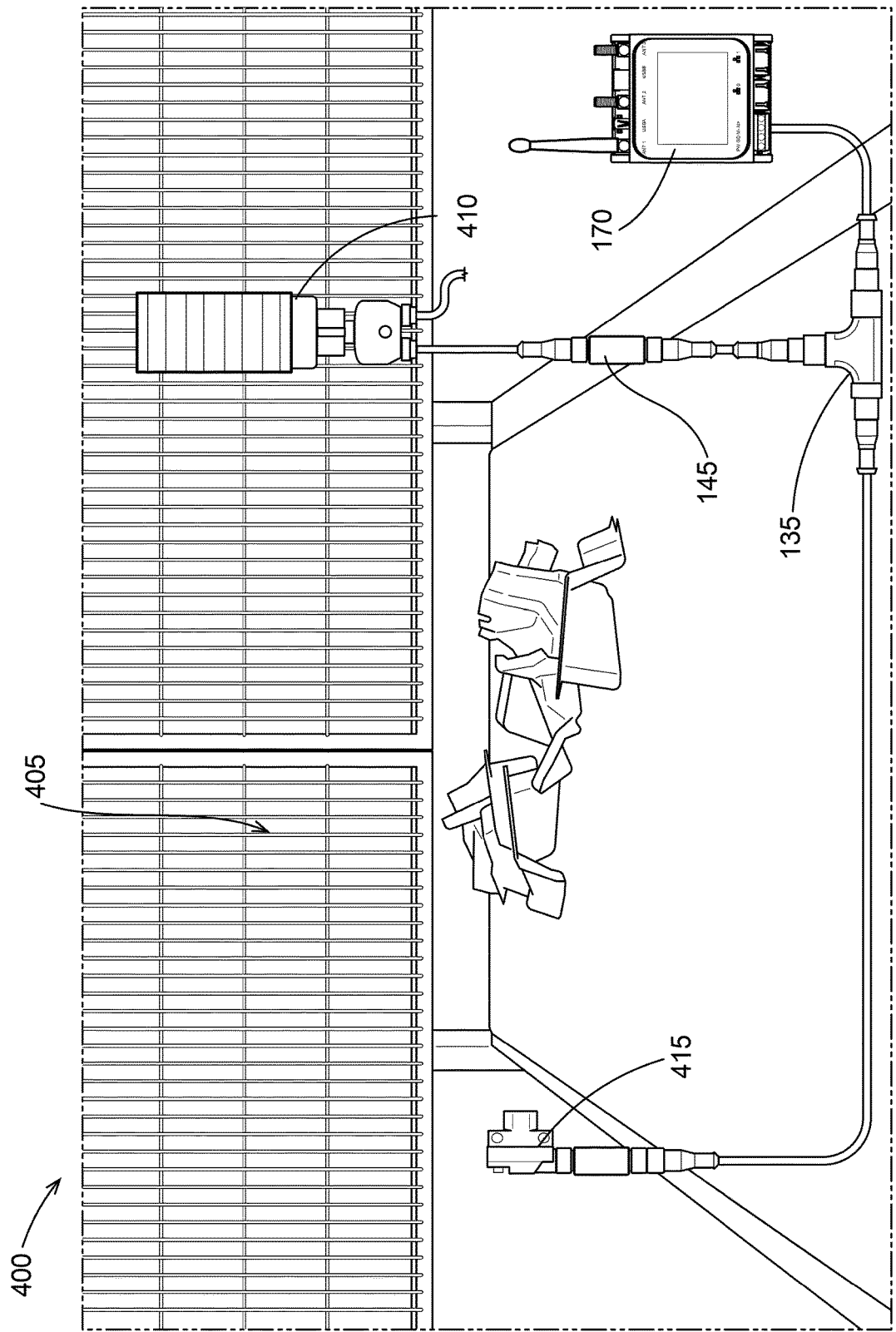
Figure 5:
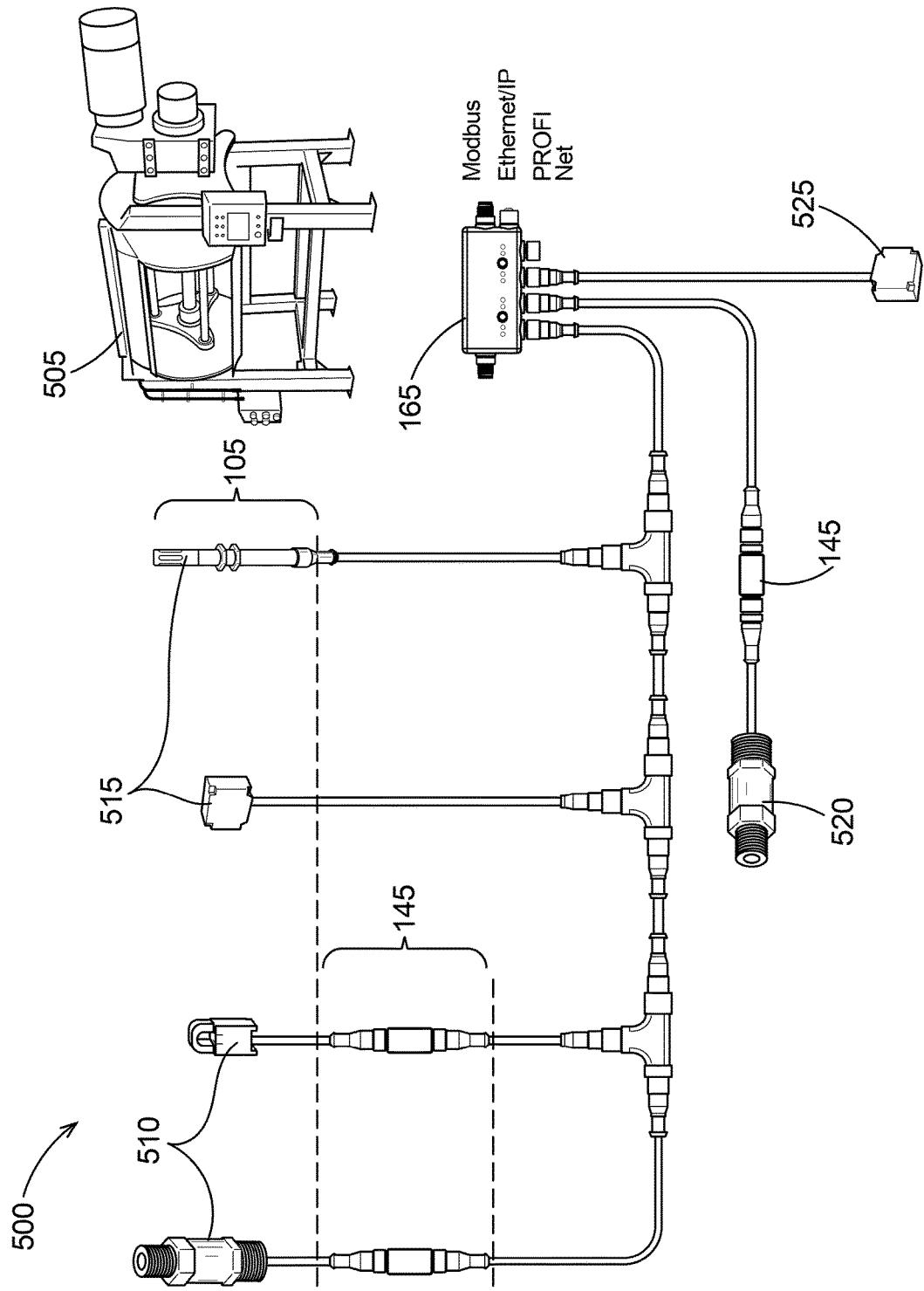

FIG. 3, FIG. 4, and FIG. 5 depict exemplary distributed communication and control systems in illustrative use-case scenarios. Various embodiments may, for example, be configured to 'overlay' a distributed communication and/or control system (DCCS) onto existing devices and/or systems. In an exemplary scenario 300, edge devices 105 are already in place and functioning according to an existing configuration. In the depicted example, the edge devices 105 are configured around a conveyor line 305. The conveyor line 305 may, for example, be monitored by optical sensors (e.g., distance measurement) and/or proximity sensors. Visual indicia may be generated by a tower light (e.g., operation state). The edge devices 105 may, for example, be connected to an existing control system (e.g., machine controller).

In the depicted example, a DCCS is operably 'overlaid' onto the existing control system using the existing edge devices 105 by coupling each edge device to a splitting connector 140. The splitting connector 140 connects to the existing control system, and to the overlaid DCCS. The overlaid DCCS may, for example, communicate at the depicted system level in a first protocol (e.g., IO-Link). The output of the splitting connector 140 is coupled to the DCCS via an in-line converter 145 (e.g., analog to IO-Link, discrete to IO-Link), as appropriate. In the depicted example, a communication hub 310 may, for example, be configured to receive signals from the edge devices 105. The communication hub 310 may, for example, generate and transmit signals to a central location (e.g., cloud network 175) in response to input from the edge devices 105. The communication hub 310 may, for example, generate and transmit signals to the edge devices 105 in response to input from the central location. Various embodiments may advantageously provide a common network operating according to one or more common protocols.

In an exemplary scenario 400, an existing stamp press system 405 (e.g., an example of the edge device 105) includes a tower light 410. The existing edge device 105 is configured in relation to the stamp press system 405 (e.g., the tower light 410 indicates an operating state of the stamp press system 405). A DCCS system is overlaid on the existing system (e.g., while maintaining communication of the existing edge devices 105 to an existing control system(s)). As depicted, the existing edge device 105 is coupled to a remote communication gateway 170 via an in-line converter 145 (e.g., converting a communication protocol of the tower light into a common communication protocol).

An additional optical sensor 415 (e.g., an example of the edge device 105) is added in relation to the stamp press system 405 via the DCCS. For example, additional information may be desired regarding the stamp press system 405 (e.g., positioning of a part, current position of operator shielding). In the depicted example, the optical sensor 415 is added and coupled to the remote communication gateway 170 via a multi-branch connector 135. The remote communication gateway 170 may, for example, process and/or transmit data to a remote system(s) (e.g., cloud network 175, one or more visualization devices 180). Overlayment of the DCCS onto the existing network may, for example, advantageously permit rapid and/or cost-effective augmentation and/or expansion (e.g., with additional edge devices 105, with edge processing) while avoiding replacement of existing control systems and/or edge devices.

In an exemplary scenario 500, a DCCS may be deployed with respect to a machine 505. For example, a control hub 165 may be provided as a communication and control hub. The control hub 165 may, for example, connect the DCCS to an upstream control and/or monitoring system (e.g., via Ethernet/IP, Modbus, Profinet®). The control hub 165 may, for example, provide configurable edge processing (e.g., in response to signals from connected edge devices 105). Various edge devices 105 may be implemented with respect to the machine 505 via the control hub 165. In the depicted example, the first protocol sensors 510 (e.g., as depicted left to right, a pressure gauge and a current transformer) may be coupled to the control hub 165 via appropriate in-line converters 145 (e.g., appropriate protocol ←→ Modbus). By way of illustrative example and not limitation, the depicted pressure gauge in some embodiments may include a ⅔ wire configuration, for example. Other implementations are possible. IO-Link and/or Modbus-enabled sensors 515 (e.g., as depicted left to right, a vibration sensor and a temperature and/or humidity sensor) may be coupled directly to the control hub 165. In the depicted example, the first protocol sensors 510 and the Modbus-enabled sensors 515 are coupled directly to a (single) first port of the control hub 165 (via tee-couplers). The first port of the control hub 165 may, for example, communicate with the connected edge devices 105 via the Modbus protocol (e.g., with the assistance of the in-line converters 145 with respect to the first protocol sensors 510).

A second port of the control hub 165 is coupled to a sensor 520 via an in-line converter 145. By way of illustrative example, and not limitation, the sensor 520 of the depicted example may be a 3 wired voltage sensor (e.g., 0-10V) or a current sensor (e.g., 4-20 mA). A third port of the control hub 165 is coupled directly to a sensor 525. Accordingly, a system of available and/or desired edge devices 105, implemented with different communication systems, may be advantageously (e.g., rapidly, cost-effectively) assembled and configured into a DCCS to instrument and/or control the machine 505. The DCCS may, for example, be connected to an external system(s) via the control hub 165. In some implementations, the control hub 165 may advantageously facilitate communication among channels with, for example, different baud rate and/or parity settings. For example, the control hub 165 may provide buffering and/or appropriate translation services to support communications among ports that, for example, electrically or optically couple to signals formatted with otherwise incompatible communication characteristics.

Figure 6A:
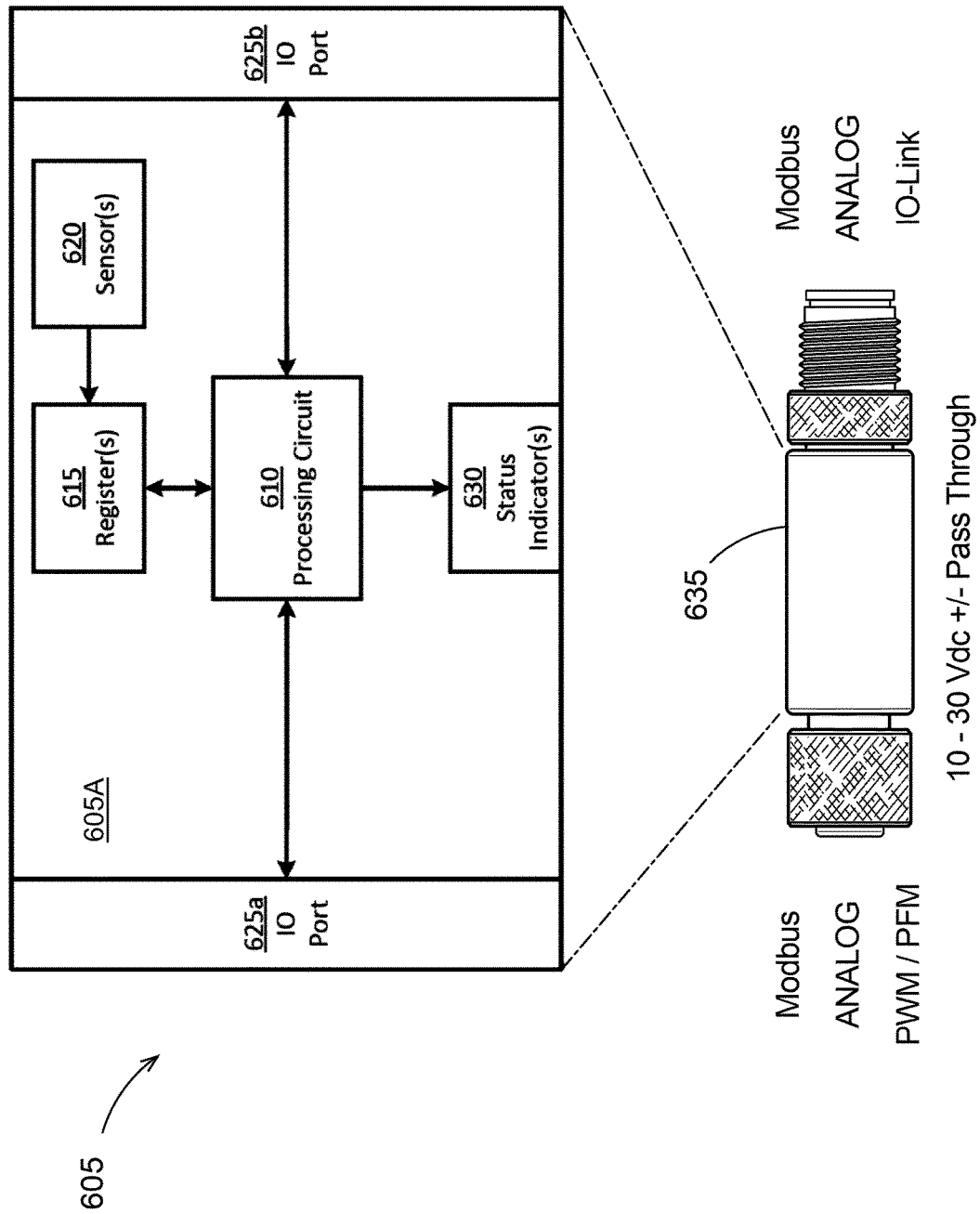
FIG. 6A depicts an exemplary in-line converter.

FIG. 6A depicts an exemplary in-line converter. An in-line converter 605 (e.g., configured such as disclosed at least with reference to the in-line converters 145) may, for example, be configured to convert between analog and IO-Link. The in-line converter 605 may, for example, be configured to convert between analog and Modbus. An in-line converter 605 may, for example, be configured to transmit analog directly to analog ('pass-through'). An in-line converter 605 may, for example, be configured to convert between PWM/PFM (pulse-width modulation and/or pulse frequency modulation) and Modbus. An in-line converter 605 may, for example, be configured to convert between PWM/PFM and analog. An in-line converter 605 may, for example, be configured to convert between PWM/PFM and IO-Link. In the depicted example, an in-line converter 605 configured for analog may be configured to process (e.g., receive, transmit) signals between 10-30 VDC.

Various embodiments may advantageously allow existing edge devices to be quickly adapted to new systems (e.g., by coupling to the new system via an appropriate in-line converter). Various embodiments may, for example, advantageously convert between industry standard protocols and/or between proprietary protocols. Various embodiments may advantageously link legacy (e.g., analog, discrete) edge devices into a 'smart' system.

In the depicted example, the in-line converter 605 is configured with M12 Male/Female Connections. Such embodiments may, for example, advantageously allow connection using common, industry standard physical connectors and/or cabling.

In some embodiments, an in-line converter 605 may be configured with a housing having, by way of example and not limitation, an external diameter of approximately 15 mm. Such embodiments may, for example, advantageously be deployed in small areas. Some embodiments may, for example, be of a similar diameter as cabling and/or existing connectors. For example, in some embodiments an in-line converter 605 may be less than and/or equal to 2× diameter of a cable and/or connector. In some embodiments an in-line converter 605 may be less than and/or equal to 1.5× diameter of a cable and/or connector. In some embodiments, an in-line converter 605 may be substantially the same (e.g., within manufacturing tolerances, such as, by way of example and not limitation, between 0.9×–1.1×) diameter as a cable and/or connector. In some embodiments an in-line converter 605 may have an effective diameter less than a cable and/or connector. Various embodiments may advantageously provide a plug-in, monitored sensor and/or connector solution in a small form factor.

In some embodiments, an in-line converter 605 may be pre-configured for one or more specific applications. In this example, the in-line converter 605 includes circuitry 605A (e.g., internal circuitry). As depicted, the circuitry 605A includes a processing circuit 610. For example, the processing circuit 610 may include a programmable logic circuit (PLC). For example, the processing circuit 610 may include an application specific integrated circuit (ASIC). For example, the processing circuit 610 may include a register 615 (e.g., data registers, an EEPROM). In some implementations, the processing circuit 610 may receive configuration signals from a smart controller (e.g., the control hub 165).

In this example, the in-line converter 605 includes a sensor 620. For example, the in-line converter 605 may be pre-configured for a specific sensing (e.g., temperature reading in ° C. and/or ° F., pressure reading in a desired pressure unit) and/or indication application. As shown, the sensor 620 may transmit sensor data in the register 615. In some embodiments an in-line converter 605 may be pre-configured for a specific combination of protocols between input-output ports 625a, 625b (e.g., Modbus ←→ IO-Link, analog ←→ IO-Link). Pre-configuration may, for example, be hardwired. Pre-configuration may, for example, be implemented via one or more configuration parameters (e.g., configuration profile stored in the register 615). Such embodiments may, for example, facilitate rapid deployment with minimal configuration of individual components. In some embodiments, a system may be, for example, planned and components pre-configured (e.g., the in-line converter(s) 605) and then rapidly physically deployed. For example, some embodiments may provide 'plug-and-play' functionality.

In some embodiments, the in-line converter 605 may be provided with one or more of the status indicators 630. The status indicators 630 may, for example, include one or more light-emitting diodes (LEDs). The status indicators 630 may, for example, be configured to generate a visual indication in response to a status of the in-line converter 605. Status and corresponding indications may, for example, be predetermined (e.g., in a configuration profile on the in-line converter 605, hardwired), determined by a remote device (e.g., the control hub 165), or some combination thereof. Status indications may, for example, facilitate rapid troubleshooting. For example, a technician may rapidly glance at each connector and determine a status. The technician may, for example, rapidly visually identify one or more connectors in a desired state (e.g., error state) according to the visual indication(s) generated by the in-line converters. The technician may then troubleshoot the particular connected device(s).

In some embodiments the status indicators 630 may, for example, be visible through a housing 635 of the in-line converter 605. For example, the body may be at least partially translucent. The status indicators 630 may, for example, be coupled (e.g., disposed on) a circuit board(s) inside a body of the in-line converter 605. When the status indicators 630 are off, for example, the status indicators 630 may not be visible through the body of the in-line converter 605 from an external view. For example, an inside of the body may not be visible. When one or more of the status indicators 630 are on, a visual indication (e.g., light, color, pattern) may be visible through the housing of the body.

In some embodiments, the housing 635 is a (at least partially rigid) structure. For example, the housing 635 may define a structure of the body of the in-line converter 605. In some embodiments, the housing 635 may be overmolded. For example, the housing 635 may enclose the in-line converter 605 entirely in one-piece. For example, the housing 635 may be overmolded to advantageously keep the in-line converter 605 dust tight (e.g., at rating IP65, IP67, IP68).

In some embodiments, as depicted, the in-line converter 605 may be configured as a substantially cylindrical shape. In some embodiments the in-line converter 605 may be configured as a rectangular prism. In some embodiments the in-line converter 605 may be configured with an irregular shape.

In some embodiments, such as depicted, with a substantially cylindrical outer surface, the in-line converter 605 may be advantageously configured in a desired orientation during deployment. For example, an absence of flats, feet, and/or attachment extensions may advantageously allow the in-line converter 605 to be treated as part of a cable. The in-line converter 605 may, by way of example and not limitation, advantageously be rotated around a transmission path of the cable to present a desired orientation (e.g., maximum visibility of one or more indications).

In some embodiments the indication(s) may be configured with a wide field of view (e.g., greater than 90 degrees, in some embodiments greater than 180 degrees). In some embodiments, the indication(s) may be configured to be substantially circumferential (e.g., substantially 360 degrees).

Figure 6B:
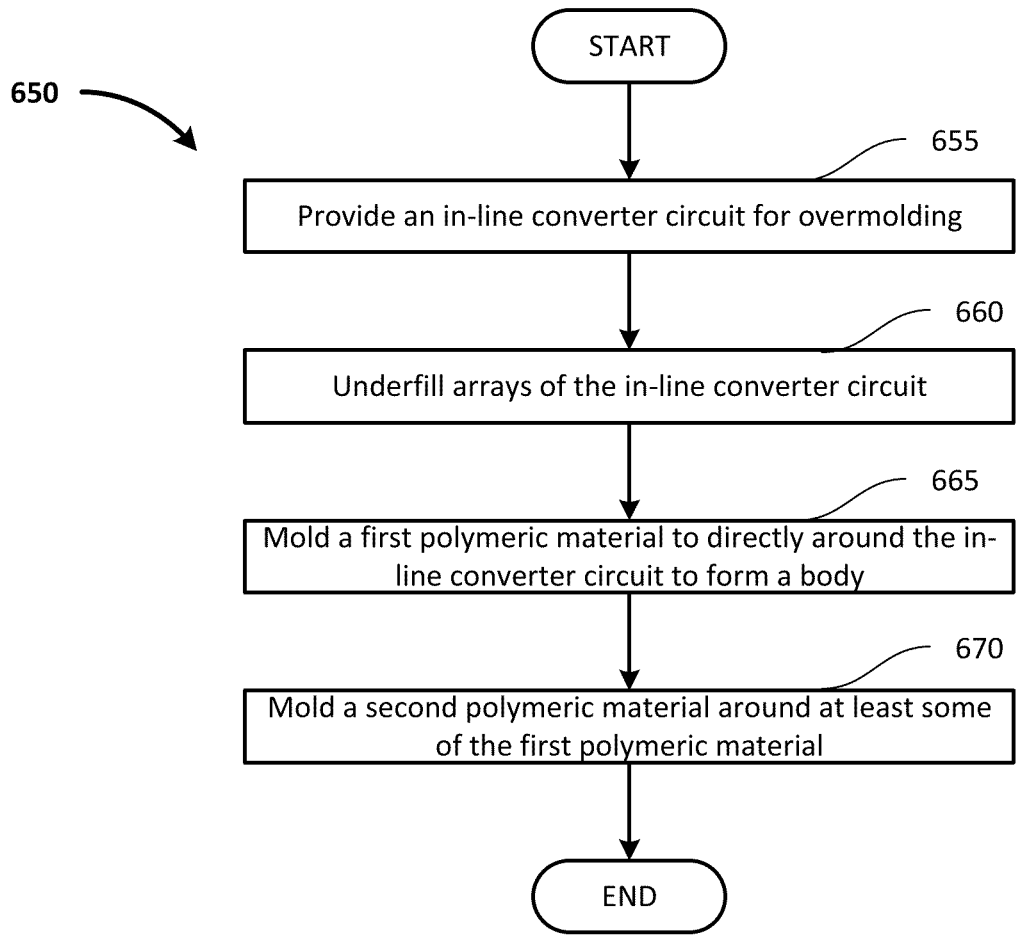
FIG. 6B depicts a flowchart of an exemplary method to create an exemplary housing for the exemplary in-line converter as described with reference to FIG. 6A.

FIG. 6B depicts a flowchart of an exemplary method 650 to create an exemplary housing for the exemplary in-line converter as described with reference to FIG. 6A. For example, a manufacturer of in-line converter 605 may use the method 650 to overmold the housing 635 to encapsulate the in-line converter 605.

In this example, the method 650 begins when an in-line converter circuit is provided for overmolding in step 655. For example, the in-line converter circuit may include the processing circuit 610, the register 615, the status indicators 630, and/or the sensor 620. In step 660, arrays of the in-line converter circuit are underfilled. For example, underfilling the in-line converter circuit may prevent the in-line converter circuit from breaking during the overmolding process. In some embodiments, the housing 635 may be at least partially defined by overmolding of material around one or more circuits and/or associated structures.

Next, a first polymeric material may be molded around the in-line converter circuit to form a body in step 665. For example, the first polymeric material may be at least partially translucent. The first polymeric material may have a first optical transparency, for example. In step 670, a second polymeric material is molded around at least some of the first polymeric material, and the method 650 ends. For example, the second polymeric material may have a second optical transparency. In some implementations, the first optical transparency may be greater than the second optical transparency. In some embodiments a thickness (e.g., radius length relative to a longitudinal axis of the in-line converter 605) of the first polymeric material may be greater than a thickness of the second polymeric material. For example, the second polymeric material may be a relatively thin coating over the first polymeric material. The second polymeric material may optically shield the contents of the body from view except when the indicator(s) are active. In some embodiments, by way of example and not limitation, the second polymeric material may be 2 mm or less in thickness. In some implementations, a total thickness of the in-line converter 605 may be less than 1.5 times of a maximum thickness of the input port 625a and the output port 625b.

Figure 6C:
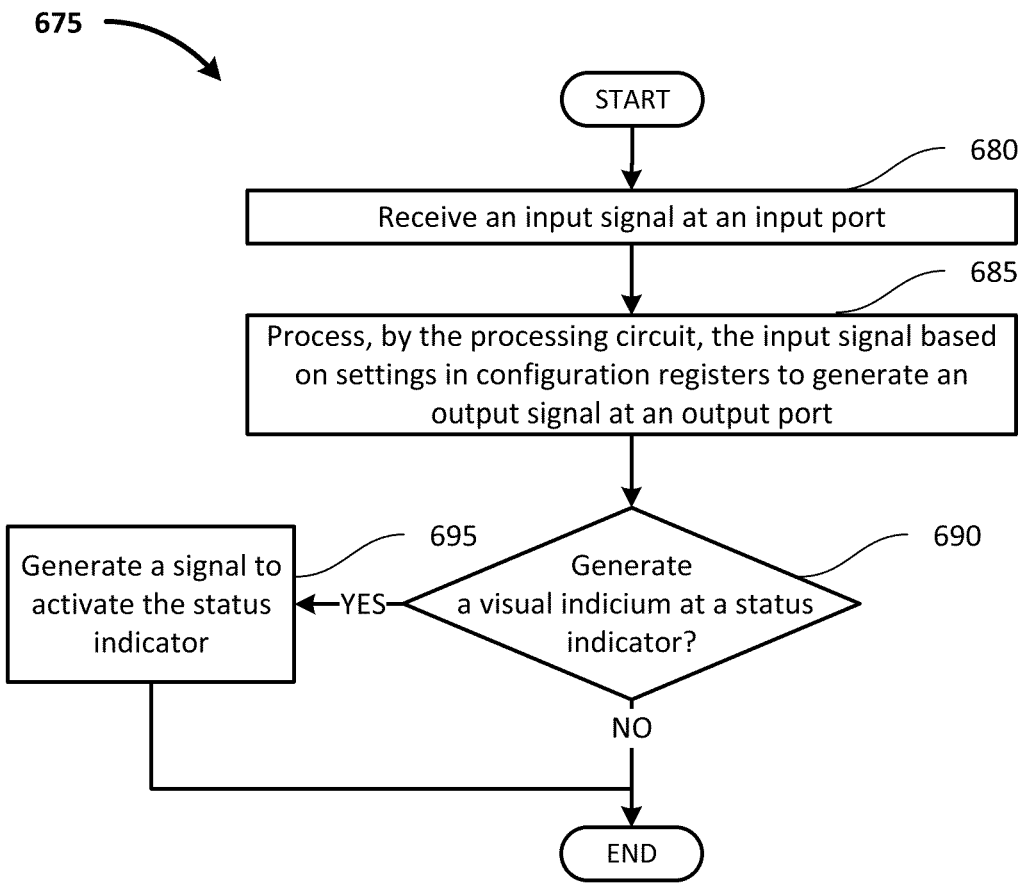
FIG. 6C depicts a flowchart of an exemplary signal processing method of an exemplary in-line converter.

FIG. 6C depicts a flowchart of an exemplary signal processing method 675 of an exemplary in-line converter. For example, the in-line converter 605 may process input signals using the method 675. In this example, the method 675 begins when an input signal is received at an input port in step 680. For example, the input signal may be transmitted from one of the edge devices 105. Next, in step 685 the input signal is processed based on settings in configuration registers to generate an output signal at an output port. For example, the processing circuit 610 may process the input signal, received at the IO port 625a, based on settings stored in the register 615 to generate an output signal at the IO port 625b. For example, the input signal may be in analog format that is non-IO-Link compatible. For example, the in-line converter 605 may generate an IO-Link signal based on the input signal.

In a decision point 690, it is determined whether a visual indicium (e.g., a good connection visual indicium) is generated at a status indicator (e.g., the status indicators 630). If a visual indicium is to be generated at a status indicator, a signal is generated to activate the status indicator in step 695, and the method 675 ends.

Figure 7:
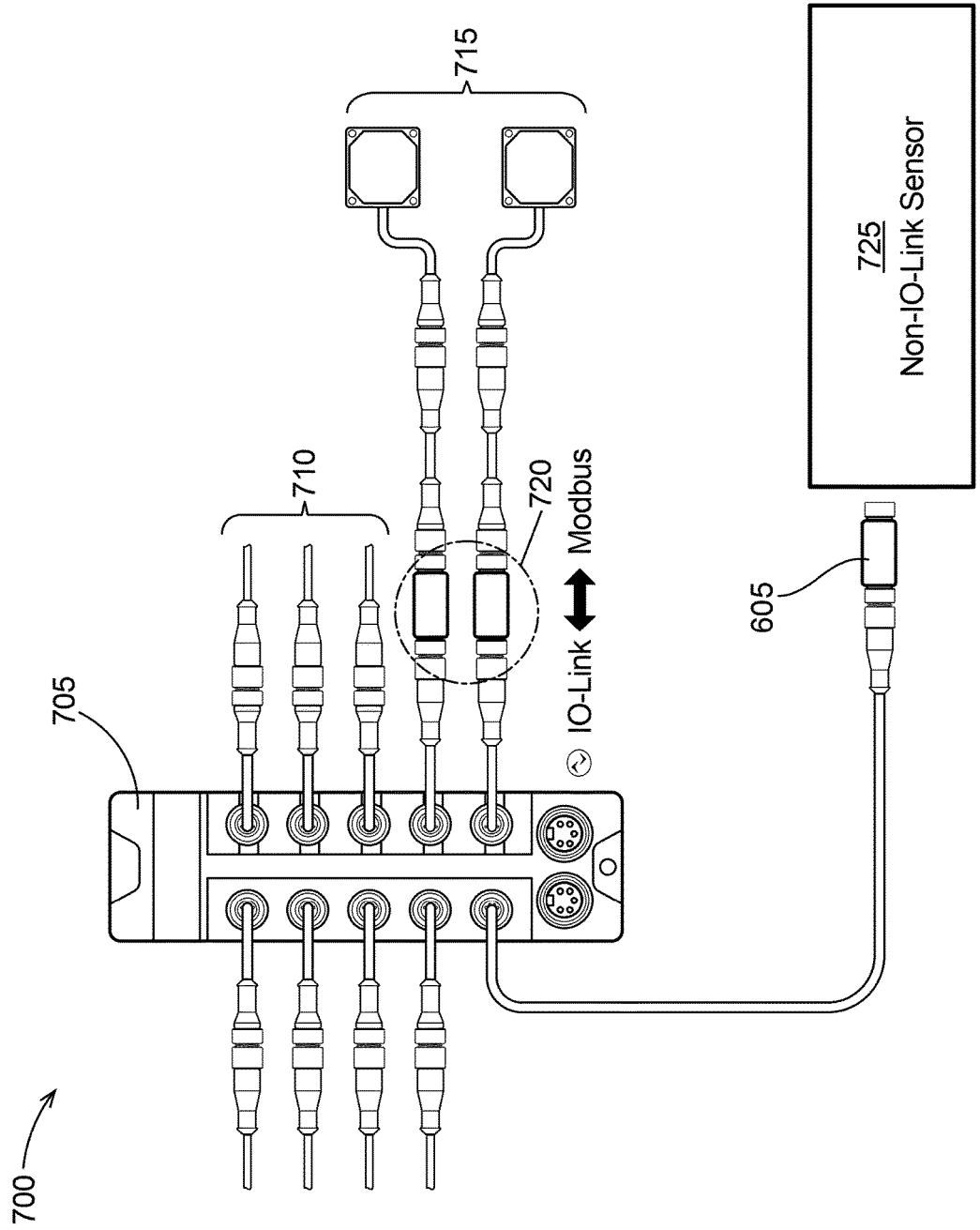
FIG. 7 depicts exemplary in-line converters in an illustrative use-case scenario.
Figure 9A:
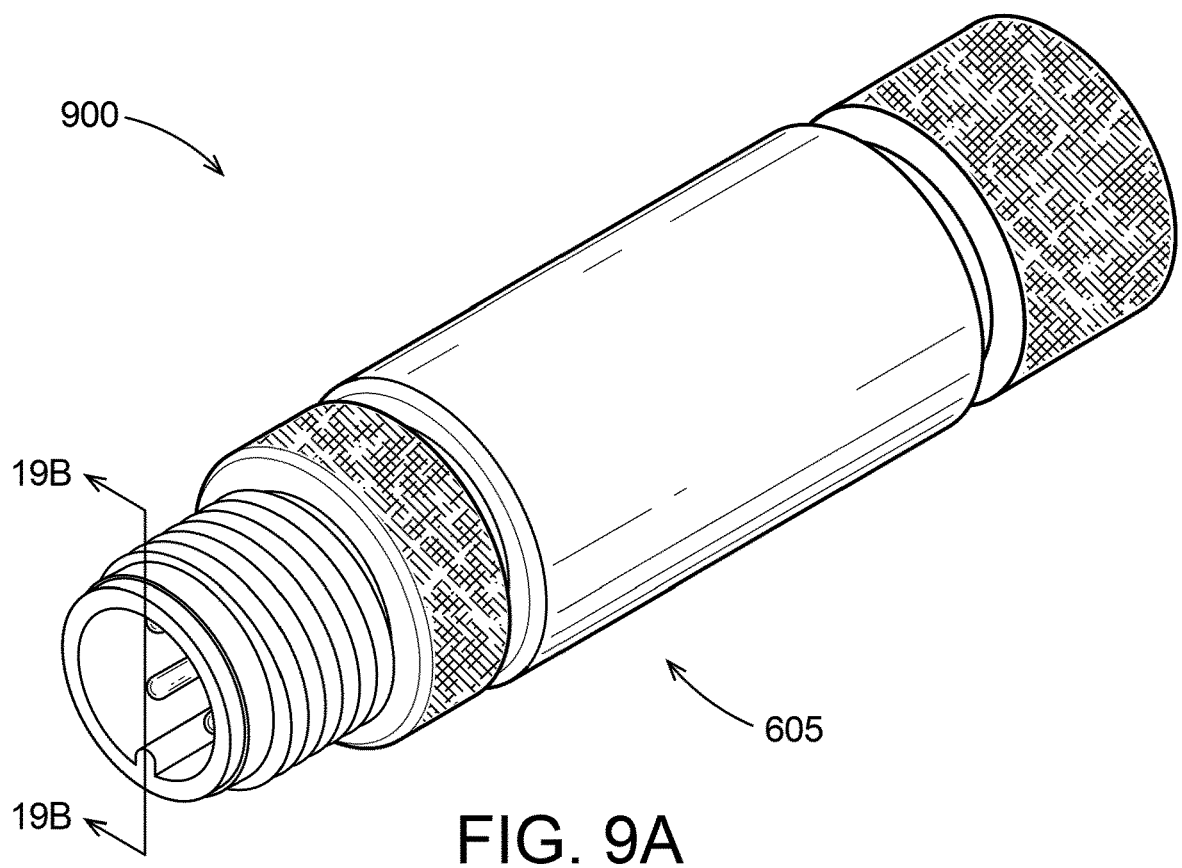
Figure 9B:
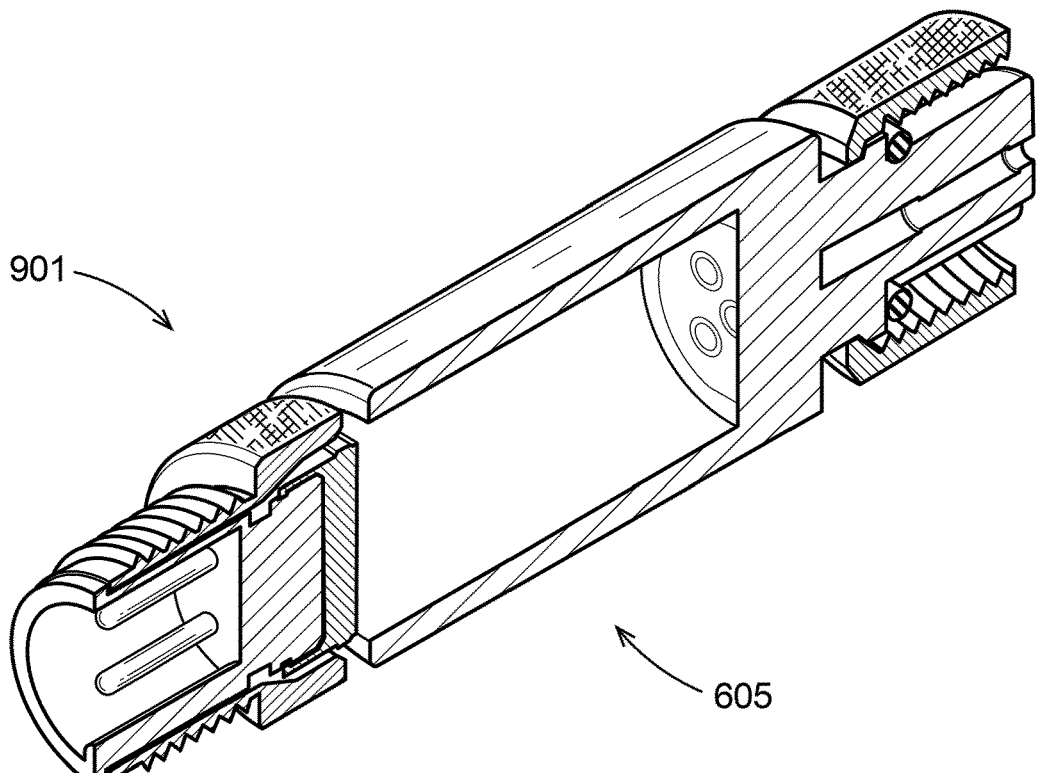
Figure 12:
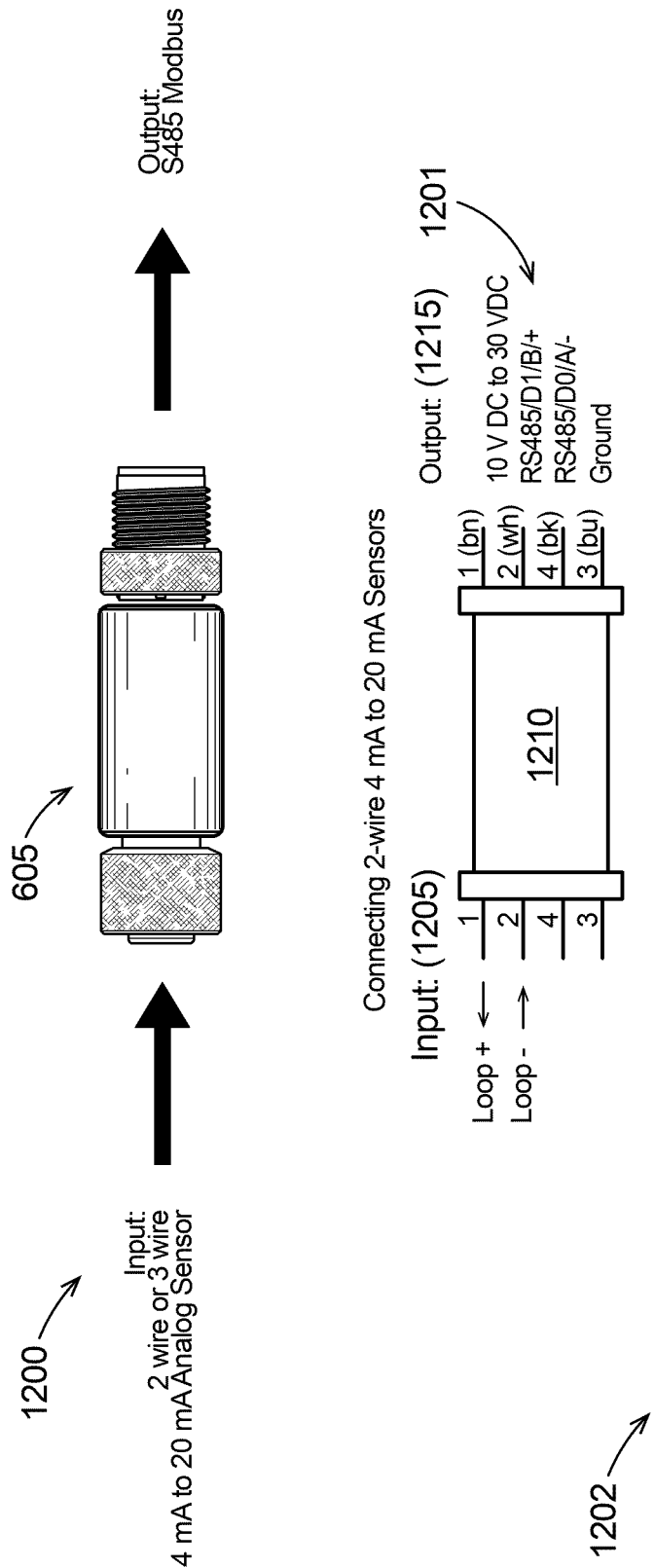

FIG. 7 depicts exemplary in-line converters in an illustrative use-case scenario. In a scenario 700, an IO-Link hub 705 may be configured to communicate with multiple devices. For example, devices may be coupled to the IO-Link hub 705 via cables 710. Modbus sensors 715 (e.g., edge devices) may be coupled to the IO-Link hub 705 but may not natively be able to communicate with the IO-Link hub 705. The modbus sensors 715 may, for example, be vibration and/or temperature sensors. The modbus sensors 715 may be coupled to the IO-Link hub 705 via in-line connectors 720 (e.g., Modbus ←→ IO-Link).

The IO-Link hub 705 may be coupled to a (e.g., newly added) non-IO-Link sensor 725 by the in-line converter 605. For example, the in-line converter 605 may be described with reference to FIG. 6A. In some implementations, the in-line converter 605 may be a 'universal' connector (e.g., automatically and/or manually configurable between multiple modes and/or communication protocols). Accordingly, various embodiments may advantageously allow leveraging of open IO-Link ports (e.g., with non-IO-link (edge) devices). For example, the non-IO-Link device may transmit non-compatible signals (e.g., Analog signal, discrete signals, PWM signals) to the communication hub 155 or the control hub 165. Various embodiments may convert the non-compatible signals to compatible signals for other components of the system 100.

As in other communication hub, converter, and/or device embodiments herein, IO-Link and/or Modbus is provided as an illustrative example. In some implementations, a device (e.g., hub 705) may employ one or more additional signal types and/or communication standards than IO-Link and/or Modbus. In some implementations, for example, a device (e.g., hub 705) may not be configured for Modbus and/or IO-Link.

FIG. 8A and FIG. 8B depict an exemplary in-line converter. An in-line converter 800 may include a first end 805 (e.g., female 5-pin coupler). The in-line converter 800 may have a second end 810 (e.g., male 5-pin coupler). The in-line converter 800 may have a body 815. As depicted, the body 815 is threaded. A threaded body may, for example, advantageously enable (releasably) coupling of the in-line converter 800 to a housing and/or mount. As depicted, the in-line converter 800 includes a first indicator 820 (e.g., green) and a second indicator 825 (e.g., yellow). The indicators 820, 825 may, for example, be configured to display a visual indication of a status (e.g., operational, error state, transmitting, receiving, connected) of the in-line converter 800 and/or a connected device(s).

FIG. 9A, FIG. 9B, FIG. 10A, FIG. 10B, FIG. 10C, and FIG. 10D depict various views of an exemplary in-line converter. The in-line converter 605 is depicted in a perspective view 900 and a cross-section view 901. The in-line converter 605 may, for example, have a circuit(s) (not shown) disposed in the body of the in-line converter 605. For example, the circuit may include the processing circuit 610. Indicators (e.g., the status indicators 630) may, for example, be disposed in the open cavity shown in the body of the in-line converter 605. In some embodiments the open cavity may be (entirely) filled by at least one first polymeric material surrounding a circuit(s). As shown in FIGS. 10A-10D, an IO port is threaded in the depicted example. A threaded IO port may, for example, advantageously enable (releasably) coupling of the in-line converter 605 to a connector or a device.

FIG. 11A, FIG. 11B, FIG. 11C, FIG. 11D, and FIG. 12 depict an exemplary in-line converter and associated exemplary electrical and logical architectures of the exemplary in-line converter. As an illustrative example, a length of the entire converter may, for example, be 57.8 mm. A length of a body 1105 of the converter may, for example, be 27.9 mm. A diameter of the converter may, for example, be 15 mm. A connector 1110 shown in FIG. 11C may, for example, be an M12×1–6 g. A connector 1115 shown in FIG. 11D may, for example, be an M12×1–6H. Various embodiments may, by way of example and not limitation, be provided with other dimensions and/or ratios of dimensions.

In an illustrative scenario 1200, the in-line converter 605 is configured to receive 2 or 3 wire input (e.g., analog). The in-line converter 605 is configured to couple to a Modbus network via RS485. The depicted in-line converter 605 is configured according to a schematic 1201. For example, input 1205 to a converter module 1210 (e.g., including some or all of circuitry 605A) may be configured to receive an input loop (e.g., V+ and V−, respectively) on pins 1 and 2. Pins 3 and 4 may, for example, provide power and/or reference voltage (as depicted). An output 1215, in the depicted example, is configured with 10-30 VDC output on pin 1, and RS485 output V+ and V−, respectively, on pins 2 and 3. Pin 3 is configured as a (voltage reference) ground.

Furthermore, in the illustrative scenario 1200, the in-line converter 605 may be configured with (digital) registers as depicted in a table 1202. The registers may, for example, be configured on one or more data stores (e.g., internal to the in-line converter 605. A first register (40001) may be configured as an analog data output. A second register (40002) may be configured as an alarm state (e.g., with a binary output). A third register (40003) may be configured as a discrete value. The discrete value may correspond to a status of a currently executing program of instructions (e.g., no error, below a predetermined threshold, above a predetermined threshold).

In various embodiments, one or more additional registers (e.g., the register 615) may, for example, be configured according to a specific application. For example, an additional register may hold a temperature value. A register may, for example, be configured to hold a pressure value. In some implementations, the register may be configured to hold at least one of a voltage value (e.g., 0-10V), a DC current value (e.g., 4-20 mA), and/or an AC current value (e.g., 0-20 or 0-150 mA).

Although some implementations may provide analog input to Modbus conversion to work with the RX90, some embodiments may provide further capabilities in accordance with embodiments of this description.

Various embodiments may advantageously provide a portfolio of connectors configured to accept various input types (e.g., analog (0-10 VDC, 4-20 mA, transformer A.C., temp/thermistor). The connectors may, for example, generate signals according to a Modbus (RS-485) protocol. Various embodiments may generate signals according to an I/O Link protocol.

Figure 13:
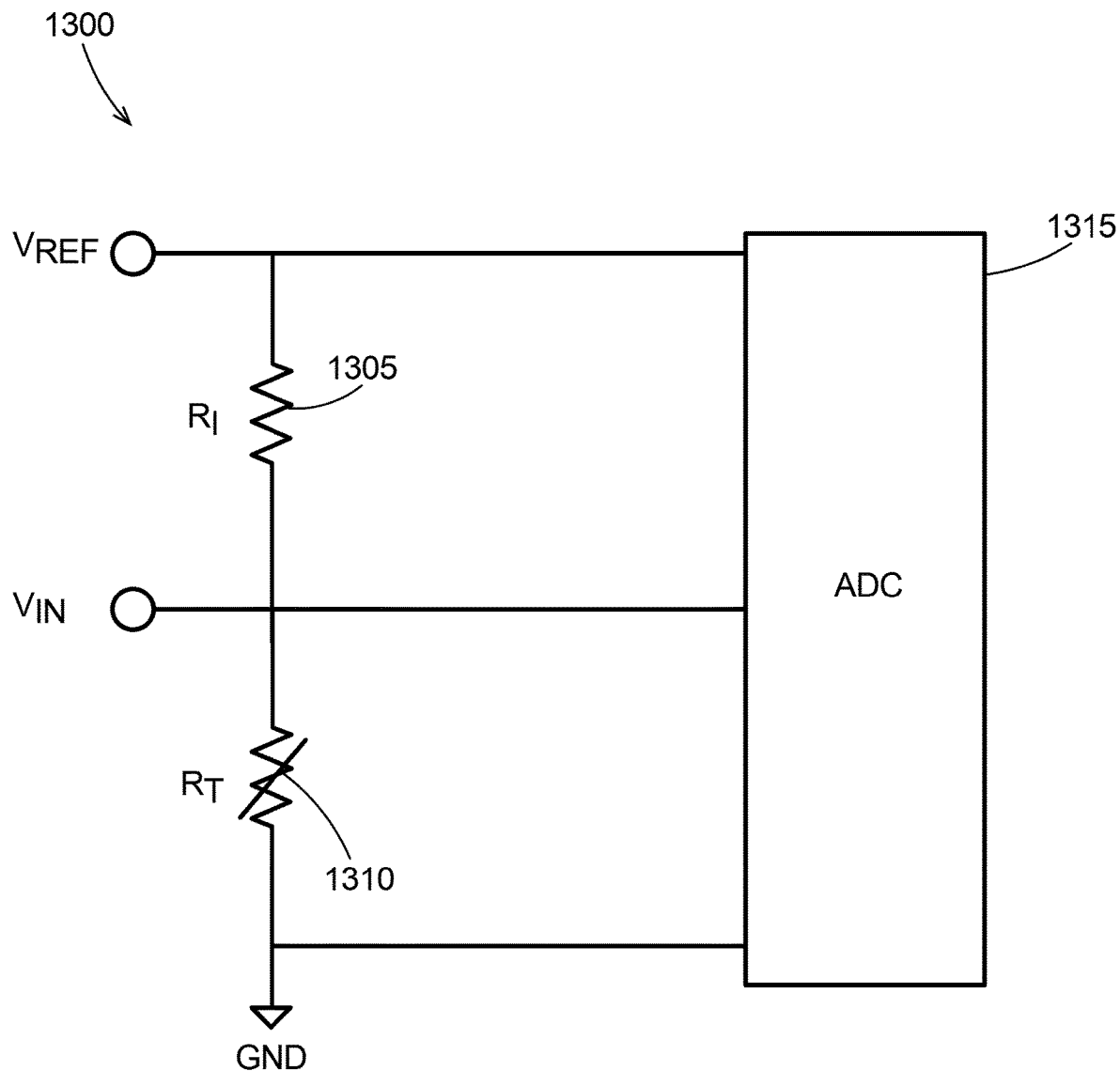
FIG. 13 depicts an exemplary sensing circuit which may be used in an exemplary in-line converter.

FIG. 13 depicts an exemplary sensing circuit which may be used in an exemplary in-line converter (e.g., the in-line converter 605). A sensing circuit 1300 includes a first resistor 1305 (having a resistance R1) coupled between a reference voltage (Vref) and an input voltage (Vin). The sensing circuit 1300 includes a second resistor 1310 (having a resistance Rt) coupled between the Vin and a reference point (labeled "GND"). As depicted, Vref, Vin, and GND are all coupled to an analog-to-digital converter (ADC 1315).

In an exemplary embodiment. Rt may, for example, be determined according to Equation 1:

$$R_t = R_1 \cdot \frac{V_{in} - GND}{V_{in} - V_{ref}}$$ Equation 1

A value of Rt may correspond to a measured (physical) metric. For example, Rt may correspond to a thermistor resistance (e.g., signal corresponding to temperature). An in-line sensor connector may be configured to apply a predetermined (e.g., pre-configured, pre-loaded) profile (e.g., calibration profile) to determine a temperature from the Rt. In some embodiments, a signal corresponding to Rt may be generated and transmitted to an upstream device and/or another edge device (e.g., for processing into a temperature value, for acting upon according to predetermined rules). In some embodiments, Vin, Vref, and/or GND in Equation 1 may, for example, correspond to ADC counts generated in response to the actual Vin, Vref, and/or GND signals.

Such embodiments may, for example, allow self-calibration of multiple ADC options. For example, a (precise) voltage divider (such as depicted in FIG. 13) may be simultaneously read for Vref and Vin with respect to GND. Accordingly, each measurement cycle may advantageously permit self-calibration of an ADC channel through reading the ADC counts of a voltage divider (Vref, Vdiv, GND) both with the same ADC settings/parameters. From these ADC counts, and knowing the voltage divider value (e.g., corresponding to R1), an offset of the ADC with those same settings can be found. Accordingly, various embodiments may advantageously permit dynamic and/or self-calibration without requiring a calibration step. Such embodiments may advantageously provide 'plug-and-play' functionality.

In some embodiments a 'universal' sensor connector may be configured such that a single device may be used to receive dual voltage and/or current, and/or to connect a thermistor, and/or current transformer.

Such embodiments may, for example, include multiple a circuit(s) with multiple switches. Each (set of) switches may be connected to different pins of a processor(s) in the connector. Switches may, for example, be configured (e.g., dynamically, in the field, pre-configured) to connect circuit(s) to the processor corresponding to a desired configuration.

As an illustrative example, a user may select a configuration associated with a thermistor input (e.g., to use the universal sensor connector to a thermistor). A corresponding resistor may, for example, be operated (e.g., held low) to create a voltage divider on one end. Voltage coming in may be read using the voltage divider. Voltage supplied to the voltage divider may be known. Accordingly, voltage 'seen' by the thermistor (e.g., corresponding to temperature) may be determined. A corresponding temperature may, for example, be generated.

As another illustrative example, a voltage reading configuration may be selected. Circuit element(s) may be operated to activate a voltage divider. For example, a resistor may be pulled high (e.g., the same resistor). Voltage on a pin (e.g., the same pin corresponding to the voltage divider) may be read.

Accordingly, various embodiments may advantageously provide multiple circuits in parallel to one or more pins. Different circuits may be selectively activated based on a configuration (e.g., defining a state of the connector). Various configurations may be adapted to (dynamically) convert voltage and/or current input to various (desired, predetermined) outputs. Accordingly, various embodiments may, for example, read voltage and convert to temperature, current, or 'pass-through' voltage values.

Various embodiments may advantageously provide configurable sensor connectors. Various embodiments may advantageously reduce a number of item codes (e.g., SKUs) that an entity (e.g., factory, warehouse) has to maintain by allowing a single item code to be used for multiple operations. Various embodiments may advantageously reduce device obsolescence. For example, if a temperature sensing configuration is no longer needed, the 'universal' connector may be advantageously reconfigured to a desired application (e.g., current sensing).

In some embodiments, a connector may be dynamically operated between multiple configurations. For example, a connector may be operated between, by way of example and not limitation, a voltage reading mode and a current transducing mode. For example, the connector may be configured (internally) to alternate between modes. In some embodiments the connector may be externally dynamically configured (e.g., by a connected controller such as control hub 165). In an illustrative example, a controller may configure the connector into a current mode. If a detected current exceeds a current sensing range of the connector, then the controller may operate the connector into a voltage mode and determine a present voltage read by the controller. Such embodiments may, for example, advantageously enhance troubleshooting, fault handling, and/or data collection.

In some embodiments a multi-pin sensor connector may, for example, simultaneously provide power and read data from a sensor simultaneously. Such embodiments may include a (sub-) circuit configured to provide power on one pin and a (sub-) circuit configured to read data on another pin. Some such embodiments may, for example, have at least 3 pins. Some embodiments may, for example, have 4 pins. Some embodiments may have more than 4 pins.

In some embodiments a sensor connector may, for example, be configured to generate signal(s) corresponding to voltage, current, and/or resistance values based on ADC values. For example, such embodiments may include a known reference circuit. An ADC slope and offset calibration may be predetermined (e.g., stored, dynamically determined during a calibration process). The known ADC slope and/or offset may be applied to ADC counts to generate a voltage, current and/or resistance output signal.

Figure 14A:
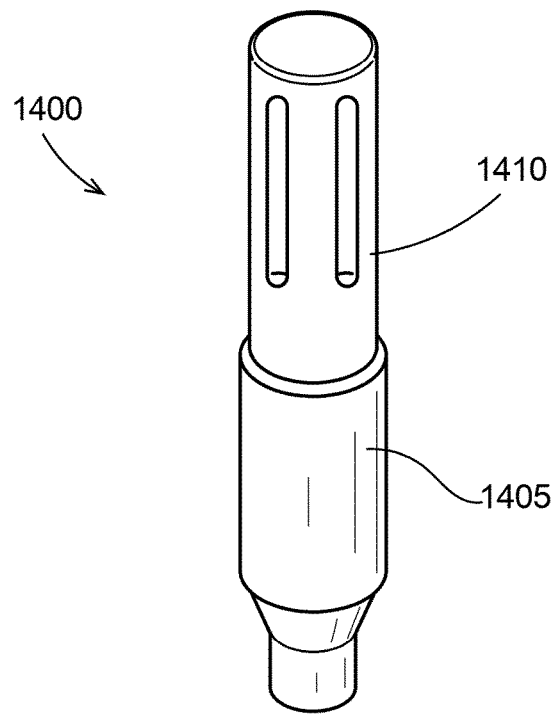
FIG. 14A and FIG. 14B depict an exemplary temperature and humidity sensor.
Figure 14B:
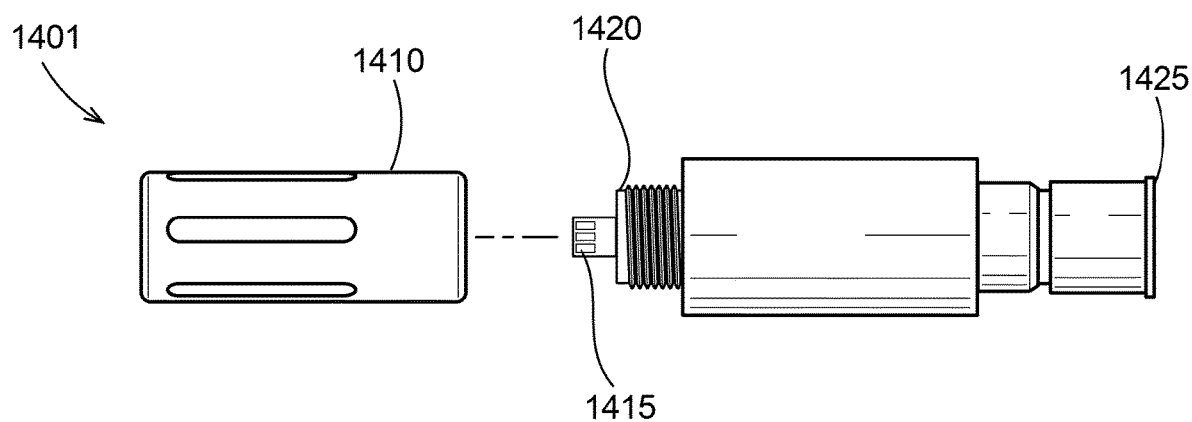

FIG. 14A and FIG. 14B depict an exemplary temperature and humidity sensor. A sensor assembly 1400 includes a sensor body 1405. A sensor shield 1410 is (releasably) coupled to a distal end of the sensor body 1405. A disassembled mode 1401 of the sensor assembly 1400 is depicted. The sensor assembly 1400 includes a sensor element 1415 (e.g., configured to respond in a predictable manner(s) to temperature and/or humidity). The sensor shield 1410 may, for example, threadedly couple to the sensor body 1405 via threads 1420 (inner threads may be provided on the sensor shield 1410). In some embodiments the sensor assembly 1400 may couple to a cable and/or connector at a proximal end. The sensor assembly 1400 may be configured to generate and/or receive signals according to a predetermined protocol (e.g., IO-Link, Modbus) at an output port 1425.

Figure 15B:
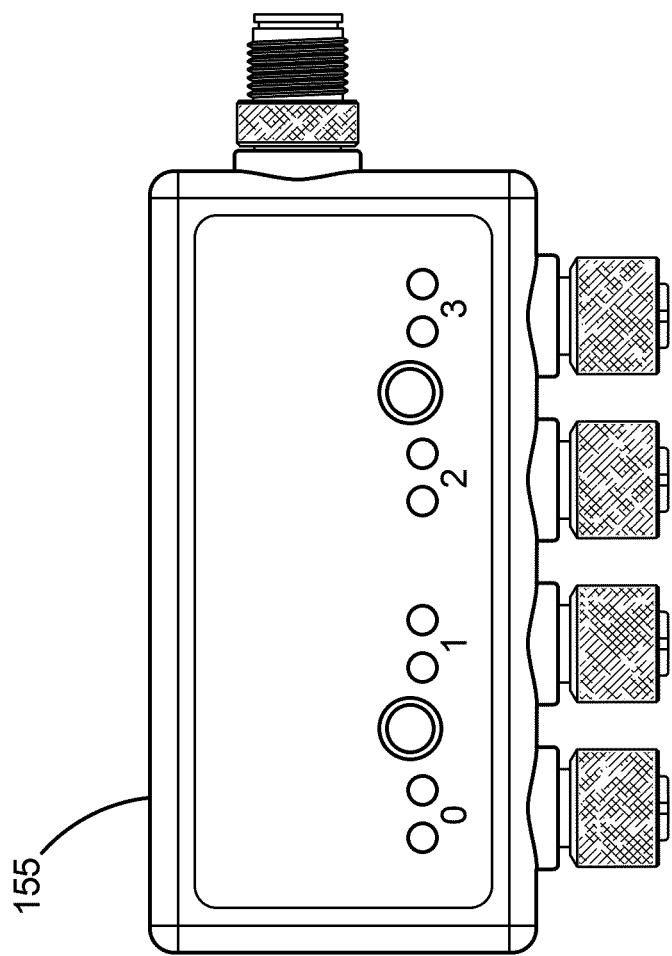
Figure 15A:
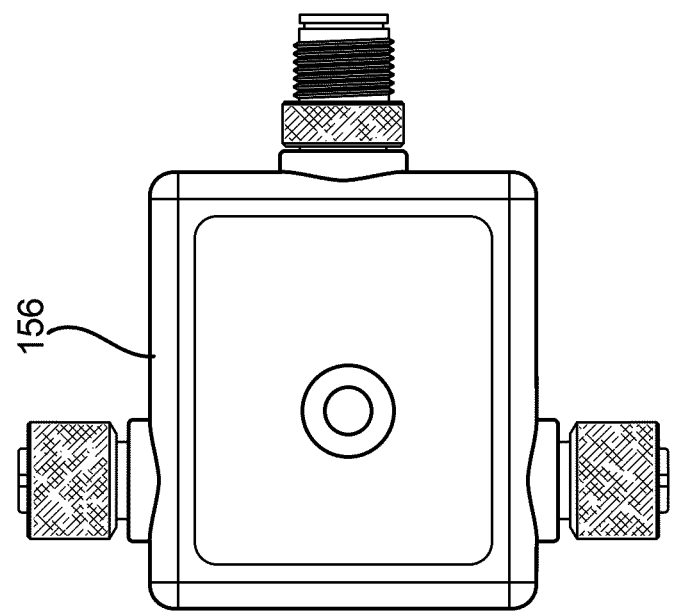

FIG. 15A, FIG. 15B, FIG. 16A, FIG. 16B, FIG. 16C, and FIG. 16D depict exemplary communication hubs. FIGS. 15A-15B depict an illustrative communication hub 155 and an illustrative dual-port communication hub 156. The dual-port communication hub 156 may, for example, advantageously provide reduced cost and/or reduced size compared to the communication hub 155.

FIGS. 16A-16D compare the communication hub 155 and the dual-port communication hub 156 to an illustrative IO-link master 1605 and an illustrative IO-link block 1610. In various embodiments, the communication hub 155 and/or the dual-port communication hub 156 may provide a face-mounted form factor configured such that cables exit from a narrow (e.g., narrowest) surface (e.g., an 'edge' face(s)) of the hub. Such embodiments may, for example, advantageously reduce space for cabling a hub. For example, the communication hub 155 may be advantageously secured on an upper surface 1615 and/or corresponding bottom surface. In the depicted example, cables may exit from one or more edge surfaces 1616. The dual-port communication hub 156 may, for example, be advantageously secured on an upper surface 1620 and/or corresponding bottom surface. In the depicted example, cables may exit from one or more edge surfaces 1621. Such embodiments may advantageously reduce space by maintaining cables in a linear configuration. Various embodiments may advantageously reduce bending of cables (e.g., and corresponding interference, snatching, breaking). Various embodiments may advantageously provide a form factor having a thickness (e.g., corresponding to a width of an edge surface such as one or more edge surfaces 1616 and/or one or more edge surfaces 1621) of a same order of magnitude of a cable and/or connector width. For example, as depicted, a thickness of the communication hub 155 and the dual-port communication hub 156 may be substantially the same as an (outer) diameter of associated connectors (e.g., M12 connectors). Various embodiments may advantageously provide easily mounted hubs. Various embodiments may advantageously provide low-profile hubs. Various embodiments may provide communication and/or control hubs in a small form factor.

In the depicted example, the communication hub 155 and the dual-port communication hub 156 are configured as IO-Link hubs. For example, the communication hub 155 may provide four IO-Link ports (labeled 0, 1, 2, and 3). The communication hub 155 may be coupled to an upstream device (e.g., IO-Link master) via a fifth port. The four IO-Link ports may, for example, be master ports. For example, the communication hub 155 may be configured to operate as a master device for up to four downstream devices (e.g., sensors, slave hub(s), indicators).

The dual-port communication hub 156 may, for example, provide two IO-Link ports (labeled "Port 0" and "Port 1"). The dual-port communication hub 156 may, for example, be coupled to an upstream device (e.g., IO-Link master) via a third port. The two IO-Link ports may, for example, be master ports. The dual-port communication hub 156, for example, may be configured to operate as a master device for up to two downstream devices.

Multiple communication hubs having different numbers of ports may, for example, provide cost and/or size flexibility depending on a configurator's needs and/or plans.

In some embodiments, the fifth port of the communication hub 155 and/or the third port of the dual-port communication hub 156 may, for example, transmit signals (e.g., corresponding to data) and/or receive signals (e.g., corresponding to commands, configurations, data) from an upstream hub and/or controller (e.g., a control hub 165).

Various embodiments may, for example, advantageously allow 'smart' signals to be brought onto a common network. Various embodiments may advantageously create a DCCS using an open communication protocol. Such embodiments may, for example, allow proprietary and/or other protocol-based devices to be integrated into the DCCS.

Figure 17:
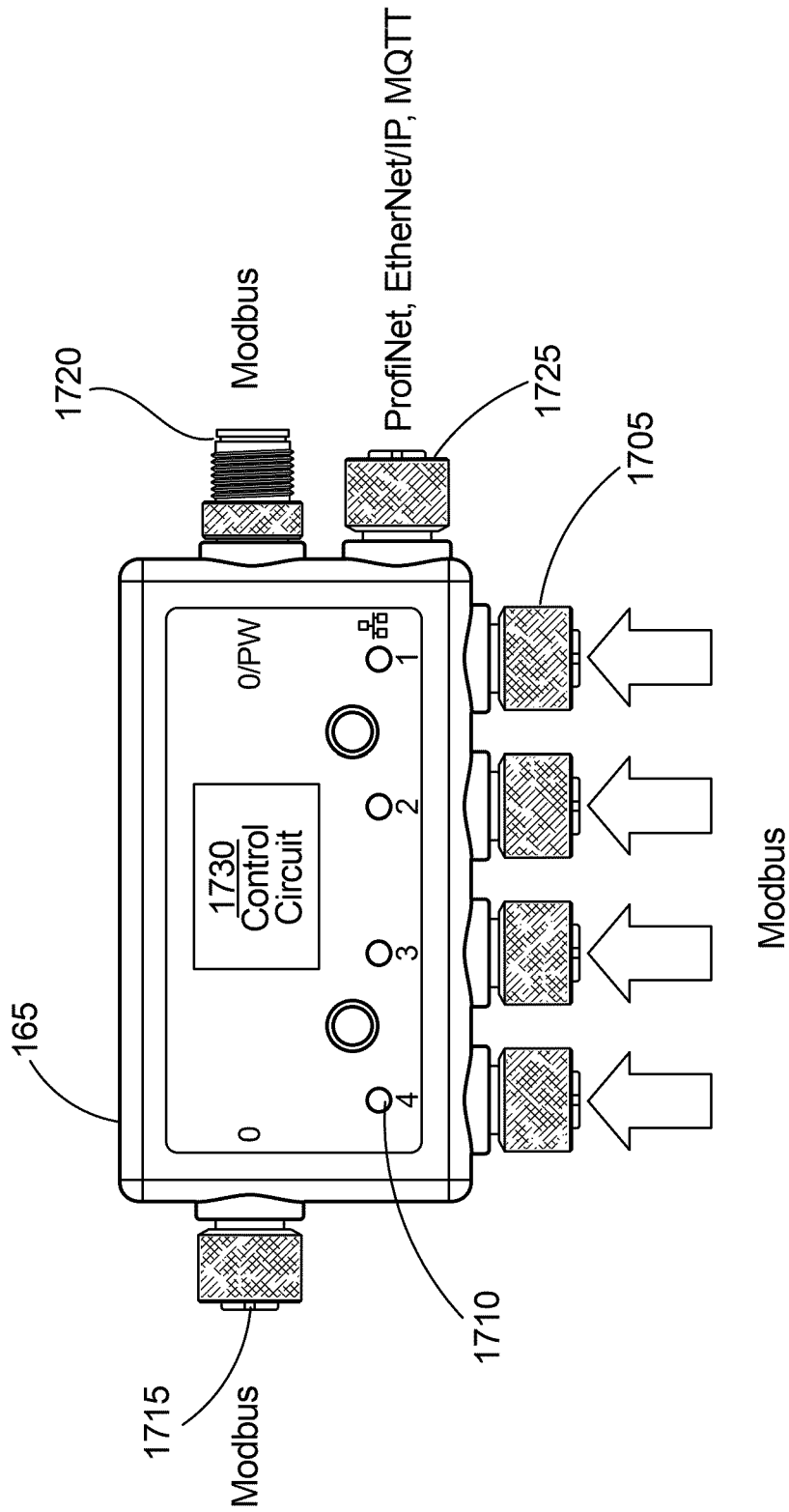
FIG. 17 depicts an exemplary dynamically configurable control hub (DCCH).

FIG. 17 depicts an exemplary dynamically configurable control hub (DCCH). The control hub 165 includes multiple downstream ports 1705. A set of indicators 1710 is provided to correspond to each of the multiple downstream ports 1705. For example, a body of the control hub 165 may be overmolded around internal circuitry. The indicators 1710 may, for example, correspond to LEDs overmolded by an at least partially translucent material(s). In some embodiments, the LEDs may, for example, be straight (e.g., vs angled). A face-mounted indicia may, for example, advantageously provide easy viewing outside of a plane of cables.

The multiple downstream ports 1705 may, for example, be configured to connect to devices via a Modbus protocol. In the depicted example, the multiple downstream ports 1705 include four Modbus ports (labeled 1, 2, 3 and 4). The control hub 165 further includes a port 1715 and a port 1720. The port 1715 and/or the port 1720 may, for example, each be configured to communicate in a Modbus protocol. In some embodiments, the port 1715 and/or the port 1720 may be logically and/or physically connected. For example, the port 1715 and the port 1720 may, for example, cooperate as a single pass-through port. In some implementations, by way of example and not limitation, the ports 1715, 1720 may be continuously coupled to the same internal master or slave connection point.

The port 1715, the port 1720, and/or one or more of the multiple downstream ports 1705 may be configurable. For example, the port 1715 and the port 1720 may be configured as a single pass-through port (e.g., port 4). Ports 0-4 may, for example, be (individually, independently) configurable as (Modbus) master ports. Ports 0-4 may, for example, be (individually, independently) configurable as (Modbus) slave ports. In some embodiments, at least one of the multiple downstream ports 1705 may be coupled to downstream ports (e.g., sensors, indicators, hubs). The port 1715 and/or the port 1720 may, for example, be coupled to a transceiver (e.g., connected to the cloud network 175, connected to a controller). In the depicted example, the control hub 165 may be configured with up to 5 Modbus master connections. The connectors may, for example, (as depicted) be configured to be physically coupled via M12 connectors.

In various embodiments the port 1715 and the port 1720 may be configured in a pass-through mode. Such embodiments may, for example, allow 'daisy-chaining' of the control hub 165 with other hubs (e.g., other control hub 165 units). For example, such embodiments may permit coupling of the control hub 165 to a Modbus trunk. Daisy-chaining may, for example, advantageously reduce cabling required. The form factor may, for example, permit in-line coupling in a trunk (e.g., without bending cables).

The control hub 165 includes a port 1725. The port 1725 may, for example, be configured to communicate using Modbus TCP protocol. The port 1725 may be configurable to communicate with one or more external devices in one or more protocols. For example, the port 1725 may be configured to communicate according to an EtherNet/IP™ protocol. The port 1725 may, for example, be configured to communicate according to a ProfiNet® protocol. The port 1725 may, for example, be configured to communicate according to an MQTT protocol. In some embodiments, for example, the port 1725 may be configured as an Ethernet port using an M12 D-coded Ethernet connection. The port 1725 may, for example, be configured as a 100 Mbps (nominal) connection.

In some embodiments, for example, the port 1725 and/or the port 1720 may be configured to act as a configuration and/or discovery port. In this example, the control hub 165 includes a control device 1730. The control device 1730 may be configured to automatically and independently configure each of the ports 1705, 1715, 1720, 1725 to operate as a primary port, a secondary port, or a pass-through port. For example, the 1730/ may associate a communication protocol (e.g., Modbus, TCP/IP, Profinet®) at each of the ports 1705, 1715, 1720, 1725 based on the identification. Some exemplary embodiments for configuring the control hub 165 using the control device 1730 are described with reference to FIGS. 18-19.

In some embodiments the control hub 165 may communicate with a network (e.g., masters, peers, slaves) via the port 1720 and/or the port 1725. For example, the control hub 165 may respond to discovery requests and/or perform network discovery operations (e.g., the identification step 205 as described with reference to FIG. 2) via the port 1720 and/or the port 1725.

Figure 18:
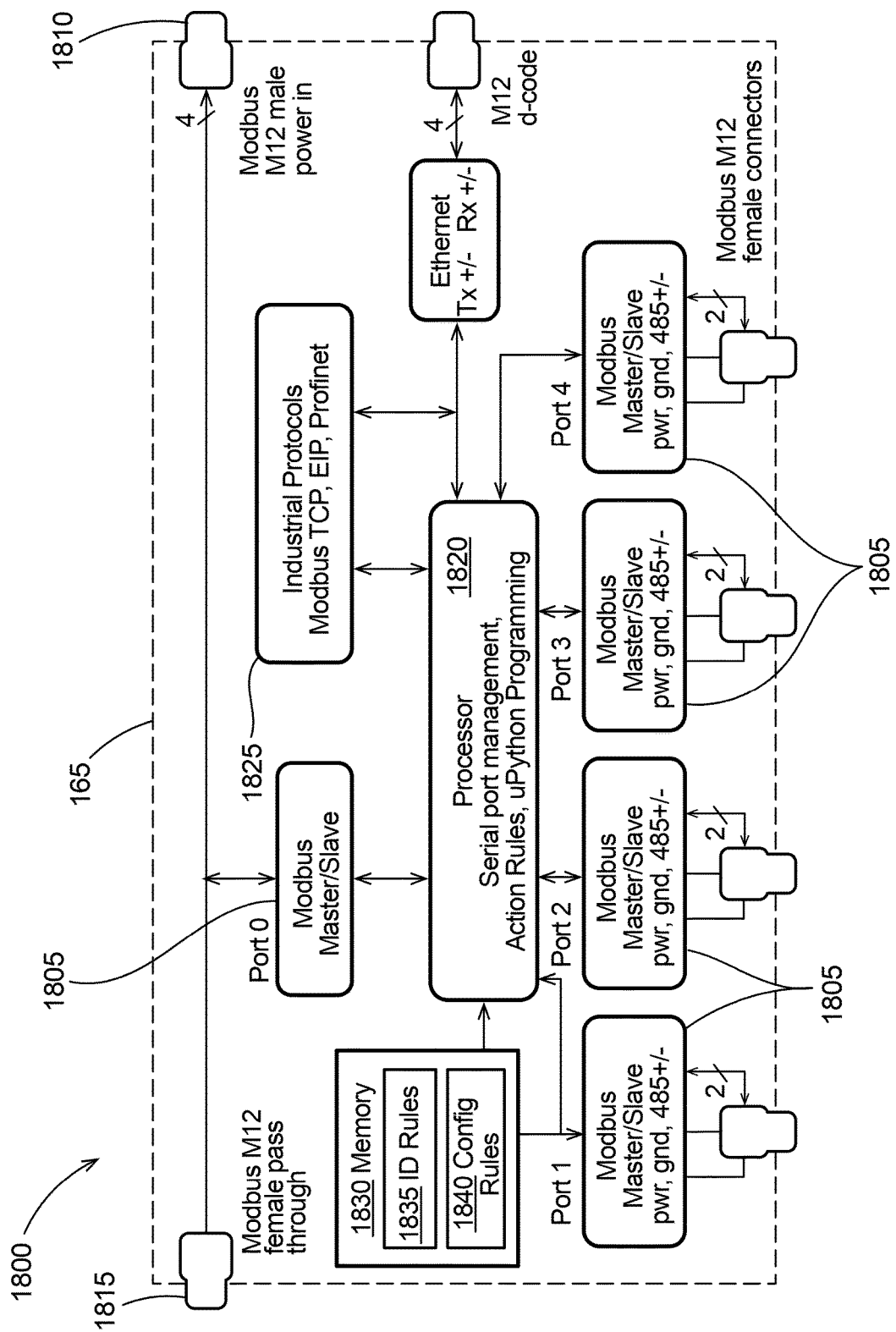
FIG. 18 and FIG. 19 depict exemplary block diagrams of an exemplary DCCH.
Figure 19:
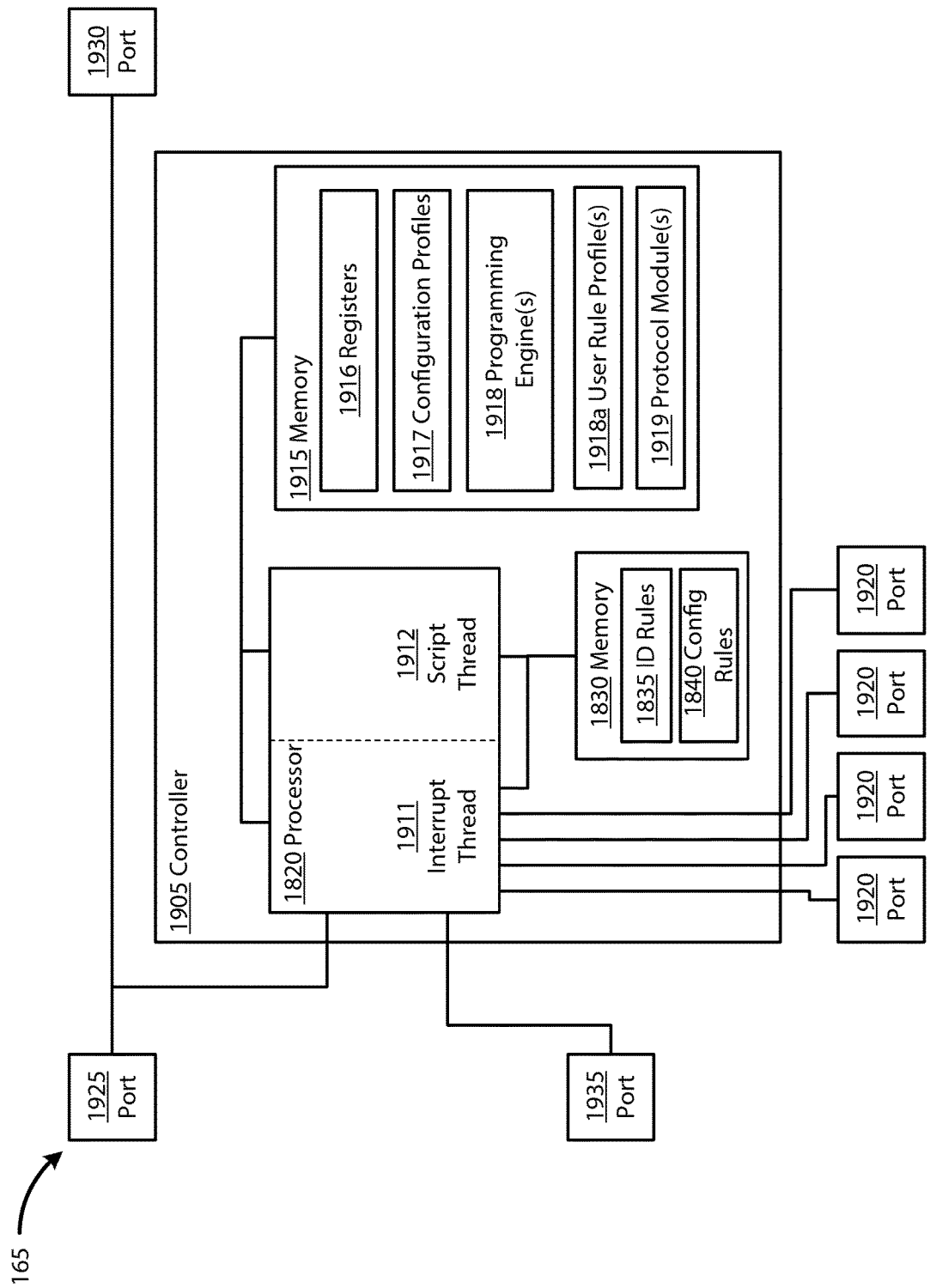
Figure 20:
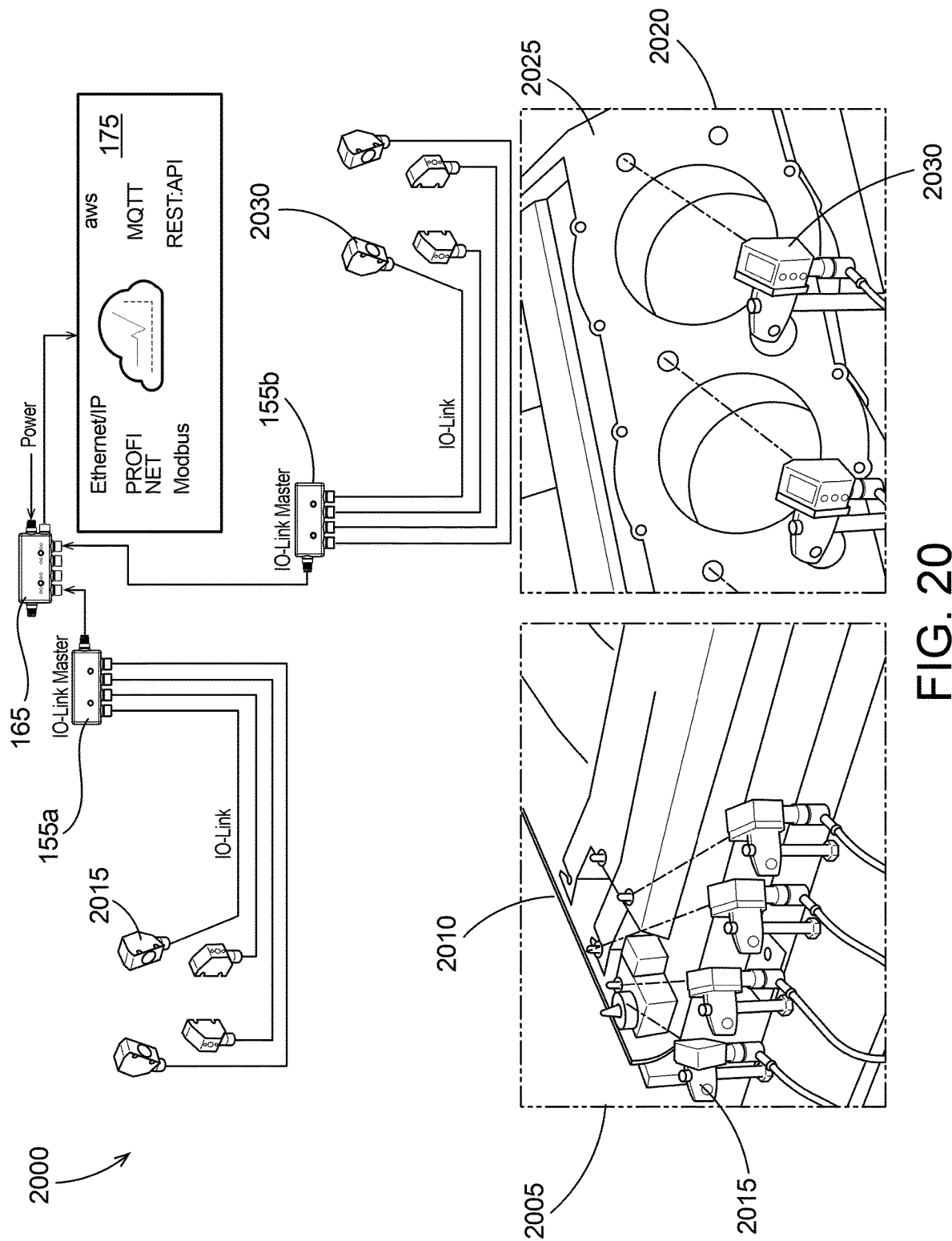
FIG. 20, FIG. 21, FIG. 22, FIG. 23, and FIG. 24 depict an exemplary DCCH deployed in illustrative use-case scenarios.

FIG. 18 and FIG. 19 depict exemplary block diagrams of an exemplary DCCH. A block diagram 1800 depicts, by way of example and not limitation, a block-level circuit schematic of the exemplary control hub 165. In the depicted example, each connection port 1805 may include a separate (e.g., individual, independent) Modbus master/slave control. In some implementations, programmability is provided for each of the connection port 1805. Baud rate and/or parity settings may, for example, be individually selectable (e.g., predetermined, via a configuration profile, dynamic). Individual timing and packet timing may be provided for each Modbus connection at the connection port 1805. One or more of the connection ports 1805 may be configured as 2-wire RS485 physical transceivers with power and ground at each connector.

In the depicted example, the male M12 connection port(s) 1810 may provide common power and ground to all M12 Modbus ports. For example, the male M12 connection may correspond to the port 1720. As shown, the control hub 165 also includes a female M12 pass through connection port(s) 1815. For example, the control hub 165 may be configured so that some signals may be transmitted as 'pass through' via the control hub 165 so that multiple control hubs 165, communication hubs 155, and in-line converters 145 may be connected in-line. Further details of various embodiments for pass through configurations of the control hub 165 are discussed with reference to FIG. 19.

In the depicted example, the control hub 165 includes a processor 1820. For example, the processor 1820 may execute predetermined rules (e.g., action rules, scripts) in response to signals received from the connection ports 1805. For example, in some embodiments, a configurator tool may be used to configure one or more rules. In this example, the processor 1820 may retrieve industrial protocols 1825 (e.g., Modbus, TCP, EIP, Profinet protocols) to interpret rules from the received signals. Rules may, for example, include reading from port(s), writing to port(s), applying operations to signal(s) received from port(s), or some combination thereof.

In this example, the control hub 165 includes a data store 1830. For example, the processor 1820 may be configured to execute instructions stored in the data store 1830. As shown, the data store 1830 includes a set of identification rules 1835 and a set of configuration rules 1840. For example, the identification rules 1835 and the 1840 may be programmable by a configuration tool connected to the control hub 165. In some implementations, the processor 1820 may identify a communication mode and communication protocol of each of the connection ports 1805, 1810, 1815 using the identification rules 1835. For example, the identification rules 1835 may be configured to identify whether a connection port is a master port, a slave port, or a pass-through port. For example, the identification rules 1835 may be configured to identify a communication protocol of a connection port based on a received signal. In some implementations, after identifying the communication mode and communication protocol of each of the connection ports 1805, 1810, 1815, the processor 1820 may associate a corresponding communication mode to each of the connection ports 1805, 1810, 1815 based on the configuration rules 1840. For example, the processor 1820 may associate one of the industrial protocols 1825 to the connection ports 1805, 1810, 1815.

Various embodiments may, for example, advantageously enable a user to send selected information to (predetermined, dynamically determined) edge devices and/or central devices (e.g., controllers, cloud systems).

FIG. 19 shows, by way of example and not limitation, a block-level schematic of an exemplary control hub (e.g., the control hub 165). In the depicted example, a controller 1905 includes a processor 1820. The processor 1820 may, for example, include one or more processors. In the depicted example, the processor 1820 is divided (e.g., logically) into at least an interrupt thread 1911 and a script thread 1912.

The processor 1820 is operably coupled to multiple ports. As depicted, the processor 1820 is operably coupled to four ports 1920. The processor 1820 is operably coupled to a port 1925 and a port 1930. As depicted, the port 1925 is operably coupled to the port 1930. The processor 1820 is further operably coupled to a port 1935.

In some embodiments, by way of example and not limitation, the ports 1920 may, for example, be configured such as disclosed at least with reference to multiple downstream ports 1705. The port 1925 may, for example, be configured as disclosed at least with reference to the port 1715. The port 1930 may, for example, be configured as disclosed at least with reference to the port 1720. The port 1935 may, for example, be configured as disclosed at least with reference to the port 1725.

In various embodiments, the port 1925, port 1930, and/or any or each of the ports 1920 may each be read by the interrupt thread 1911 of the processor 1820. For example, the port 1925, the port 1930, and/or the ports 1920 may be, as depicted, logically (e.g., controllably, user-programmably, independently) coupled, alone or in combination, to the interrupt thread 1911 (e.g., by connection to pins controlled by the interrupt thread 1911). Signals received by the interrupt thread 1911 from the various ports may, for example, be converted into data stored in a memory module 1915. The memory module 1915 is operably coupled to the processor 1820. The memory module 1915 is accessible by both the interrupt thread 1911 and the script thread 1912 (e.g., by a common pin(s), by dedicated pins). The memory module 1915 may, for example, include one or more programs of instruction configured to be executed on the processor 1820.

For example, data read from the various ports may be stored in one or more registers 1916 of the memory module 1915. For example, the one or more registers 1916 may each include data storage of 16 bit of data. For example, the one or more registers 1916 may each include data storage of 32 bit of data. The one or more registers 1916 may, for example, be accessible via one or more of the ports. The one or more registers 1916 may, for example, be configured to be globally accessible via the processor 1820. For example, a first data (as an illustrative example, a temperature) may be generated and stored in the one or more registers 1916 in response to a first signal(s) read on a first port (e.g., in the illustrative temperature example, from a thermistor operably coupled to the first port). A second signal(s) corresponding to the temperature may be generated based on the first data stored in the one or more registers 1916 and be transmitted via a second port. For example, the second signal may correspond to the temperature in the illustrative temperature example (e.g., to be displayed on a human-readable display).

In some embodiments, the signal may be transmitted via ethernet (e.g., via the port 1935) to an external controller, cloud system, collection device, monitoring device, or some combination thereof.

The memory module 1915 further includes configuration profile(s) 1917. In various embodiments, the configuration profile(s) 1917 may store one or more profiles corresponding to a configuration of the controller 1905. The configuration profile(s) 1917 may, for example, store one or more profiles corresponding to configuration relating to one or more of the ports. The configuration profile(s) 1917 may, for example, store one or more profiles corresponding to configuration relating to the processor 1820 (e.g., the interrupt thread 1911, the script thread 1912). For example, a configuration profile(s) 1917 may determine a master or slave configuration of a port (e.g., five ports 1920, port 1925, port 1930). A configuration profile(s) may, for example, determine a state (e.g., enabled, disabled, configuration in an enabled state) of a programming engine. A configuration profile(s) may, for example, determine a protocol module(s) to be applied to one or more of the port(s). A configuration profile(s) may, for example, determine a 'pass-through' configuration of the port 1925 and/or the port 1930. For example, the pass-through configuration may advantageously allow more than one of the control hub 165 to be connected 'in-line' to save on connection equipment and reduce configuration complexity.

The memory module 1915 includes a programming engine(s) 1918. The programming engine may, for example, include one or more programs of instruction configured to be executed on the processor 1820. The engine(s) 1918 may, for example, be executed (primarily) by the script thread 1912. The engine(s) 1918 may, for example, be configured to operate on data in the one or more registers 1916. The engine(s) 1918 may, for example, operate on the one or more registers 1916 based on the configuration profile(s) 1917. In some embodiments the engine(s) 1918 may, for example, generate signal(s) to induce operations by the interrupt thread 1911 related to one or more of the ports (e.g., read operation(s), write operation(s), transmit operation(s)).

The memory module 1915 includes a protocol module(s) 1919. For example, the module(s) 1919 may include one or more protocol profiles defining a protocol associated with one or more ports. A protocol profile may, for example, determine operations performed by the interrupt thread 1911 and/or the script thread 1912. For example, in some embodiments a protocol profile(s) may be associated with a Modbus (e.g., Modbus TCP) protocol(s). A protocol profile(s) may, for example, define operations and/or parameters associated with a master mode of a port. A protocol profile(s) may, for example, define operations and/or parameters associated with a slave mode of a port. A protocol profile(s) may, for example, define operations and/or parameters associated with an ethernet protocol. A protocol profile(s) may, for example, define operations and/or parameters associated with a ProfiNet® protocol. A protocol profile(s) may, for example, define operations and/or parameters associated with an MQTT protocol.

In various embodiments, for example, a port (e.g., five ports 1920, port 1925, port 1930) may be configured as a master and/or a slave. In some embodiments, a master/slave configuration may for example, correspond to a master or slave mode defined by a Modbus protocol(s). For example, the protocol module(s) 1919 may use the identification rules 1835 and the configuration rules 1840 stored in the data store 1830 to configure the port.

For example, a port configured as a master may initiate read operations (e.g., controlled by the interrupt thread 1911) on connected devices (e.g., sensors, hubs, controllers, indicators, interfaces). Data may, for example, be stored in response to signals generated during the read operations. The data may be stored in the one or more registers 1916 (e.g., global local register(s)) by the interrupt thread 1911. In various embodiments, the interrupt thread 1911 may access the one or more registers 1916 on behalf of any of the other port(s). In various embodiments the 1912 may access the one or more registers 1916 (e.g., according to operations of an engine(s) 1918).

For example, if one port is a master port, it may read a temperature sensor connected to the port. Reading the temperature sensor may, for example, involve sending a signal to the temperature sensor (e.g., via a Modbus protocol). The signal may be transmitted to the temperature sensor via one or more intermediary devices (e.g., communication hub, control hub, in-line connector and/or converter). The signal may induce the temperature sensor and/or an associated device to generate and transmit to the port a response signal corresponding to a temperature. A corresponding data signal may be generated by the interrupt thread 1911 and stored locally in a global register (one or more registers 1916). Corresponding signal(s) may be generated (e.g., by the script thread 1912, such as according to the engine(s) 1918, the configuration profile(s) 1917, and/or the module(s) 1919). The corresponding signal(s) may, for example, be transmitted to the interrupt thread 1911. The interrupt thread 1911 may, for example, generate transmission signal(s) in response which may be written out (e.g., transmitted) to a second connected device via another port. The second connected device may, for example, need to receive the temperature and/or a signal(s) based on the temperature (e.g., a command to actuate a fan based on a temperature above a (predetermined) threshold).

Various embodiments may advantageously provide a single memory pool(s) accessible to multiple ports. Accordingly, various embodiments may provide multiple (Modbus) masters and/or slaves configured to share data received, and/or data generated in response to data received, with devices connected to the same master port and/or other master and/or slave ports. Various embodiments may be configured to share data received, and/or data generated in response to data received, with devices connected to a non-Modbus port (e.g., ethernet).

Various embodiments may advantageously receive and/or transmit data from multiple (e.g., up to 247 Modbus slave devices per Modbus master port) devices. In some embodiments, for example, the controller 1905 may be operably coupled to 247 slave devices per master*5 ports (e.g., five ports 1920, port 1925/port 1930)=1482 connected devices. In some embodiments, for example, (such as disclosed at least with reference to FIG. 18) the control hub 165 may be operably coupled to 247 slave devices per master*5 ports=1235 connected devices. Data may, for example, be advantageously compact (e.g., via branched, hierarchical cabling via hubs) and efficiently shared between devices without requiring individual cables to a central controller.

In some embodiments, one or more ports may be connected to a single device. For example, a user may not want to define individual addresses for each slave device. A user may, for example, have 5 devices (e.g., in an illustrative example, 3 sensors, 1 actuator, and 1 indicator). Each device may be preconfigured with a (Modbus) address. The user may couple each device to its own port on the control hub 165. Each port may, for example, be configured as a master port. The control hub 165 may be configured (e.g., via the engine(s) 1918) to automatically determine a preconfigured address of a (single) connected device. A (predetermined) program (e.g., a user rule profile(s) 1918a of the memory module 1915, the profile(s) 1918a configured to be executed by the script thread 1912 at least according to an engine(s) 1918) may reference device(s) by port(s) instead of by (Modbus) device address(es). Such embodiments may, for example, advantageously provide 'plug-and-play' implementation (e.g., avoiding user-configuration of an address for each connected device).

The profile(s) 1918a may, for example, include one or more user-configured rule sets and/or scripts. For example, the engine(s) 1918 may include a rules-based engine(s). The rules-based engine may, for example, implement operations according to port(s) and/or predetermined operators (e.g., arithmetic, Boolean, logical, read/write). A user role profile for a rules-based engine may, for example, be programmed in a spreadsheet-style interface.

In an illustrative example, a user rule profile (configured to be implemented by the script thread 1912 according to the engine(s) 1918) may be configured to read (e.g., by the interrupt thread 1911, to the one or more registers 1916) from a temperature sensor on a first port and, if the temperature is greater than a predetermined threshold (e.g., 80° F.), then set a light value in another register. The user rule profile may, for example, further cause the light value to be written (e.g., by the interrupt thread 1911) to a tower light connected to a second port.

In a further illustrative example, a user rule profile(s) may, for example, be configured to read and/or write data, by a rules-based engine in the engine(s) 1918, from ports to and/or from (predetermined) registers (in the one or more registers 1916). A further user rule profile(s) may, for example, be implemented as a script configured to be executed by the script thread 1912 according to a second engine(s) 1918. For example, the second engine may be a scripting engine. The scripting engine may, by way of example and not limitation, include a (micro) Python scripting engine. The user may, for example, configure the script(s) (defined in a user rule profile(s)) to read from and/or write to register(s) based on the rule(s) applied by the rules-based engine. In some embodiments a user may configure a script to interact directly with ports (e.g., via the interrupt thread 1911) without and/or in addition to a rules-based engine.

Accordingly, various embodiments may advantageously provide user-configurable (e.g., field-configurable, remotely configurable, dynamically configurable) edge processing of edge device data. In some embodiments, user rule profile(s), registers, and/or configuration profile(s) may be advantageously stored and/or retrieved via the port 1935 (e.g., by an ethernet based system such as a computer, controller, cloud system), the port 1925, the port 1930, or some combination thereof.

In an illustrative example, an edge device may be configured to detect a vehicle in a parking spot (e.g., connected via a first port). A time a vehicle is detected may be stored in a register. A user input (e.g., requesting charge time) may, for example, be received on a second port. (e.g., according to a user rule profile). The time may be retrieved and compared to a time the request is received (e.g., also stored in a register) and a charge may, for example, be calculated (e.g., locally, remotely). The charge may, for example, be presented to the user (e.g., a driver of the vehicle) via a second edge device (e.g., connected to a second port).

Various embodiments may advantageously provide multiple master and/or slave ports running in parallel (e.g., reading/writing data). Each port may advantageously be associated with a dedicated connection to the processor 1820. Each port may be advantageously associated with dedicated logic (e.g., rules, profiles, parameters).

Multiple threads of the processor 1820 may, for example, advantageously provide practical (simultaneous) parallel operation of the ports. For example, a Modbus protocol may take milliseconds to complete (e.g., reading, writing). A controller interface (e.g., retrieval and/or storage of data to the one or more registers 1916 via the interrupt thread 1911) may take microseconds. Accordingly, the interrupt thread 1911 may advantageously service multiple ports (e.g., in a 'round-robin' fashion, according to interrupt logic, as a direct memory access controller) running simultaneously. Each port may, for example, have a dedicated circuit (e.g., chip). For example, the dedicated port circuit(s) may be configured to execute commands in response to signal(s) from the interrupt thread 1911.

As an exemplary illustration, a master port may be given a command by the interrupt thread 1911 to write 10 registers to connected edge devices. The (input-output (IO)) port may, for example, take 50 milliseconds to complete the commanded operations. However, the processor 1820 may have only consumed 10 microseconds to access the one or more registers 1916 and generate and transmit the signal(s) to the master port.

In some embodiments, the port 1925 and the port 1930 may be physically connected. For example, the port 1925 and the port 1930 may be configured as an RS485 connection, and may be physically configured as differential pair signaling. Electrically continuous conductors may, for example, connect the same twisted pairs in the port 1925 and the port 1930. Accordingly, such embodiments may advantageously act as a physical pass-through connector. In some embodiments the pass-through connectors may advantageously access the one or more registers 1916 (e.g., via the interrupt thread 1911).

FIG. 20, FIG. 21, FIG. 22, FIG. 23, and FIG. 24 depict an exemplary DCCH deployed in illustrative use-case scenarios.

A system 2000 (FIG. 20) is deployed in an exemplary use-case scenario. For example, a control hub 165 simultaneously interfaces with two communication hub 155 (a first hub 155a and a second hub 155b). The first hub 155a interfaces with edge devices in a first scenario 2005. In the first scenario 2005, an assembly 2010 may be monitored by four optical sensors 2015. The first hub 155a provides a single communication cable between the four optical sensors 2015 and the control hub 165. The control hub 165 may, for example, provide edge processing and/or may communicate to remote device(s) (e.g., cloud network(s), remote controller(s), central controller(s)).

The second hub 155b interfaces with edge devices in a second scenario 2020. In the second scenario 2020, a part 2025 may be monitored by four optical sensors 2030. The second hub 155b may provide a single communication cable between the control hub 165 and the four optical sensors 2030.

In an illustrative example, the system 2000 may, for example, correspond to verifying part-in-place and trend assembly fixture quality over time. Multiple position and/or distance measurement sensors may be configured to verify part in place checks. A profile(s) for variance over time may be developed. For example, the profile(s) may be applied to determine quality assurance of assembly fixtures.

Cable runs may, for example, be advantageously minimized by monitoring multiple stations with a single control hub 165.

Existing sensor signals may, for example, be converted to desired communication protocols (e.g., IO-Link, Modbus) using convertors (e.g., in-line converters 145, not shown).

Figure 21:
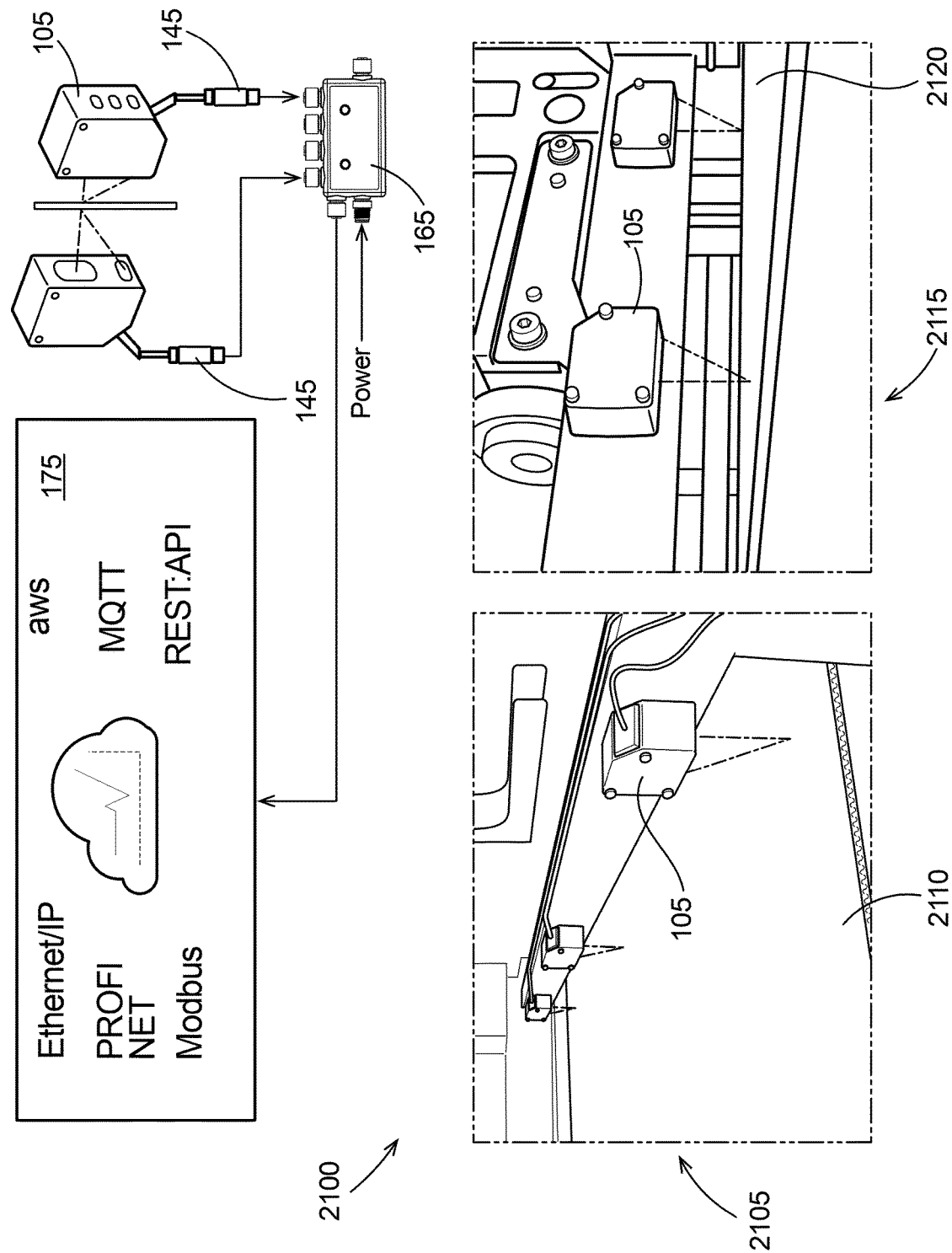

In an illustrative example shown in FIG. 21, a scenario(s) 2100 may, for example, correspond to a programmable controller configured to calculate thickness measurements from multiple devices. Signals (e.g., Modbus signals) may be collected from multiple distance measuring devices (e.g., edge devices 105). A scenario 2105 depicts a corrugated sheet 2110 being monitored by optical distance sensors. A scenario 2115 depicts a solid sheet 2120 being monitored by optical distance sensors.

The edge devices 105 may, for example, be coupled to a control hub 165 (as depicted) via in-line converters 145. The control hub 165 may be configured with action rules (e.g., according to profile(s) 1918a such as disclosed at least with reference to FIG. 19) configured to calculate thickness measurement(s).

In various embodiments disclosed herein, available (predetermined) action rules (e.g., for inclusion in rules-based profile(s) 1918a to be implemented by a rules-based engine(s) 1918) may include, by way of example and not limitation, threshold parameters timers, (e.g., minimum on/off time, and/or logging options), predetermined rules (e.g., arithmetic operators, bitwise operators), control logic (e.g., logical operators; SR, T, D, and/or JK flip flops), trending parameters (e.g., multiple averaging filters), and/or tracking parameters (e.g., counts, on/off times).

Figure 22:
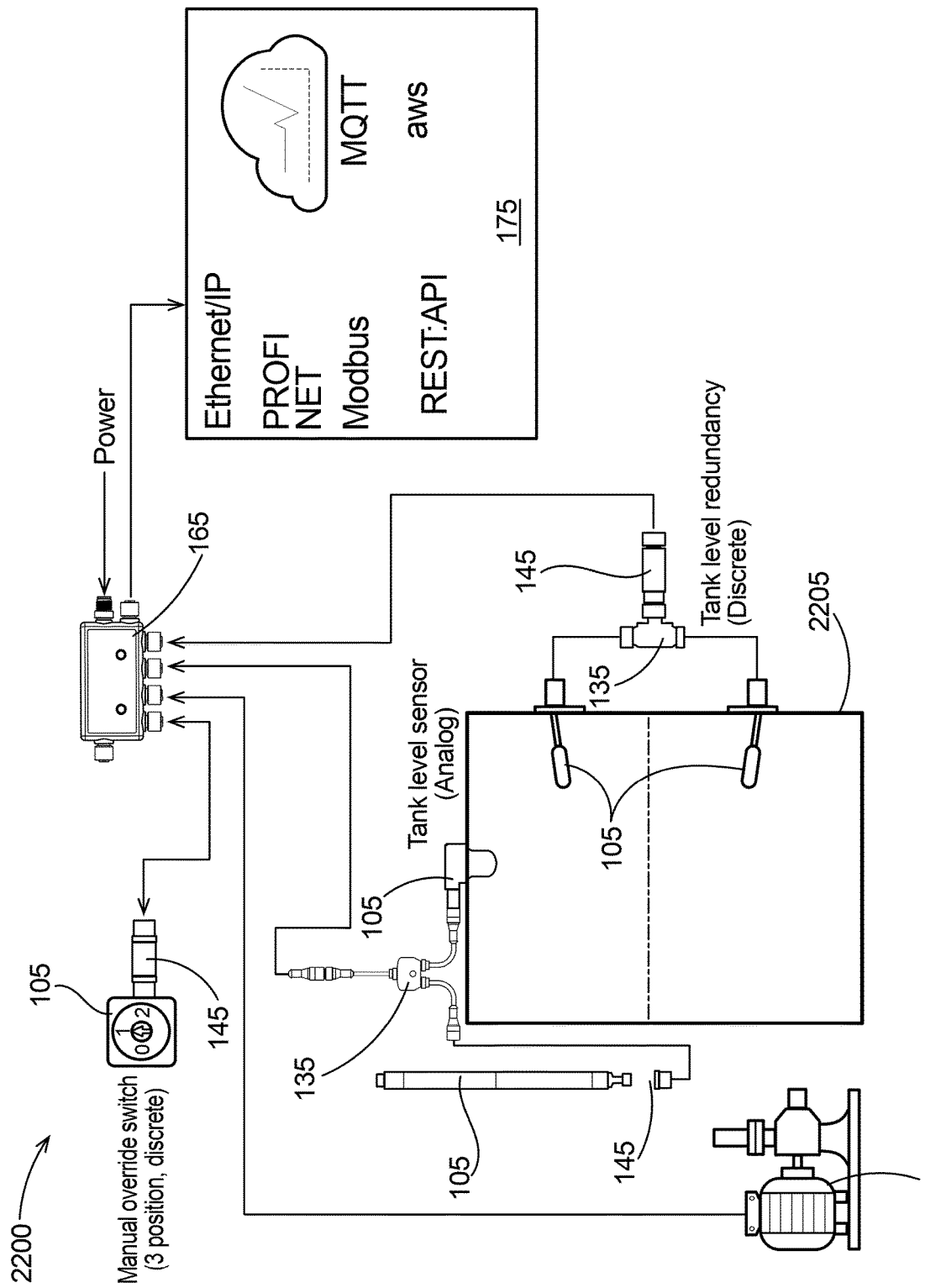
Figure 23:
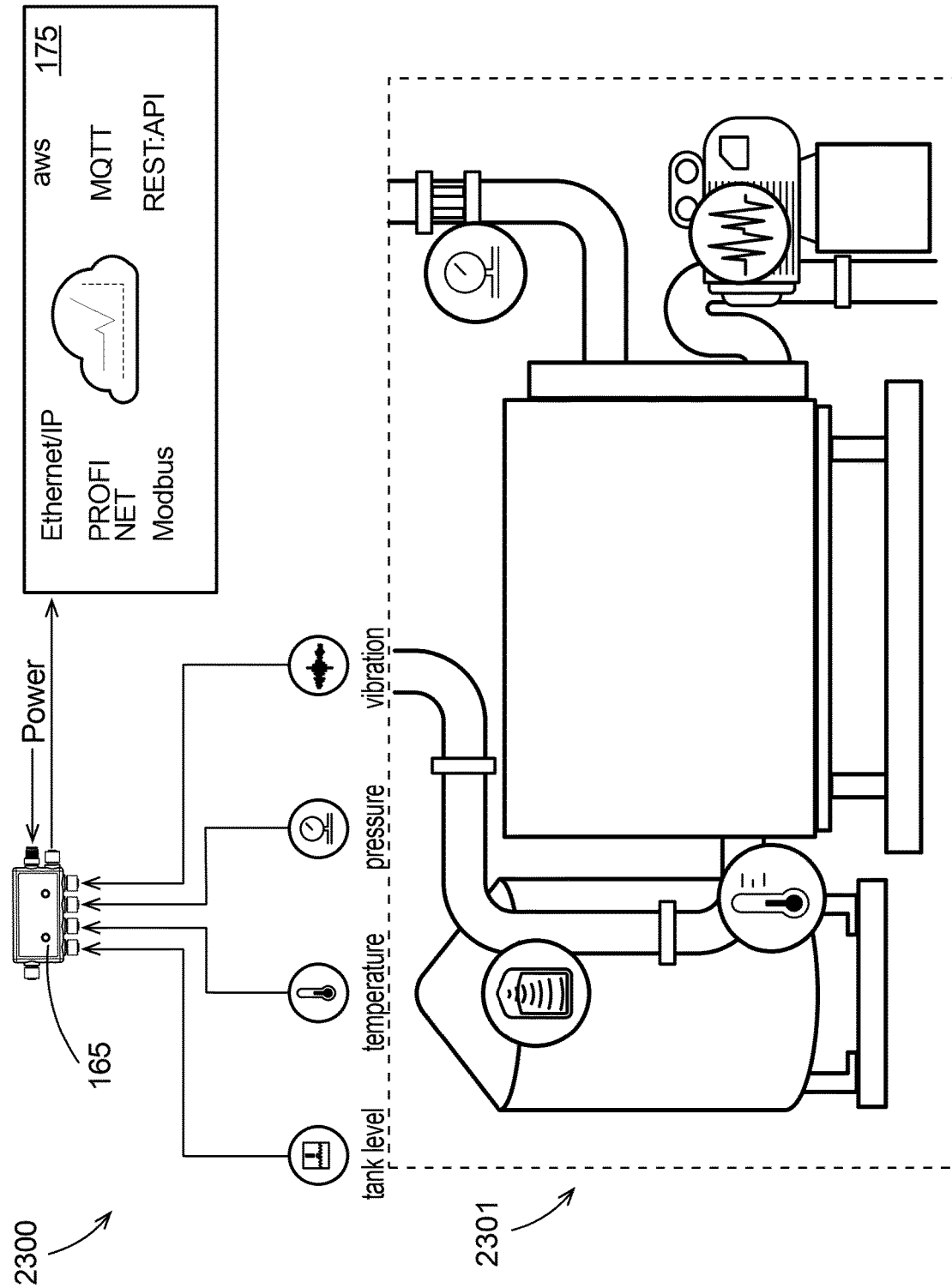

In an illustrative example shown in FIG. 22, a system 2200 may, for example, be configured to consolidate redundancy and logic for (critical) tank level applications. Various edge devices 105 (e.g., pump, discrete tank sensors, analog tank sensor, indicator, discrete override switch) are coupled to a control hub 165 via various multi-branch connector 135 and/or in-line converters 145. The edge devices 105 may be configured to monitor and/or respond to a level of fluid in a tank 2205. Redundant pump control and/or logic rules may be programmed directly into the control hub 165 (e.g., via profile(s) 1918a).

The control hub 165 may, for example, enable incremental changes in precision applications to be visualized (e.g., by the edge devices 105, by a remote device(s) such as connected directly and/or by a (cloud) network). The changes may, for example, advantageously be visualized with no analog PLC card, shielded cabling, and/or programming required. Existing edge devices 105 may be advantageously coupled to the control hub 165 using a common protocol(s) via the in-line converters 145.

In an illustrative example, a system 2300 (FIG. 23) may, for example, be configured to minimize analog inputs for condition monitoring and predictive maintenance of assets in an illustrative environment 2301. For example, various edge devices (e.g., tank level sensor(s), temperature sensor(s), pressure sensor(s), vibration sensor(s)) may be coupled to a control hub 165.

The control hub 165 may, for example, advantageously enable a user(s) to monitor a condition of assets and/or trend data over time for insights into failures before they occur. The control hub 165 may, for example, minimize analog input card requirements on PLCs by utilizing Modbus. For example, four sensors may be advantageously coupled to the depicted control hub 165 (e.g., without individual configuration of the sensors). By way of example and not limitation, sensors may, for example, include temperature and vibration sensors (e.g., configured to advantageously enable quick intervention to avoid downtime). Sensors may include, for example, tank level status (e.g., configured to advantageously avoid material overflow and/or runout). Sensors may, for example, include current transducers (e.g., configured to monitor current draw and/or trend over time). Sensors may, for example, include (infrared) temperature sensors (e.g., configured to advantageously provide non-contact temperature measurement). Sensors may, for example, include thermistor probes (e.g., configured to advantageously determine pre-process and/or post-process temperature measurements).

Figure 24:
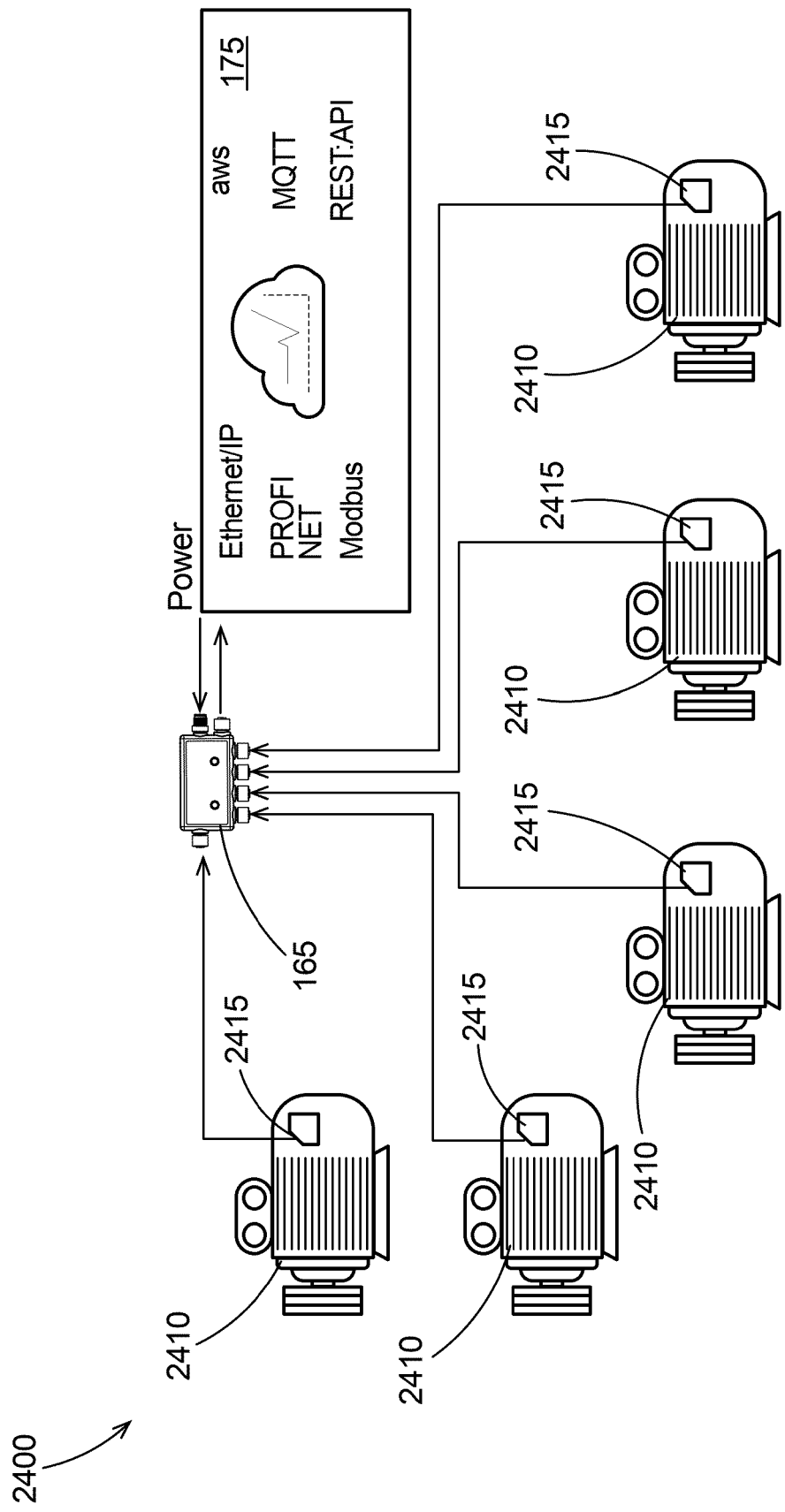

In an illustrative example shown in FIG. 24, a system 2400 may, by way of example and not limitation, be configured to quickly deploy Modbus slave devices to an EtherNet/IP, Modbus TCP, and/or Profinet® network. For example, a control hub 165 may be provided with five independent Modbus master ports. The ports may, for example, advantageously increase simplicity and/or decrease deployment time for co-located assets. In the depicted control hub 165, for example, up to five Modbus slave devices may be advantageously connected out of the box, without manually assigning a slave address to connected devices.

The system 2400 includes five motors 2410. Each of the motors 2410 is fitted with a sensor 2415 (e.g., vibration sensor, temperature sensor, current sensor). Each sensor 2415 may be individually connected to the control hub 165. A (predetermined) profile(s) 1918a may be loaded on to the control hub 165 (e.g., via a port such as the port 1935, the port 1725).

Figure 25:
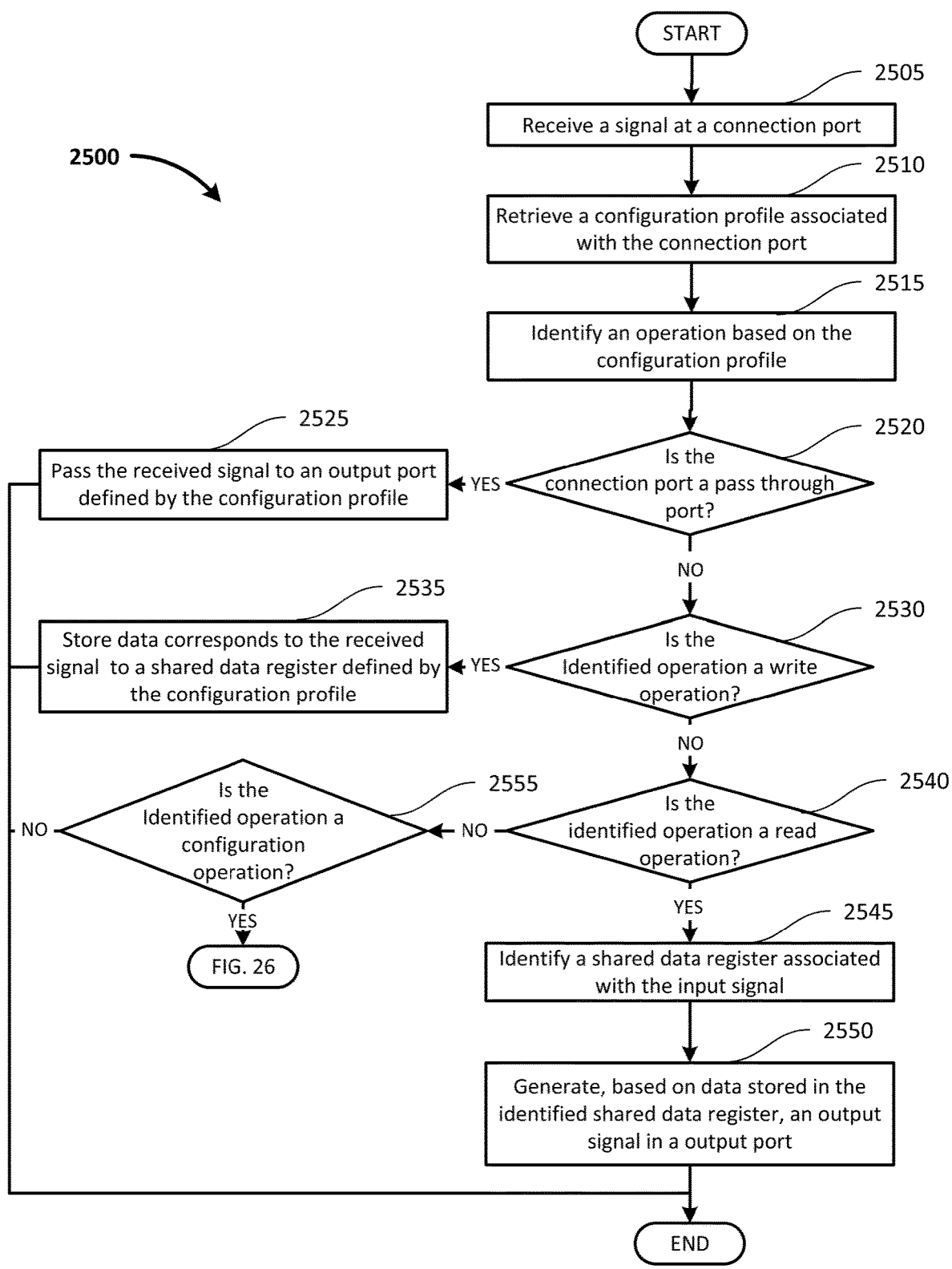
FIG. 25 depicts a flowchart of an exemplary signal processing method of an exemplary DCCH.

FIG. 25 depicts a flowchart of an exemplary signal processing method 2500 of an exemplary DCCH. For example, the control hub 165 may perform the method 2500 to process an input signal. For example, the communication hub 155 may perform the method 2500 to process an input signal. In this example, the method 2500 begins when a signal is received at a connection port at a step 2505. For example, one of the ports 1920, 1925, 1930, 1935 may receive a signal from one of the edge devices 105. For example, one of the ports 1920, 1925, 1930, 1935 may receive a signal from a remote control device via the remote communication gateway 170.

In step 2510, a configuration profile associated with the connection port may be retrieved. For example, the processor 1820 may retrieve the configuration profile(s) 1917 from the memory module 1915. In step 2515, an operation is identified based on the configuration profile. For example, the processor 1820 may identify the operation based on the configuration profile and rules defined in the programming engine(s) 1918. In a decision point 2520, it is determined whether the connection port is a pass-through port. For example, the connection port may be defined as a pass-through port based on the configuration profile 1917 associated with the connection port. If it is determined the connection port is a pass-through port, in step 2525, the received signal is passed to an output port defined by the configuration profile, and the method 2500 ends. For example, the configuration profile(s) 1917 may define the port 1930 as a pass-through port and that signals received at the port 1930 may be passed to the port 1925.

If, in the decision point 2520, it is determined that the connection port is not a pass-through port, it is determined whether the identified operation is a write operation in a decision point 2530. If the identified operation is a write operation, data corresponding to the received signal is stored to a shared data register defined by the configuration profile in step 2535, and the method 2500 ends. For example, the configuration profile(s) 1917 may define an address in the one or more registers 1916 to store the data represented by the received signal.

If, in the decision point 2530, it is determined that the identified operation is not a write operation, it is determined whether the identified operation is a read operation in a decision point 2540. If the identified operation is a read operation, to a shared data register associated with the input signal is identified in step 2545. For example, the processor 1820 may identify an address of the associated shared data register based on the connection port, the received signal, and the configuration profile(s) 1917. Next, in step 2550, an output signal is generated based on data stored in the identified shared data register at an output port, and the method 2500 ends.

If, in the decision point 2540, it is determined that the identified operation is not a read operation, in a decision point 2555, it is determined whether the identified operation is a configuration operation. If the identified operation is not a configuration operation, the method 2500 ends. If the identified operation is a configuration operation, an exemplary configuration method 2600 as described below is performed.

Figure 26:
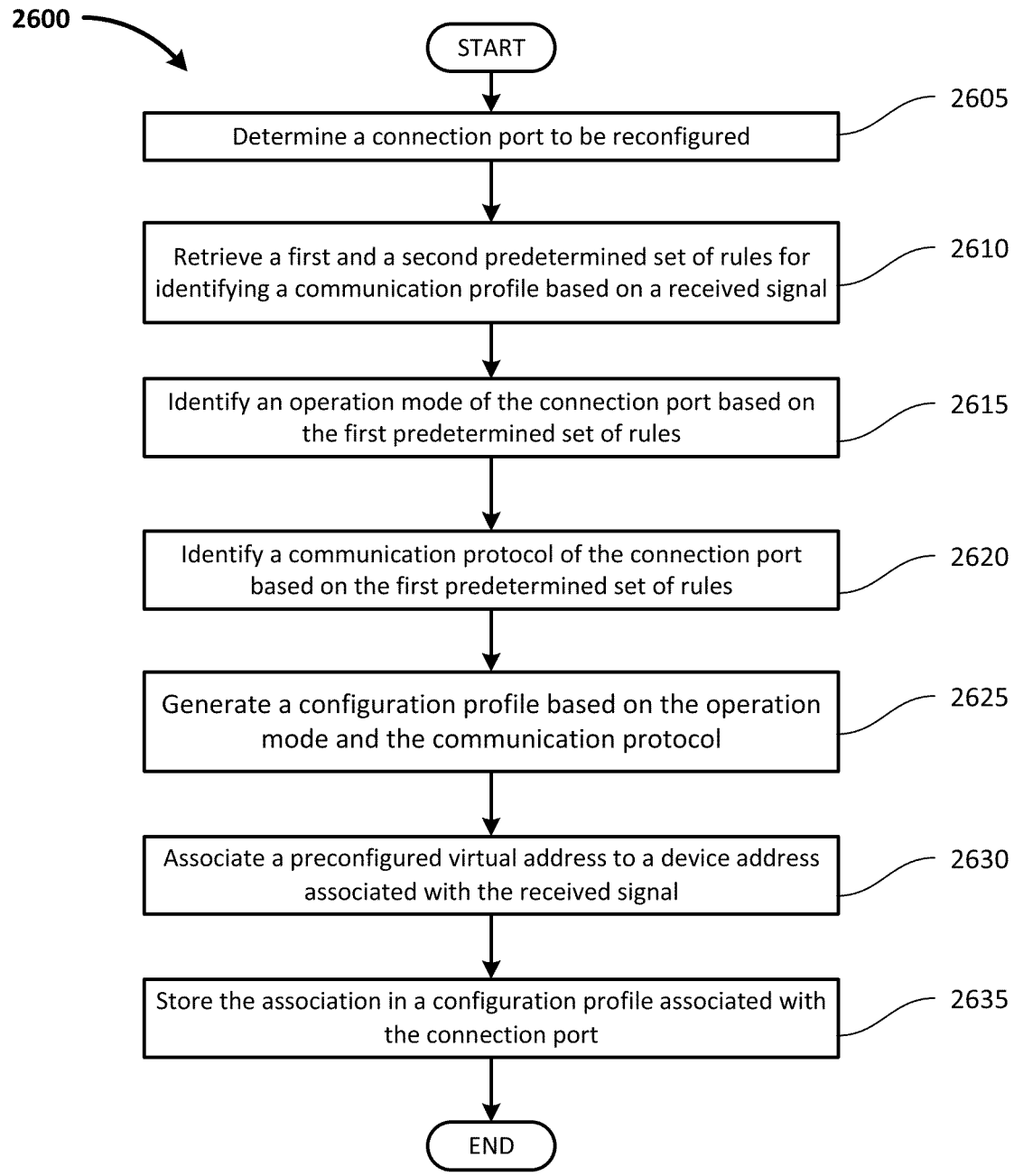
FIG. 26 depicts a flowchart of an exemplary connection port reconfiguration method of an exemplary DCCH.

FIG. 26 depicts a flowchart of an exemplary connection port reconfiguration method 2600 of an exemplary DCCH. In some implementations, the method 2600 may be performed after the decision point 2555 with reference to FIG. 25. In some implementations, the method 2600 may be performed independently when a DCCH receives a reconfiguration signal to configure the configuration profile of one or more of the ports (1920, 1925, 1930, 1935).

The method 2600 begins in step 2605 when a connection port is determined to be reconfigured. For example, the processor 1820 may determine one of the ports 1920, 1925, 1930, 1935 to be reconfigured based on the received signal. In step 2610, a first and a second predetermined set of rules are retrieved for identifying a communication profile of the connection port based on the received signal. In step 2615, an operation mode of the connection port is identified based on the first predetermined set of rules. For example, the processor 1820 may retrieve the identification rules 1835 to identify a communication profile based on the received signal. In step 2620, a communication protocol (e.g., Modbus, IO-Link) of the connection port is identified based on the first predetermined set of rules. For example, the processor 1820 may identify, based on the configuration rules 1840, an operation mode (e.g., a master port, a slave port, a pass-through port) and a communication protocol (e.g., Modbus, Analog, Discrete). In step 2625, a configuration profile is generated based on the operation mode and the communication protocol. The configuration profile may, for example, be associated with the physical port. A preconfigured virtual address is associated to a device address associated with the received signal in step 2630. For example, the processor 1820 may identify a device address based on the received signal. The processor 1820 may, for example, associate a virtual address of one of the shared data registers to the device address so that a device (e.g., an edge device) associated with the device address may advantageously be referenced by the virtual address.

In step 2635, the association is stored in a configuration profile associated with the connection port, and the method 2600 ends. For example, the processor 1820 may update the configuration profile 1917 associated with the connection port.

Figure 27:
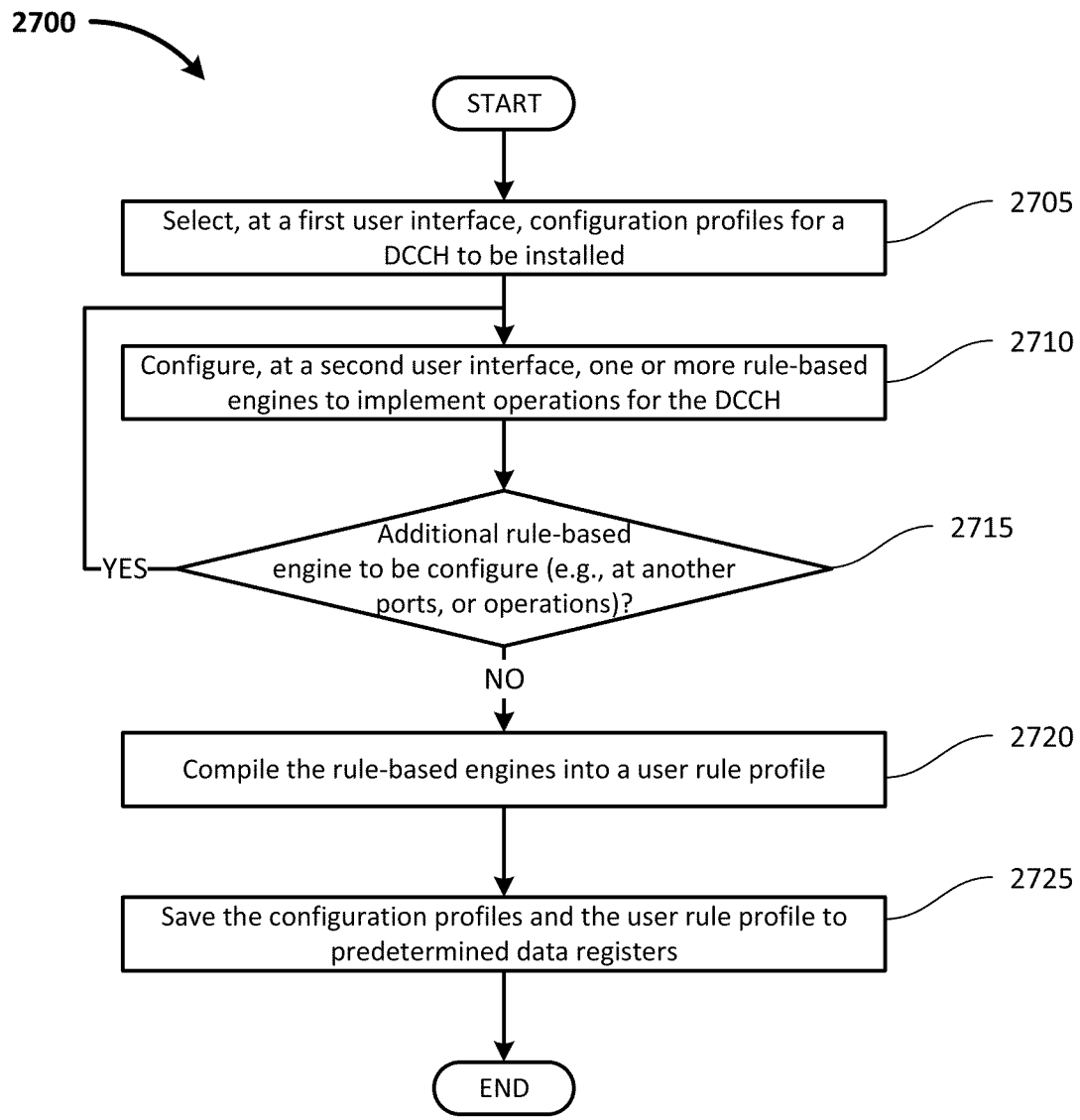
FIG. 27 depicts a flowchart of an exemplary configuration method of an exemplary DCCH.

FIG. 27 depicts a flowchart of an exemplary configuration method 2700 of an exemplary DCCH. For example, a user may use the method 2700 to setup the control hub 165 in a system 100. In this example, the method 2700 begins when, at a first user interface, configuration profiles are selected for a DCCH to be installed in step 2705. For example, the configuration profiles may be selected based on network protocol interfacing each connection port of the control hub 165.

In step 2710, one or more rule-based engines are configured to implement operations for the DCCH in a second user interface. For example, the user may configure one or more rule-based engines 1918. For example, the operations may include threshold parameters timers, (e.g., minimum on/off time, and/or logging options), predetermined rules (e.g., arithmetic operators, bitwise operators), control logic (e.g., logical operators; SR, T, D, and/or JK flip flops), trending parameters (e.g., multiple averaging filters), and/or tracking parameters (e.g., counts, on/off times). For example, the operation may include activating and/or deactivating an edge device (e.g., the IO-link tower light 120).

In a decision point 2715, it is determined whether additional rule-based engines to be configured (e.g., at another port, or operations). If additional rule-based engine is to be configures, the step 2710 is repeated. If additional rule-based engine is not to be configured, in step 2720, the rule-based engines are compiled into a user rule profile (e.g., the user rule profile 1918a). Next, in step 2725, the configuration profiles and the user rule profile are saved to predetermined data registers, and the method 2700 ends. In various implementations, when the control hub 165 is connected to a new device, user intervention may advantageously become unnecessary after the control hub 165 automatically identify the configuration profile of the newly connected device.

Figure 28:
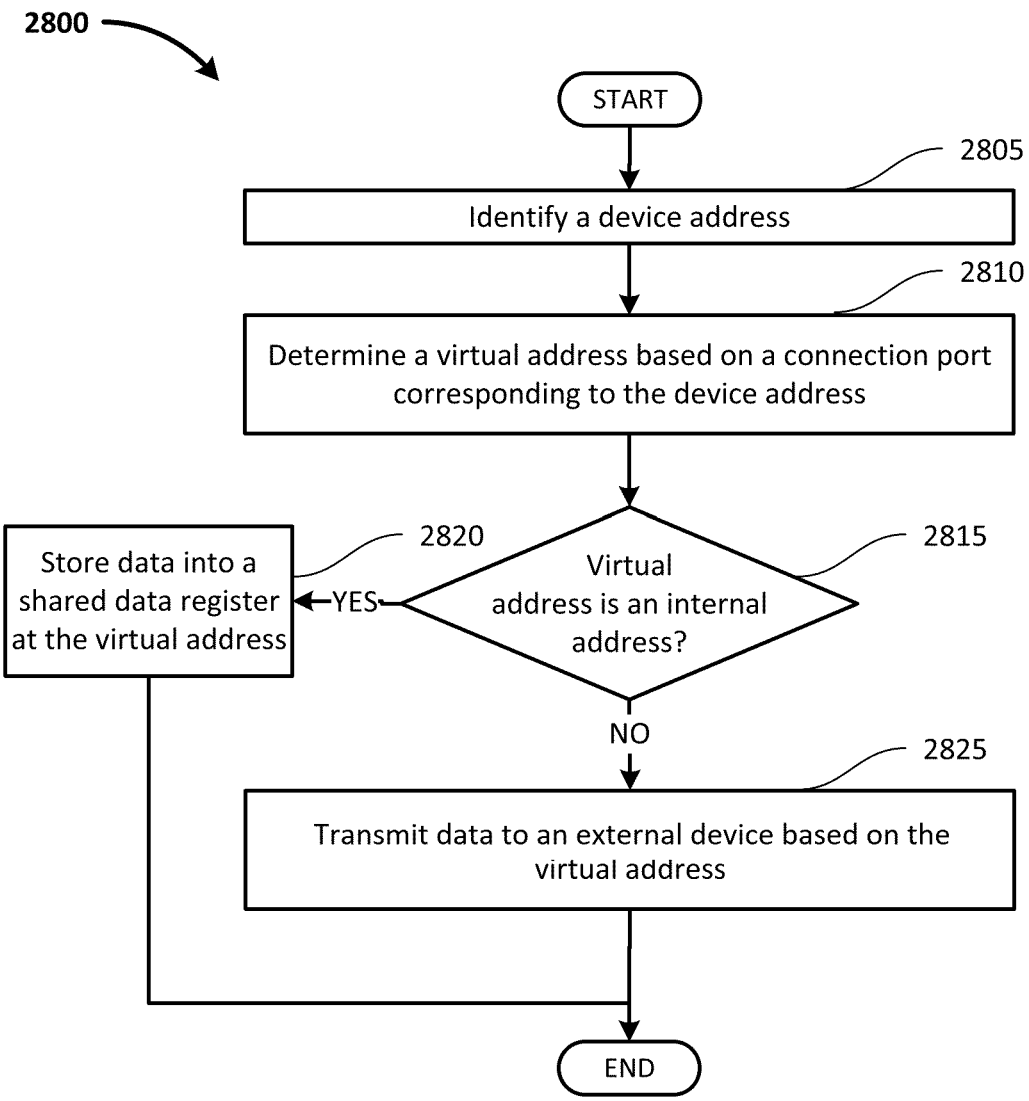
FIG. 28 depicts a flowchart of an exemplary write method of an exemplary DCCH.

FIG. 28 depicts a flowchart of an exemplary write method of an exemplary DCCH. by way of example and not limitation, a method 2800 may be evoked when the step 2535 in the method 2500 is being performed. In this example, the method 2800 begins when a device address is identified in step 2805. For example, the device address may be identified based on a received input signal. The device address, for example, may correspond to an edge device transmitting the input signal. Next, in step 2810, a virtual address is determined based on a connection port corresponding to the device address.

In a decision point 2815, it is determined whether the virtual address is an internal address. For example, the virtual address may reference to an internal device within the system 100. In other examples, the virtual address may reference to an external device. For example, the external device may be communicated via the remote communication gateway 170. If it is determined that the virtual address is an internal address, in step 2820, data is stored into a shared data register at the virtual address, and the method 2800 ends. If it is determined that the virtual address is not an internal address, data is transmitted to an external device based on the virtual address in step 2825, and the method 2800 ends.

In various embodiments, devices (e.g., the edge devices 105, the in-line converters 145, the communication hub 155, the control hub 165, the wireless communication device 160, the remote communication gateway 170) of the system 100 may be addressed by virtual addresses. In some examples, the user-rule engine(s) 1918 may reference to the devices based on the virtual addresses. For example, a user may implement the engine(s) 1918 advantageously without specifying a device address and thereby increase reusability of the user-rule engine(s) 1918 and reduce integration efforts of editing existing code into a new system.

FIG. 29A, FIG. 29B, FIG. 29C, FIG. 29D, FIG. 29E depict a perspective view, a front view, a left side view, and a right side view, and a top plan view of an illustrative DCCHs. As an illustrative example, the control hub 165 may, for example, have a longest length (farthest end of connector to farthest end of connector) of 121.7 mm. A longest width (e.g., farthest end of connector to farthest edge of the body of the hub) may be 63.5 mm, for example. In some examples, the width of the body of the hub may be 50.5 mm. A thickness of the body of the control hub 165 (e.g., excluding the connectors) may, for example, be 16 mm. In some implementations, the thickness of the body of the control hub 165 may have a predetermined relationship to the diameter of the connectors. For example, the hub thickness may be less than or equal to the connector diameter. In some implementations, for example, the hub thickness may be less than or equal to a predetermined multiplier of the connector diameter (e.g., 1.1, 1.2, 1.5, 2).

In some implementations, for example, a spacing between coupling members (depicted as mounting holes) may be 40 mm. A diameter of the mounting holes may be 4.5 mm, for example. The connectors may, for example, be M12×1–6 g/H. The connectors on a long edge may be spaced, for example, substantially evenly apart (e.g., 20 mm apart). The connectors as a group may, for example, be centered on the edge. A single connector on a short edge may, for example, be 32.3 mm from a flat protruding from the body and coupled to a connector on a perpendicular face. Two connectors on a short edge may, for example, be positioned 12.3 mm from a flat on the nearest perpendicular edge. The second connector may, for example, be positioned 32.3 mm from the same flat. Position of connectors may, for example, be on-center.

These illustrative dimensions may, for example, be scalable (e.g., based on ratios and/or distribution of components). Other embodiments may be configured with other dimensions and/or ratios of dimensions. In various embodiments, a control hub 165, a communication hub 155, and/or a dual-port communication hub 156 may advantageously provide a compact housing. The compact form factor may, for example, advantageously save space and/or weight compared to traditional "block" style form factors (e.g., depicted in FIGS. 16A-16B).

In various embodiments, the communication hub 155, the dual-port communication hub 156, and/or the control hub 165 may include overmolded construction. For example, a hub body (e.g., depicted in FIGS. 15A-15B and 16C-17) may be substantially entirely formed by overmolding. For example, the hub body may be of a unitary construction. The hub body may, for example, be continuously formed of at least one material.

In some embodiments the hub body may, for example, be at least partially defined by overmolding of material around one or more circuits and/or associated structures. For example, polymeric material may be molded directly around a circuit(s) to form the body. In some embodiments the polymeric material may be at least partially translucent. For example, in some embodiments a first polymeric material may be molded directly around the circuit. The first polymeric material may have a first optical transparency. A second polymeric material may be molded around at least some of the first polymeric material. The second polymeric material may have a second optical transparency. The first optical transparency may be greater than the second optical transparency. In some embodiments a thickness of the first polymeric material may be greater than a thickness of the second polymeric material. For example, the second polymeric material may be a relatively thin coating over the first polymeric material. The second polymeric material may optically shield the contents of the body from view except when the indicator(s) are active. In some embodiments the second polymeric material may, by way of example and not limitation, be substantially 2 mm or less.

In various embodiments, for example, an overmolded design may bond to electrical connectors (e.g., and associated connections). In various examples, the overmolded design may provide the hub (e.g., the communication hub 155 and/or the control hub 165 a IP65, IP67, and/or IP68 rating).

Figure 29A:
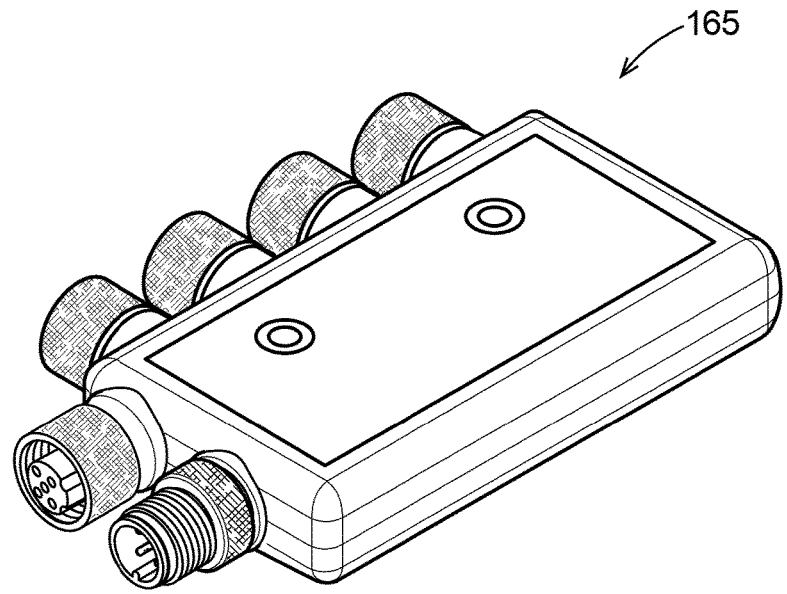
FIG. 29A, FIG. 29B, FIG. 29C, FIG. 29D, and FIG. 29E depict a perspective view, a front view, a left side view, and a right side view, and a top plan view, respectively, of an illustrative DCCH.
Figure 29B:
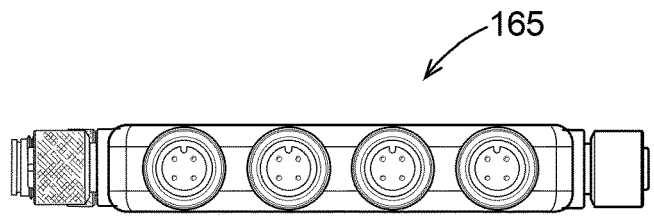
Figures 29C, 29D, 29E:
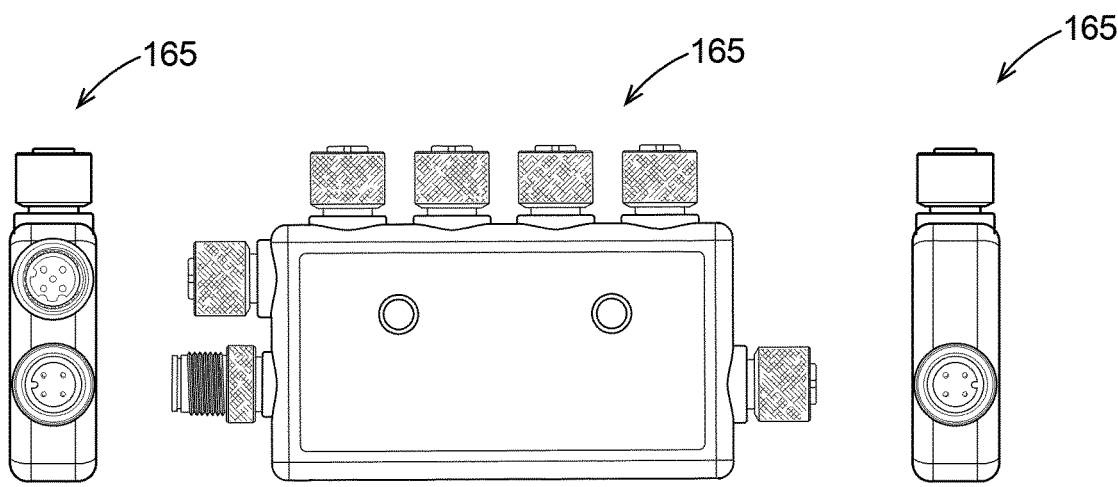
Figure 29H:
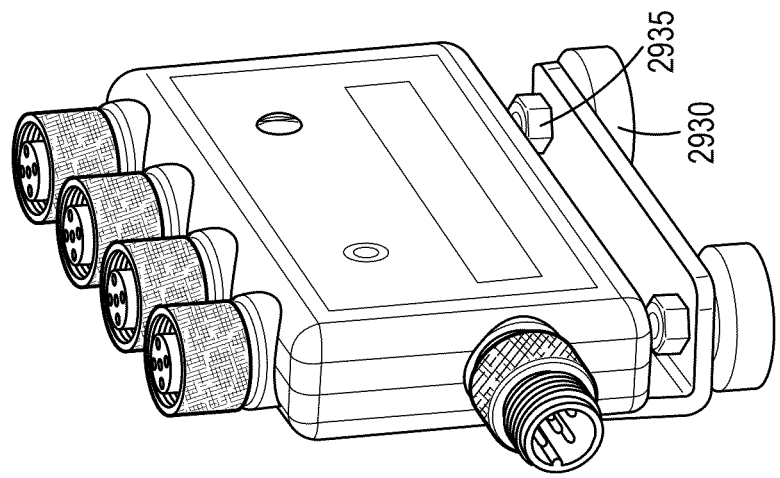
FIG. 29H depicts the mounting bracket of FIG. 29F configured to magnetically mount the DCCH.
Figure 29G:
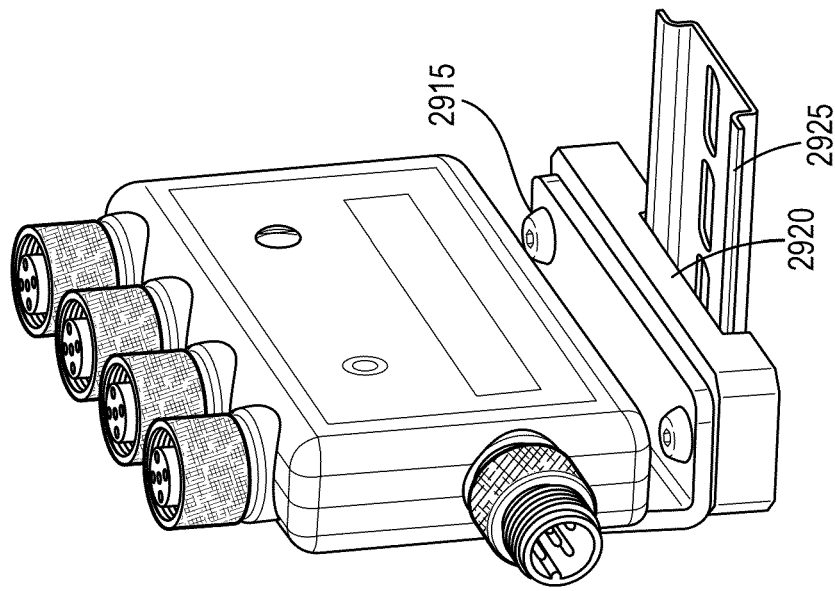
FIG. 29G depicts the mounting bracket of FIG. 29F configured to couple the DCCH to a rail.
Figure 29F:
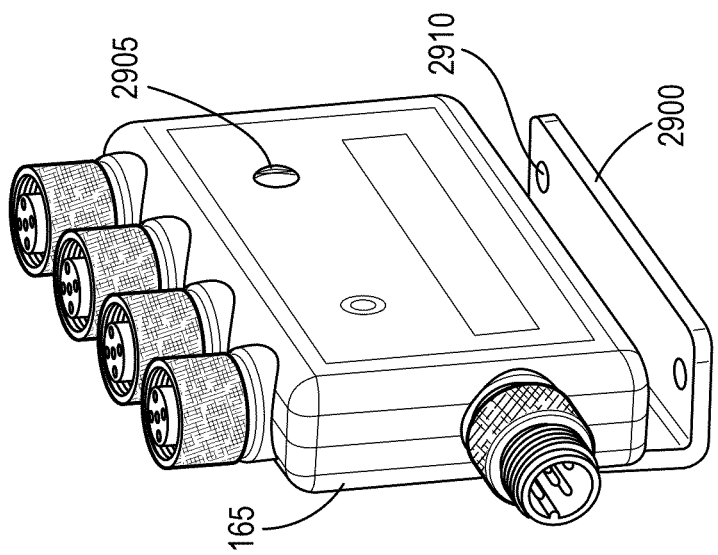
FIG. 29F depicts a perspective view of an exemplary DCCH coupled to a mounting bracket.

FIG. 29F depicts a perspective view of an exemplary DCCH coupled to a mounting bracket. FIG. 29G depicts the mounting bracket of FIG. 29F configured to couple the DCCH to a rail. FIG. 29H depicts the mounting bracket of FIG. 29F configured to magnetically mount the DCCH. The hub 165 is coupled to a bracket 2900. In the depicted example, the bracket 2900 is configured as an edge-mounting bracket (e.g., to mount the hub 165 as if coupled along an edge of the hub 165). A coupler 2905, operated through a coupling member (e.g., through-hole) of the hub 165, couples the hub 165 to the bracket 2900.

The bracket 2900 is provided with coupling members 2910 (e.g., apertures, as depicted). In FIG. 29G, a rail-mounting member 2920 is coupled to the bracket 2900 via coupling members 2915 (e.g., screws, as depicted). The rail-mounting member 2920, in the depicted example, couples (e.g., releasably) the bracket 2900 to a mounting rail 2925 (e.g., a DIN rail). Accordingly, the hub 165 may be releasably coupled to the mounting rail 2925.

In FIG. 29H, magnetic couplers 2930 are coupled to the bracket 2900 via coupling members 2935 (e.g., bolts and nuts, as depicted). The magnetic couplers 2930 may, for example, include a permanent magnet. For example, the permanent magnet may be in a housing (e.g., steel, plastic). In some implementations, the magnetic couplers 2930 may, for example, include electromagnet(s). In some implementations, the magnetic couplers 2930 may, for example, be selectively operable (e.g., movable magnets to control a magnetic field strength at a mounting surface, electromagnetics).

In some implementations, couplers may, for example, be provided using other mounting technology. For example, the bracket 2900 may be provided with hook and/or loop fabric. In some implementations, the bracket 2900 may, for example, be provided with hooks. In some implementations, the bracket 2900 may, for example, be provided with snaps. In some implementations, the bracket 2900 may, for example, be provided with adhesive (e.g., glue, dry adhesive such as setae). In some implementations, the bracket 2900 may, for example, be configured as a support stand (e.g., having support feet). By way of example and not limitation, in some embodiments, brackets other than the bracket 2900 (e.g., 3015, 3300) may be configured to couple a communication hub and/or other communication device (e.g., converter, actuator, indicator, input device, sensor) to a surface and/or device with one or more mounting technologies as disclosed at least with reference to FIGS. 29F-29H.

Figure 30:
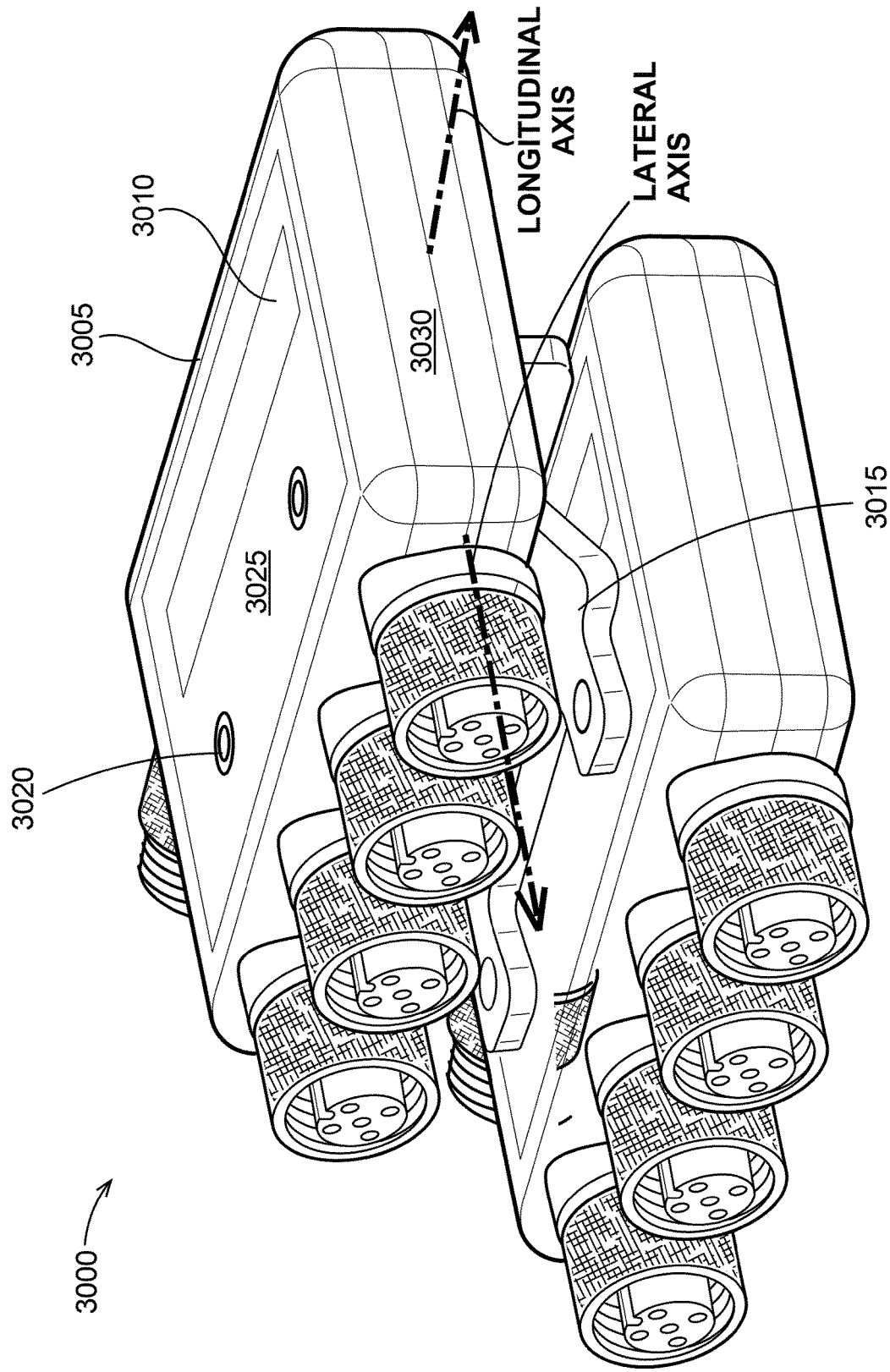
FIG. 30 depicts an exemplary stackable DCCH in an illustrative stacked use-case scenario.
Figure 33C:
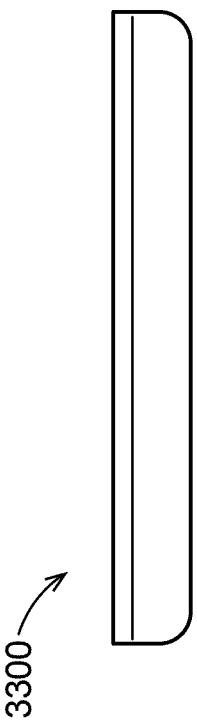
FIG. 33A, FIG. 33B, FIG. 33C, and FIG. 33D depict an exemplary DCCH stacking bracket.
Figure 33D:
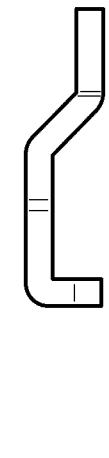
Figure 33A:
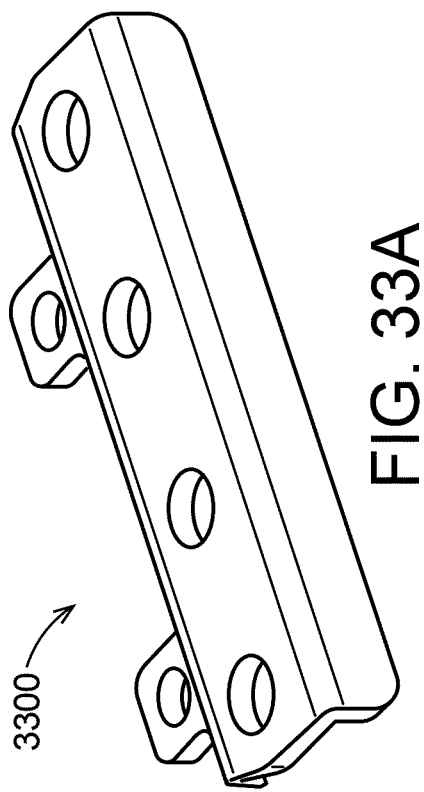
Figure 33B:
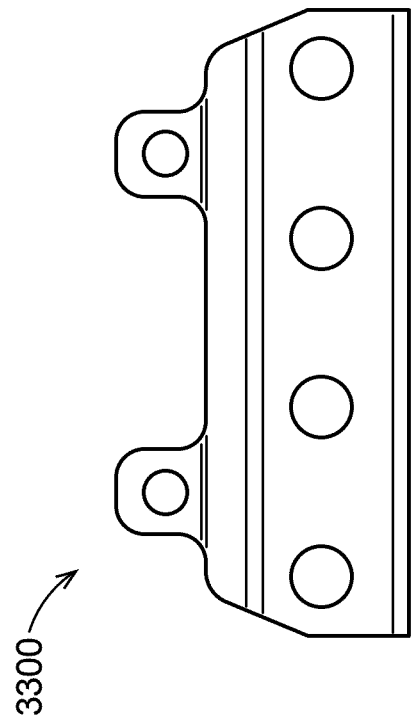
Figure 34:
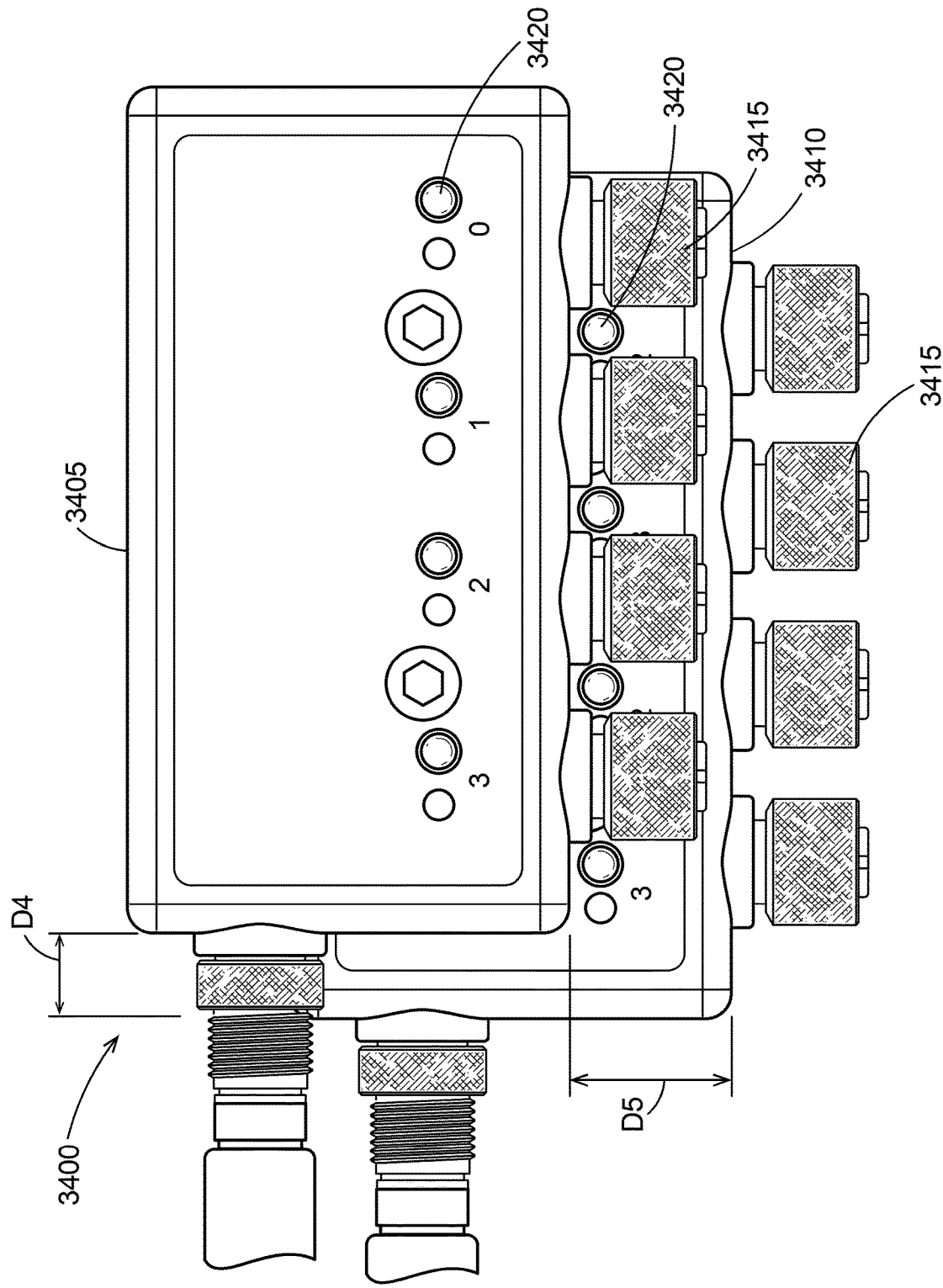
FIG. 34 and FIG. 35 depict an exemplary stackable DCCH in an illustrative offset-stacked use-case scenario.
Figure 35:
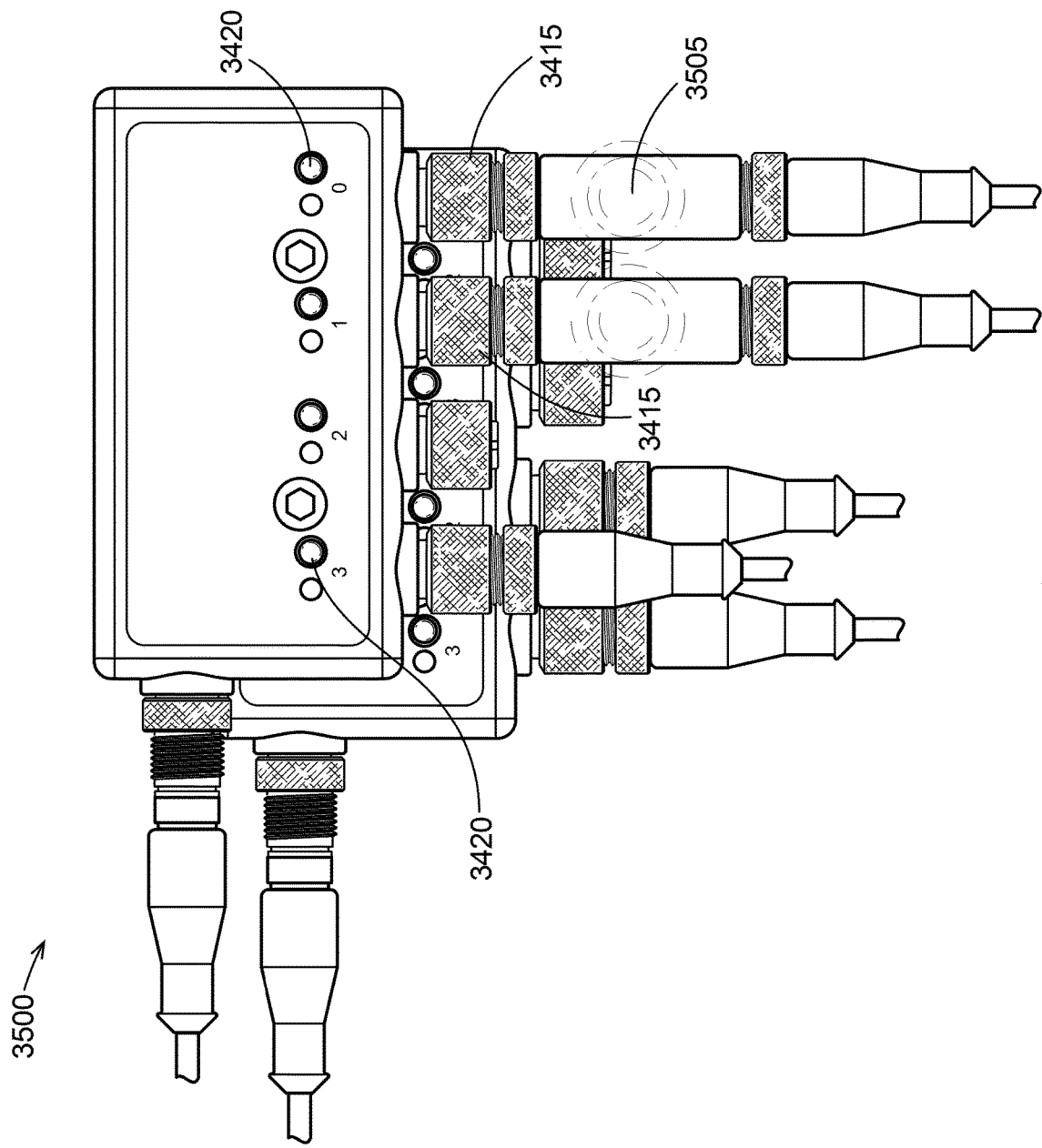

FIG. 30 depicts an exemplary stackable DCCH in an illustrative stacked use-case scenario. FIG. 31A, FIG. 31B, FIG. 32A, FIG. 32B, FIG. 32C, and FIG. 32D depict exemplary DCCH stacking brackets such as depicted in FIG. 30. FIG. 33A, FIG. 33B, FIG. 33C, and FIG. 33D depicts an exemplary DCCH stacking bracket. FIG. 34 and FIG. 35 depict an exemplary stackable DCCH in an illustrative offset-stacked use-case scenario.

As shown in FIG. 30, in a stacking scenario 3000, a hub 3005 (e.g., configured such as disclosed at least with reference to communication hub 155) is provided with a display 3010 (e.g., visual display, digital display, liquid-crystal display (LCD), LED status indicators). The hub 3005 is provided with (two) apertures 3020 on a top face 3025. The apertures 3020 may, for example, advantageously provide mounting point(s) for the hub 3005. A first hub 3005 and a second hub 3005 are mounted to each other, by a bracket 3015, on faces parallel to a plane defined by a longitudinal axis and a lateral axis of the hub 3005. Various ports are provided on edge faces 3030 of the hub 3005. In various embodiments, the top face 3025 may extend on a plane intersecting the edge face 3030. For example, the edge face 3030 may be at a peripheral of the hub 3005. In some implementations, the top face 3025 may include at least one visual indicium configured to indicate a connection status of the connection ports. For example, the connectors may be evenly distributed on the edge surface (edge face 3030).

Figure 31B:
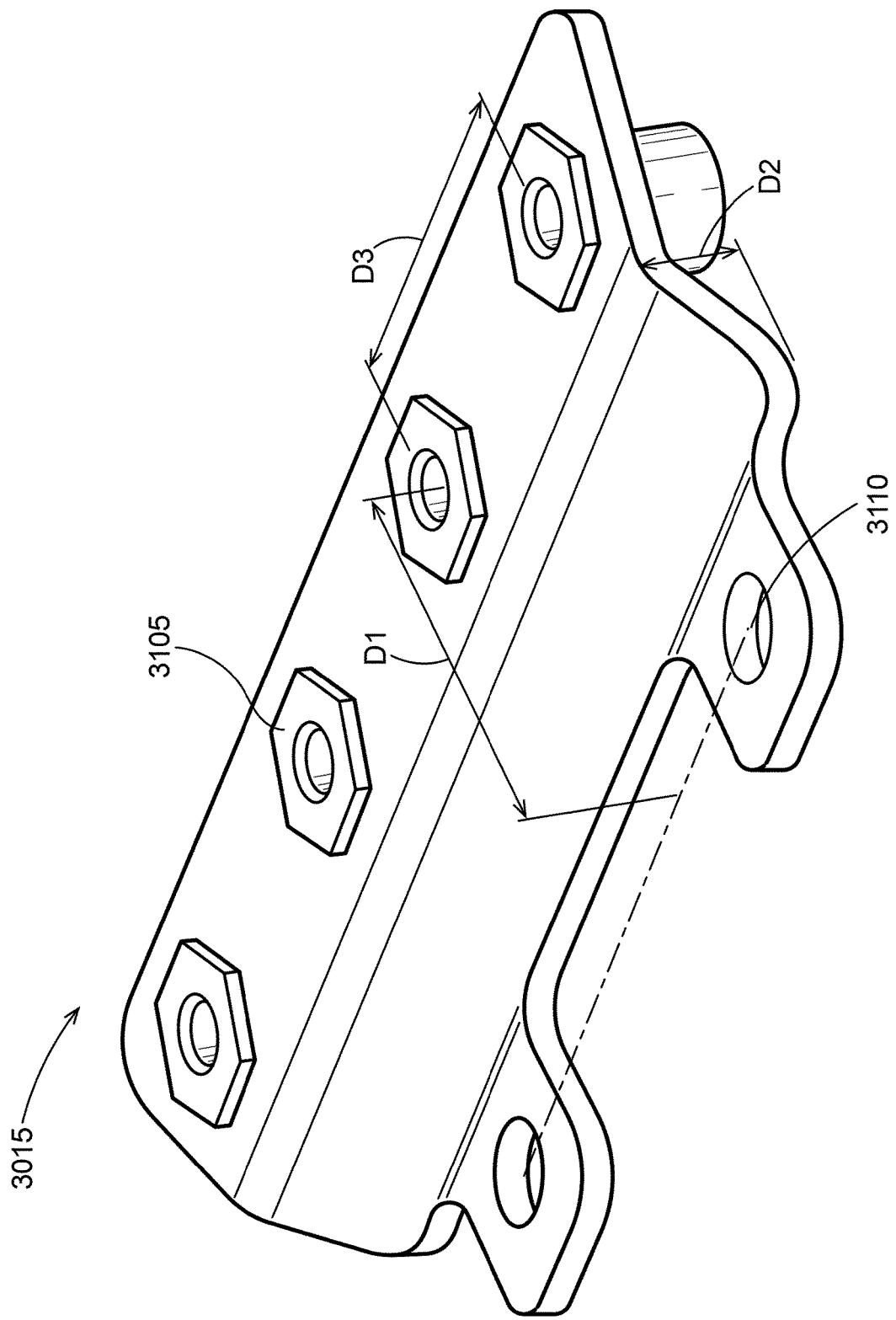
FIG. 31A, FIG. 31B, FIG. 32A, FIG. 32B, FIG. 32C, and FIG. 32D depict exemplary DCCH stacking brackets such as depicted in FIG. 30.

The bracket 3015, as depicted in FIG. 31B, includes coupling elements (holes 3105) in a first mounting plate and coupling elements (holes 3110) in a mounting second plate. For example, the first and the second mounting plates may be extending in a same direction in respective parallel planes. In this example, the bracket 3015 offsets the units in at least two directions. It raises a second unit up vertically (e.g., by a distance D2 determined by a vertical distance between the first plate and the second plate), while also offsetting it horizontally (e.g., along the lateral axis by a distance D1). The bracket 3015 may, for example, be oriented in either direction to offset the hub 3005 distally (towards the arrow) and/or proximally (away from the arrow) along the lateral axis.

In some implementations, when the first mounting plate releasably couples the hub 3005 and the second mounting plate releasably couples to a second hub similar to the hub 3005, the hubs are fixedly held at respective horizontal planes that are substantially parallel. For example, the hub 3005 may be offset from the second hub in at least two directions. For example, in a first direction, the respective horizontal planes are offset along a vertical axis by D2. For example, in a second direction, the hub 3005 and the second hub are offset by D1. For example, connection status of multiple connection port on the edge face 3030 may be visible in at least one viewing angle along the vertical axis.

In various embodiments, the configuration of the hub 3005 and/or bracket 3015 may, for example, advantageously enable a method of stacking multiport input/output (I/O) blocks in a small footprint while still allowing users to monitor the visual status of each port. I/O blocks may, by way of example and not limitation, be configured for various communication protocols. Communication protocols may, for example, include IO-Link. Communication protocols may, for example, include Ethernet, EtherCat, or some combination thereof. Communication protocols may, for example, include one or more Modbus protocols. Communication protocols may, for example, include discrete I/O.

A visual status may, for example, be visually indicated by an LED(s) (not shown) showing port status. A visual status may, for example, be indicated by the display 3010. Status may, by way of example and not limitation, correspond to power, output, and/or health of a device connected to a port. Connected devices may include, by way of example and not limitation, various sensors such as photoelectric sensors and/or electronic sensors. Connected devices may, for example, include actuators (e.g., electric motor actuators, pneumatic valves). Visual status may, by way of example and not limitation, signify that a connected device has power. Visual status may, for example, signify whether a sensor output is activated. Visual status may, for example, signal health of a device. For example, the hub 3005 may determine if a device is actually connected to the port and generate a corresponding visual status indication. Visual status signals may, for example, advantageously enable monitoring and/or troubleshooting of automation systems and/or networks.

Offset mounting may, for example, advantageously make physical connectivity of the ports easier. For example, offset mounting of stacked hubs may maximize spacing between connection points.

As depicted, the bracket 3015 includes two through holes 3110 (e.g., configured to receive threaded fasteners for mounting to a first hub 3005). The bracket 3015 includes four (threaded) holes 3105. The holes 3105 may, for example, be configured as drilled/tapped holes in the material of the bracket 3015. As depicted, the holes 3105 may be configured as pressed-in threaded inserts. These threaded inserts may, for example, advantageously make assembly easier by providing a lead-in for the fastener. The threaded inserts can have added length to provide more threads. The threaded inserts may, for example, be sized to match a height offset for stability. The multiple holes 3105 may, for example, allow offsetting of an upper hub 3005 along the longitudinal axis in a third direction by a distance D3 (e.g., coupling the hub 3005 to the hub 3005 via a left pair of holes 3105 or in a right pair of holes 3105).

Figure 31A:
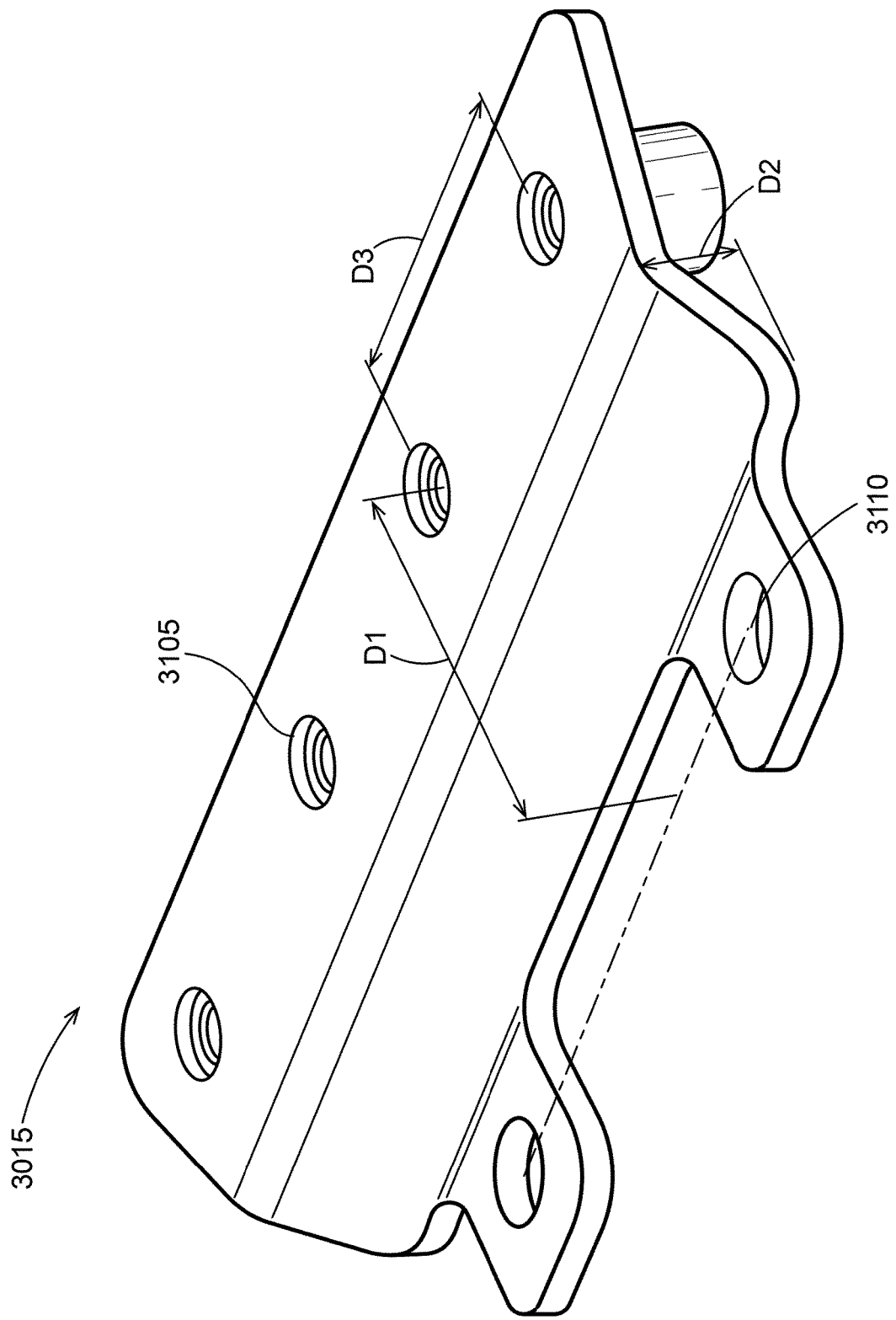
Figure 32A:
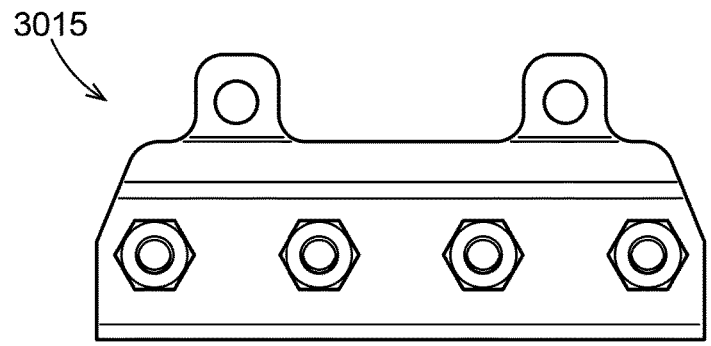
Figure 32B:
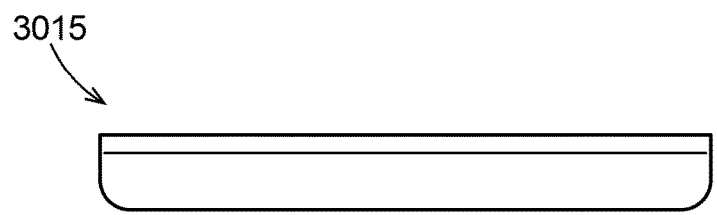
Figure 32D:
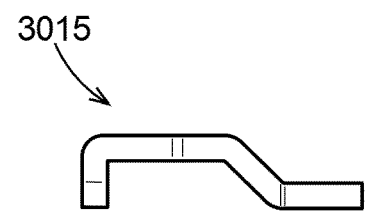
Figure 32C:
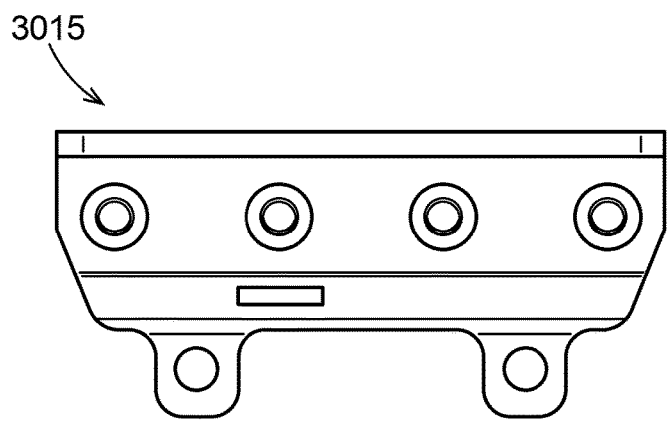

The bracket 3015 depicted in FIG. 31A may, for example, be configured and/or used as disclosed at least with reference to FIG. 31B, with different inserts assembled to the holes 3110. For example, the inserts may be press-fit. The inserts may, for example, be threaded. The inserts may, for example, have a smooth inner aperture (e.g., configured as a cylindrical spacer). The inserts may, for example, not include the hex head as shown in FIG. 31B. In some implementations, the bracket 3015 shown in FIG. 31A and/or FIG. 31B may be configured to have a support lip, such as shown in FIGS. 32A-33D.

As shown in FIGS. 33A-33D, a second bracket 3300 may, for example, be configured such as disclosed with respect to at least FIG. 30. As depicted, the second bracket 3300 does not include threaded inserts. In some embodiments, a fastener (e.g., nut and bolt, rivet, fir-tree fastener) may couple a hub to the second bracket 3300. The second bracket 3300 may, for example, offset two stacked hubs in a vertical axis, longitudinal axis, and/or lateral axis.

As an illustrative example, the two depicted lower through holes (e.g., for mounting the first hub) may be 5 mm in diameter. The lower holes may, for example, be 40 mm apart (e.g., on-center). The corresponding tabs may, for example, be 12 mm wide. The tabs may, for example, protrude outward by 10.07 mm. The four depicted upper through holes may, for example, be 7.14 mm in diameter. The upper holes may, for example, be evenly distributed. For example, the upper holes may be spaced 20 mm apart (e.g., on-center). One or both of the outer holes of the upper holes may be spaced 7 mm from the edge of the bracket, for example. The row of lower holes may, for example, be spaced 18.5 mm from the row of upper holes (e.g., on-center). The upper holes and lower holes may be offset (e.g., side-to-side as seen in FIG. 33B) from each other by half of the spacing of the upper holes (e.g., 10 mm). The bracket may, for example, be 8.6 mm high.

These illustrative dimensions may, for example, be scalable (e.g., based on ratios and/or distribution of components). Other embodiments may be configured with other dimensions and/or ratios of dimensions.

As shown in FIG. 34, an illustrative scenario 3400 depicts an upper hub 3405 and a lower hub 3410 being stacked with power applied. For example, the upper hub 3405 and/or the lower hub 3410 may be the control hub 165. For example, the upper hub 3405 and/or the lower hub 3410 may be the communication hub 155. In the depicted example, the upper hub 3405 and the lower hub 3410 are offset vertically, laterally (by a distance D5), and longitudinally (by a distance D4). As depicted, LEDs 3420 from all 8 ports 3415 can be seen when looking straight as well as various angles. In some implementations, D4 may be configured as a function of a distance between adjacent connection ports of the hub 3005. For example, D4 may be half of the distance between adjacent connection ports of the hub 3005.

An illustrative scenario 3500 is shown in FIG. 35. In the scenario 3500, the upper hub 3405 and the lower hub 3410 stacked with accessories connected. As depicted, in-line connectors 3505 (e.g., configured as disclosed at least with reference to the in-line converters 145 having the status indicators 630) are coupled to two of the ports 3415. In the depicted example, in addition to the LEDs 3420, the in-line connectors 3505 are also viewable because of the offset. In some embodiments, the three cord-sets on the left may, for example, be configured as illuminated cord-sets and they would advantageously be easily viewable as well.

Figure 36:
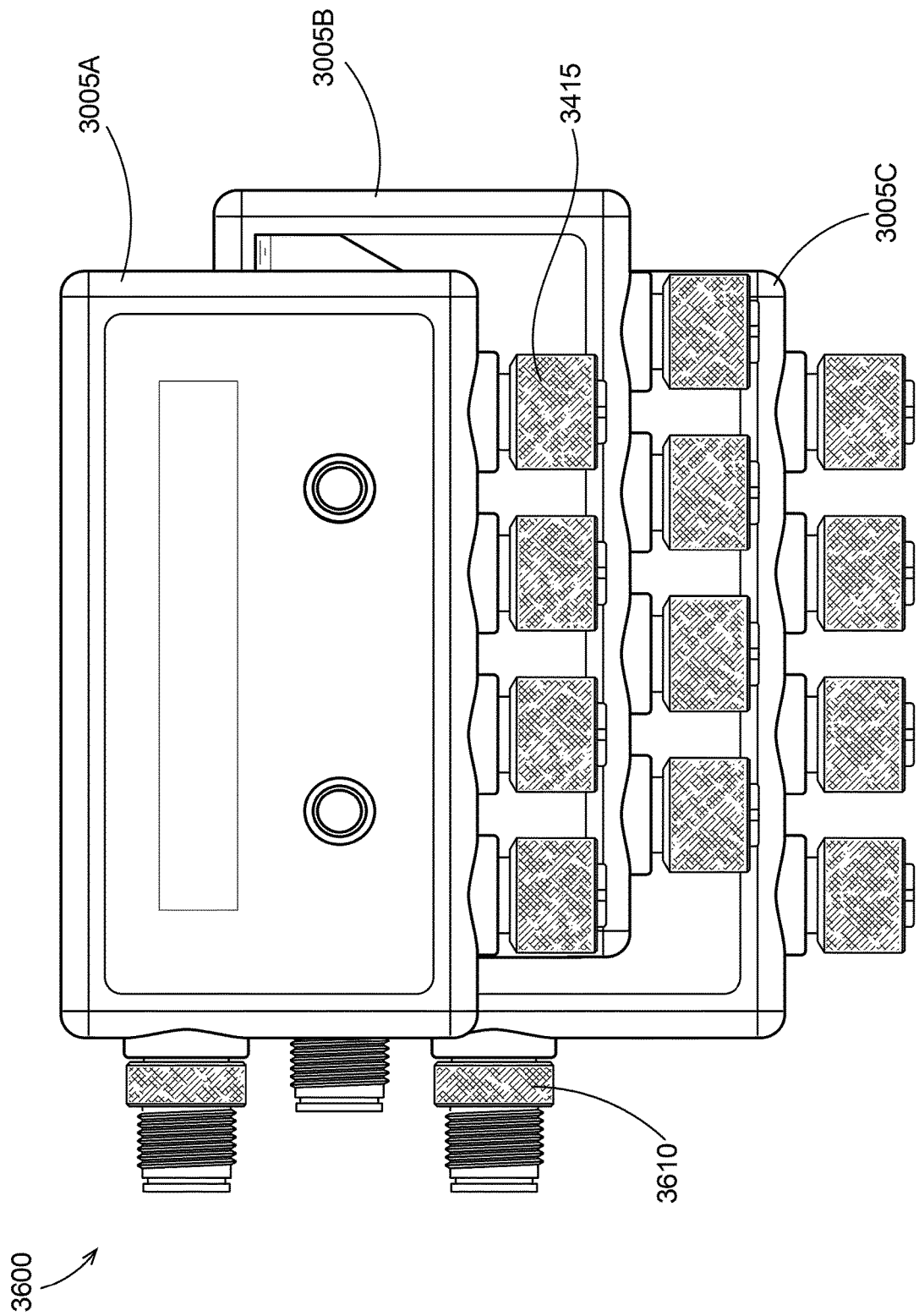
FIG. 36, FIG. 37A, and FIG. 37B depict exemplary stackable communication hubs in an illustrative alternating-offset stacked used-case scenario.
Figure 37A:
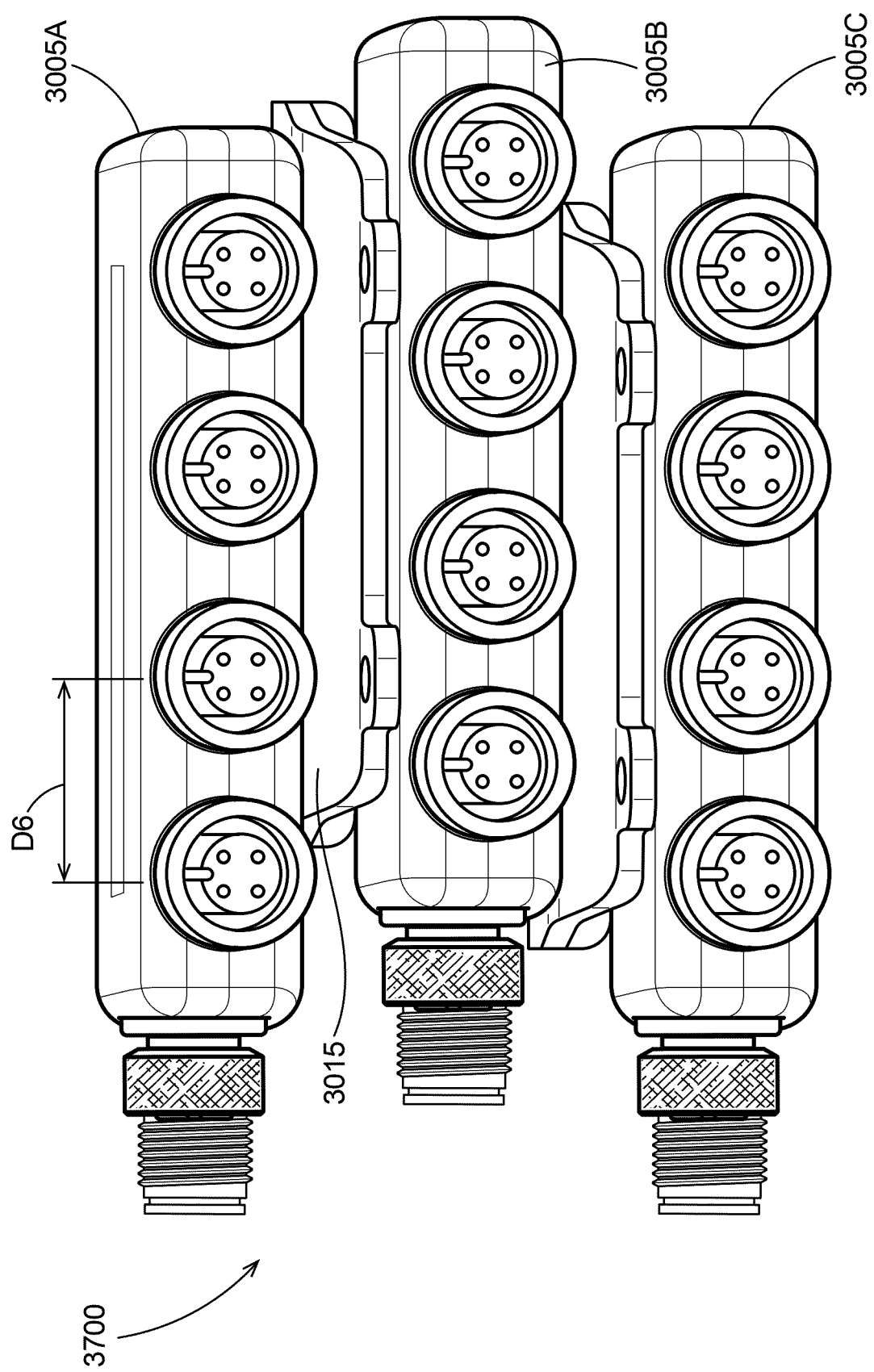
Figure 37B:
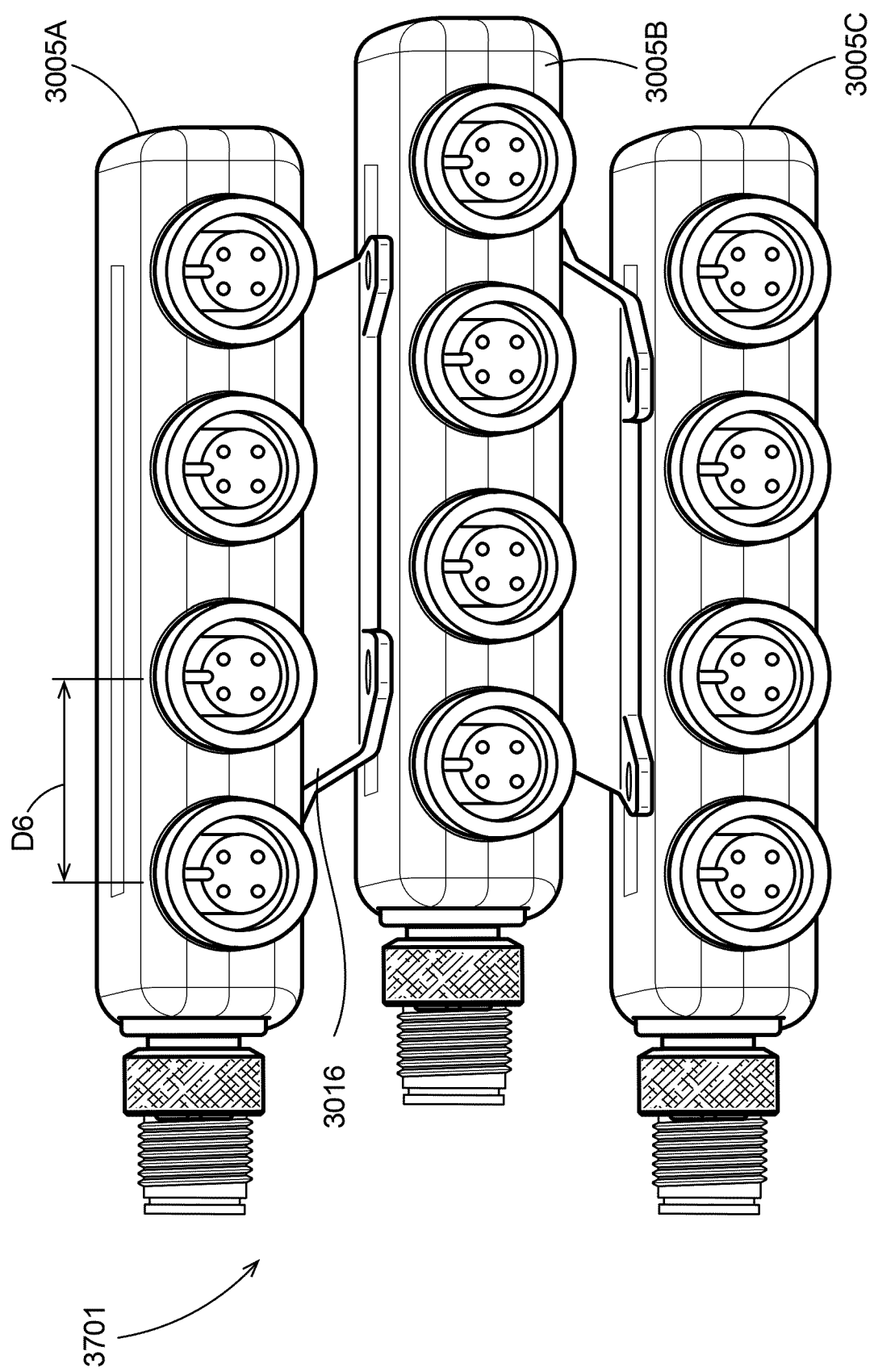

FIG. 36, FIG. 37A, and FIG. 37B depict exemplary stackable communication hubs (e.g., the communication hub 155) in an illustrative alternating-offset stacked used-case scenario. An exemplary scenario 3600 (and corresponding side view 3700) depicts three units (upper unit 3005A, middle unit 3005B, and lower unit 3005C) stacked alternating right and then left. Additional units may, for example, be stacked and alternated as necessary (e.g., to conserve space). The three units are stacked together in an alternating pattern. As depicted, an offset distance in all three directions may, for example, be substantially ½ of a connector to connector spacing (D6). Such embodiments may, for example, advantageously maximize spacing (e.g., to advantageously help with physical connection of cables). In various implementations, the ports 3415 and ports 3610 of the three units 3005A-C may advantageously be distinctly viewable because of D6 and offsets introduced by the bracket 3015.

FIG. 37B shows another side view 3710 having brackets 3016. The brackets 3016 may, for example, have a left-handed version and a right-handed version, as depicted. The handedness may be selected (e.g., alternated as depicted), to create a desired offset orientation.

FIG. 38, FIG. 39, FIG. 40, FIG. 41, and FIG. 42 depict exemplary distributed communication and control systems in illustrative use-case scenarios.

Figure 38:
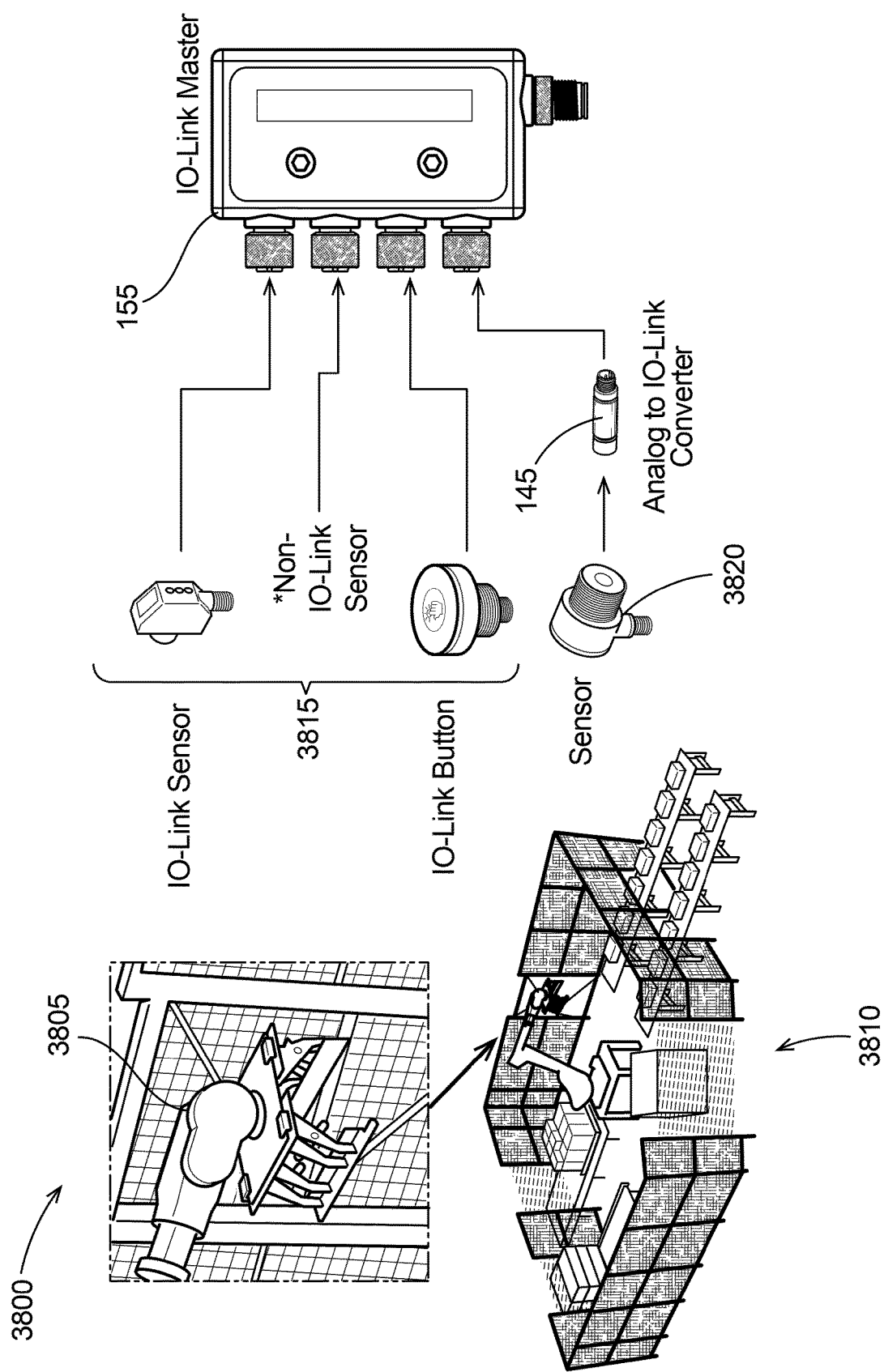
FIG. 38, FIG. 39, FIG. 40, FIG. 41, and FIG. 42 depict exemplary distributed communication and control systems in illustrative use-case scenarios.

As shown in FIG. 38, a system 3800 includes a robotic arm 3805 in a work cell 3810. A communication hub 155 is coupled to multiple IO-Link edge devices 3815 (e.g., an IO-link sensor, a non-IO-Link sensor, an IO-Link button). The communication hub 155 is further coupled to a non-IO-link sensor 3820 (e.g., analog sensor) by an in-line converter 145 (e.g., analog ←→ IO-Link).

Figure 39:
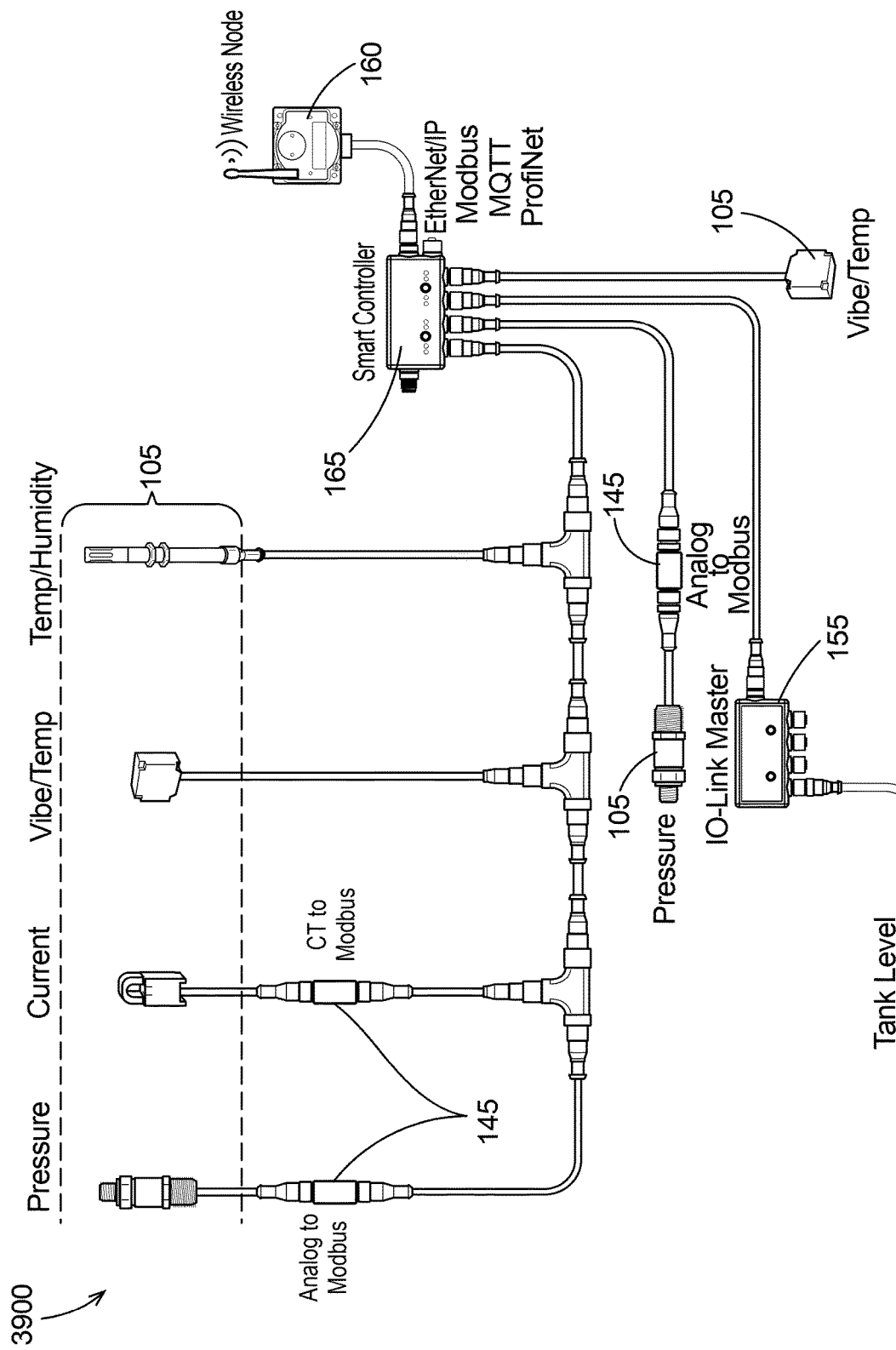

As shown in FIG. 39, a system 3900 includes multiple edge devices 105 coupled to a control hub 165. Some non-IO-link edge devices 105 are coupled to the control hub 165 via corresponding in-line converters 145. An (IO-Link) edge device 105 is coupled to a communication hub 155. The communication hub 155 is coupled to the control hub 165. The control hub 165 is coupled to a wireless communication device 160. For example, the control hub 165 may be connected to the remote communication gateway 170 via the wireless communication device 160. For example, the control hub 165 may be connected to the cloud network 175 via the wireless communication device 160. For example, the control hub 165 may be connected to the one or more visualization devices 180 via the wireless communication device 160.

The system 3900 may, for example, correspond to a condition monitoring application. The system 3900 may, for example, advantageously blend wired and wireless architecture. Various components (e.g., the control hub 165, the communication hub 155, the in-line converters 145) may advantageously enable monitoring (substantially) any device (e.g., using the in-line converters 145). The system 3900 may, for example, advantageously be simple to expand. Signals and/or resulting data may, for example, be shared with a local control system(s). Data may, for example, be pushed (e.g., by the control hub 165 and wireless communication device 160) to a dashboard(s) to advantageously visualize data.

The system 3900 may, for example, correspond to a condition monitoring application. Signals and/or resulting data may, for example, be shared with a local control system(s). Data may, for example, be pushed (e.g., by the control hub 165 and wireless communication device 160) to a dashboard(s) to advantageously visualize data.

Figure 40:
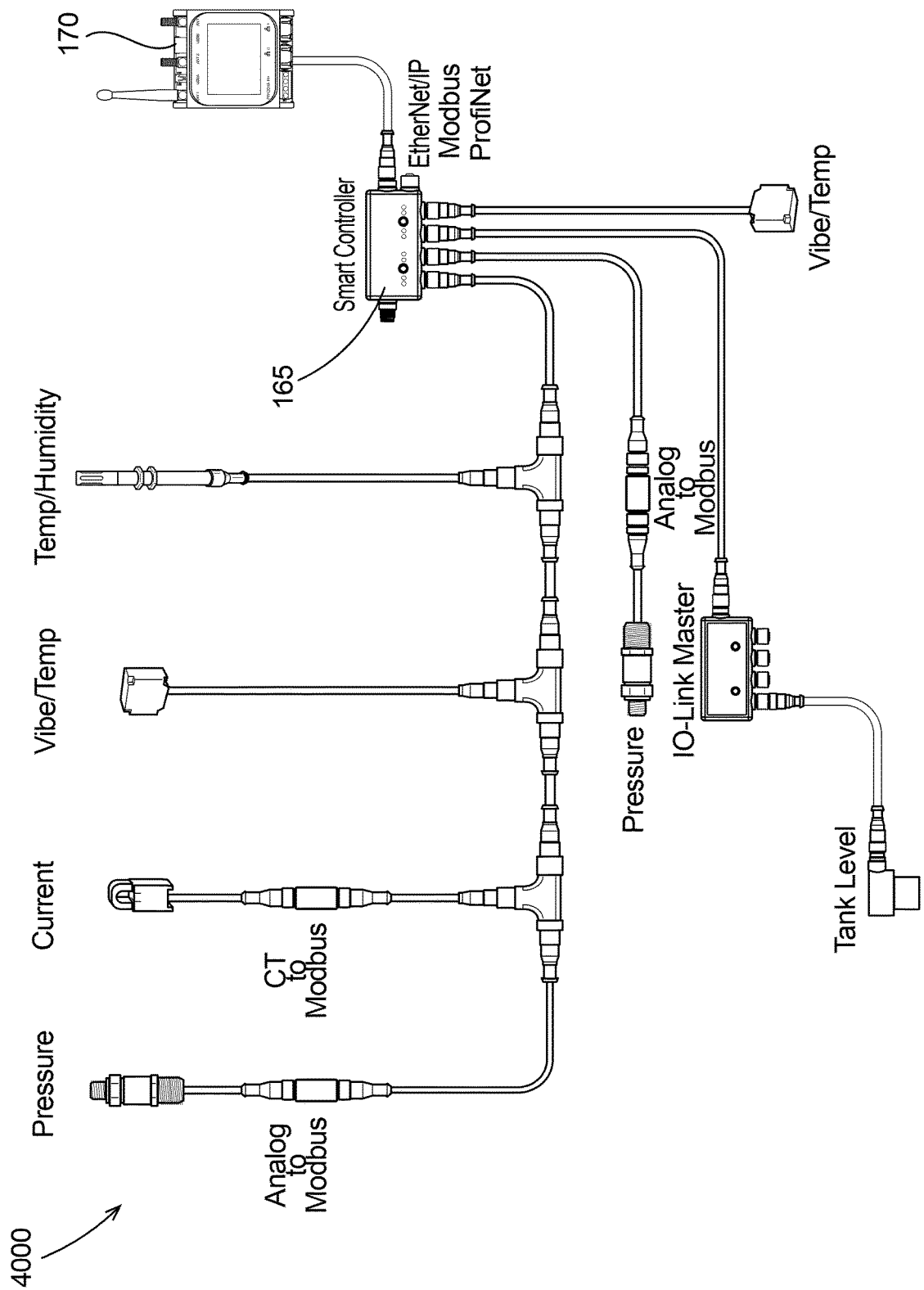

As shown in FIG. 40, a system 4000 may be configured having edge devices, converters, connector hubs, communication hub, and a control hub 165, such as shown FIG. 39. In the depicted example in the system 4000, the control hub 165 is connected to a remote communication gateway 170. The remote communication gateway 170 may, for example, communicate with a remote (e.g., cloud) data transmission, processing, viewing, and/or storage system(s).

Figure 41:
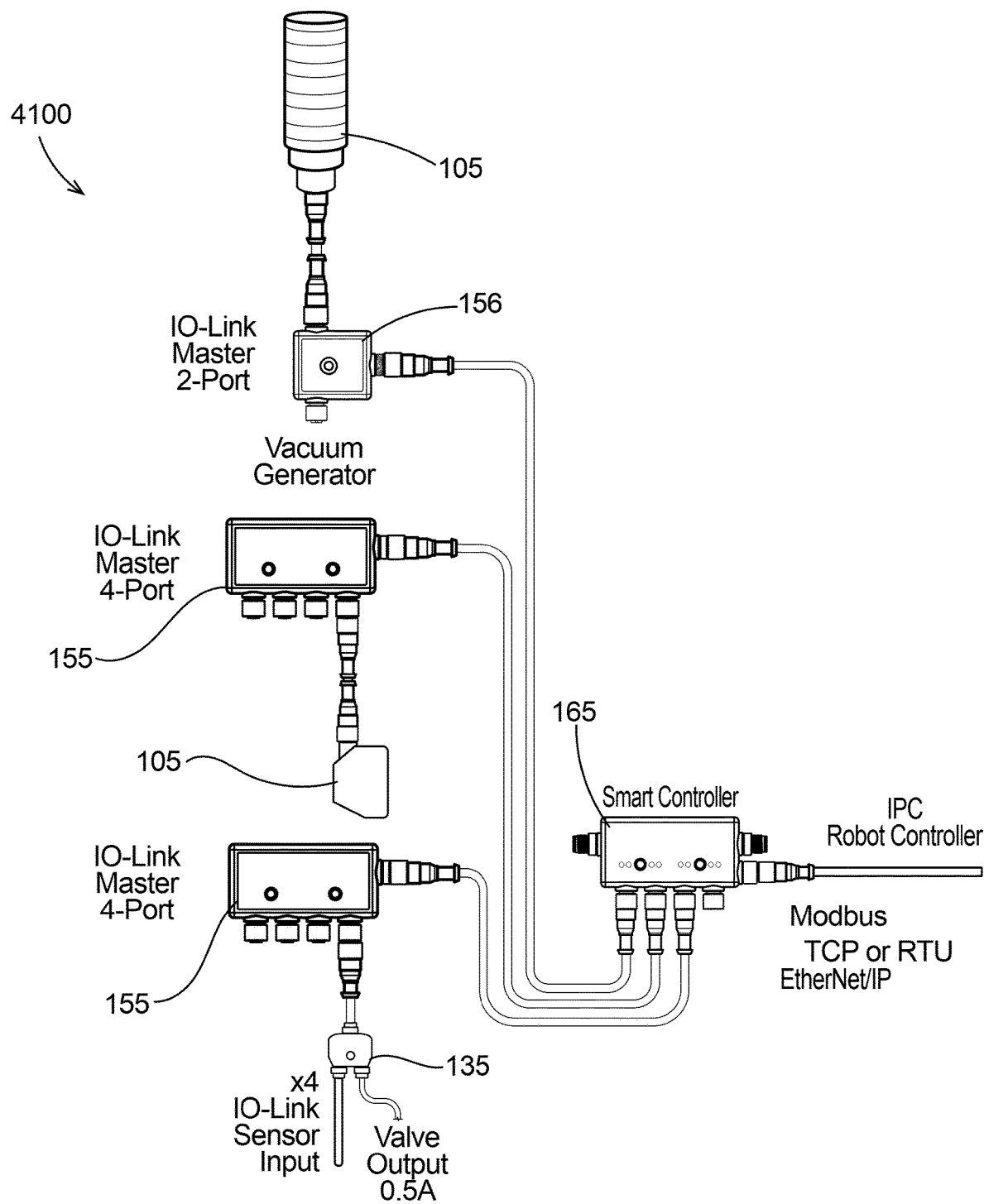

As shown in FIG. 41, a system 4100 includes an edge device 105 coupled to a dual-port communication hub 156. The dual-port communication hub 156 is coupled to a control hub 165. An edge device 105 is coupled to a communication hub 155. A multi-branch connector 135 is coupled to a second communication hub 155. Both of the communication hubs 155 are coupled to the control hub 165. The control hub 165 may, for example, be coupled to an IPC robot controller. The system 4100 may, for example, correspond to an IO-Link to EtherNet/IP configuration. In an illustrative example, the control hub 165, depicted in this example as a DXM R90x, may be configured to operate as a Modbus Master controller, which may share, in some embodiments, some similarity with the IO Link Master.

Figure 42:
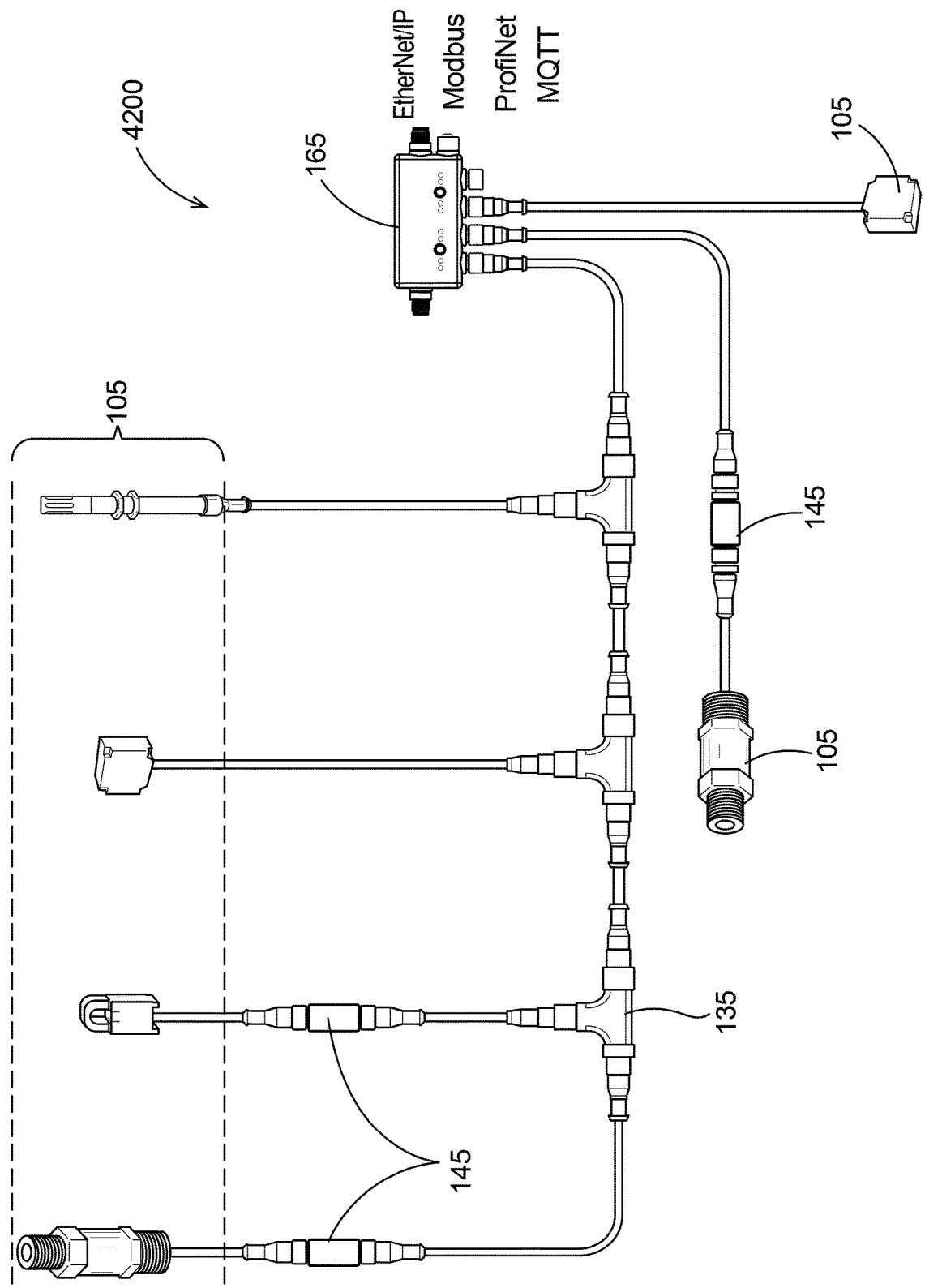

As shown in FIG. 42, a system 4200 includes multiple edge devices 105 coupled to a control hub 165 (e.g., some by corresponding in-line converters 145, some directly, some via multi-branch connectors 135, as depicted). The system 4200 may, for example, correspond to a smart controller application. The system 4200 may, for example, implement various components (e.g., the in-line converters 145, the control hub 165) as an alternative to wireless condition monitoring. Various components (e.g., the in-line converters 145, the control hub 165) may advantageously aggregate sensor information from multiple locations.

The control hub 165 may, for example, offer scripting and/or programming (e.g., via profile(s) 1918a stored on the memory module 1915 and executed by the processor 1820 according to corresponding engine(s) 1918).

The control hub 165 may, for example, advantageously enable use of industrial ethernet and/or MQTT to get data to where a user needs it.

Figure 43:
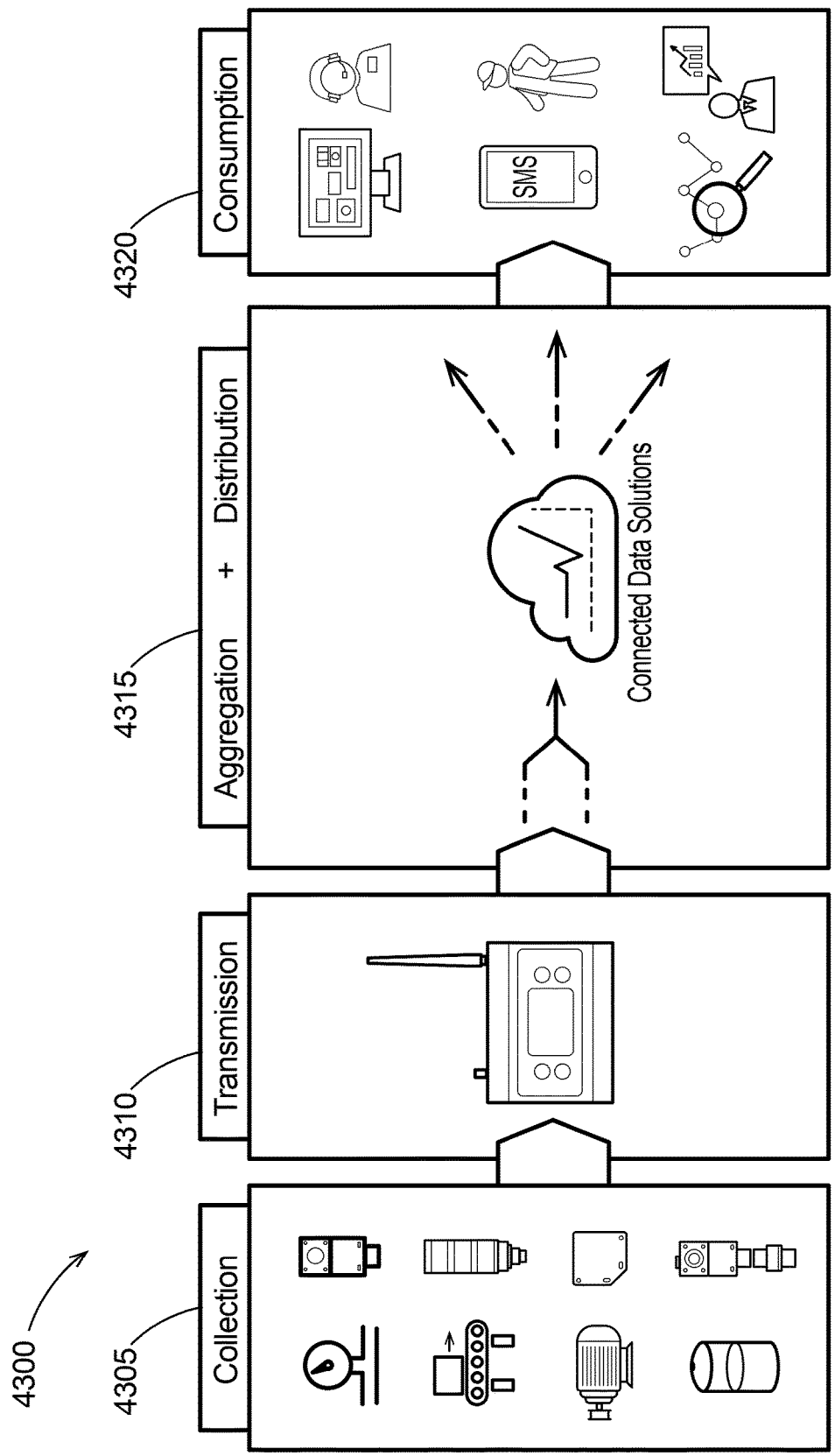
FIG. 43 depicts an exemplary distributed communication and control architecture with remote communication.

FIG. 43 depicts an exemplary distributed communication and control architecture 4300 with remote communication. In this example, in a facility (e.g., a manufacturing facility) various edge devices (e.g., the edge devices 105) in a collection layer 4305 may be configured to provide data (e.g., measurement data, process flow data, environmental data) to a transmission layer 4310. The transmission layer 4310 (e.g., by the remote communication gateway 170) transmits the collected data to an aggregation and distribution layer 4315. For example, the aggregation and distribution layer 4315 may include various cloud services (e.g., in the cloud network 175). At a consumption layer 4320, various users (e.g., analysis, manager, worker) may access the aggregated data to perform, for example, analysis and decision making for the facility.

Figure 44:
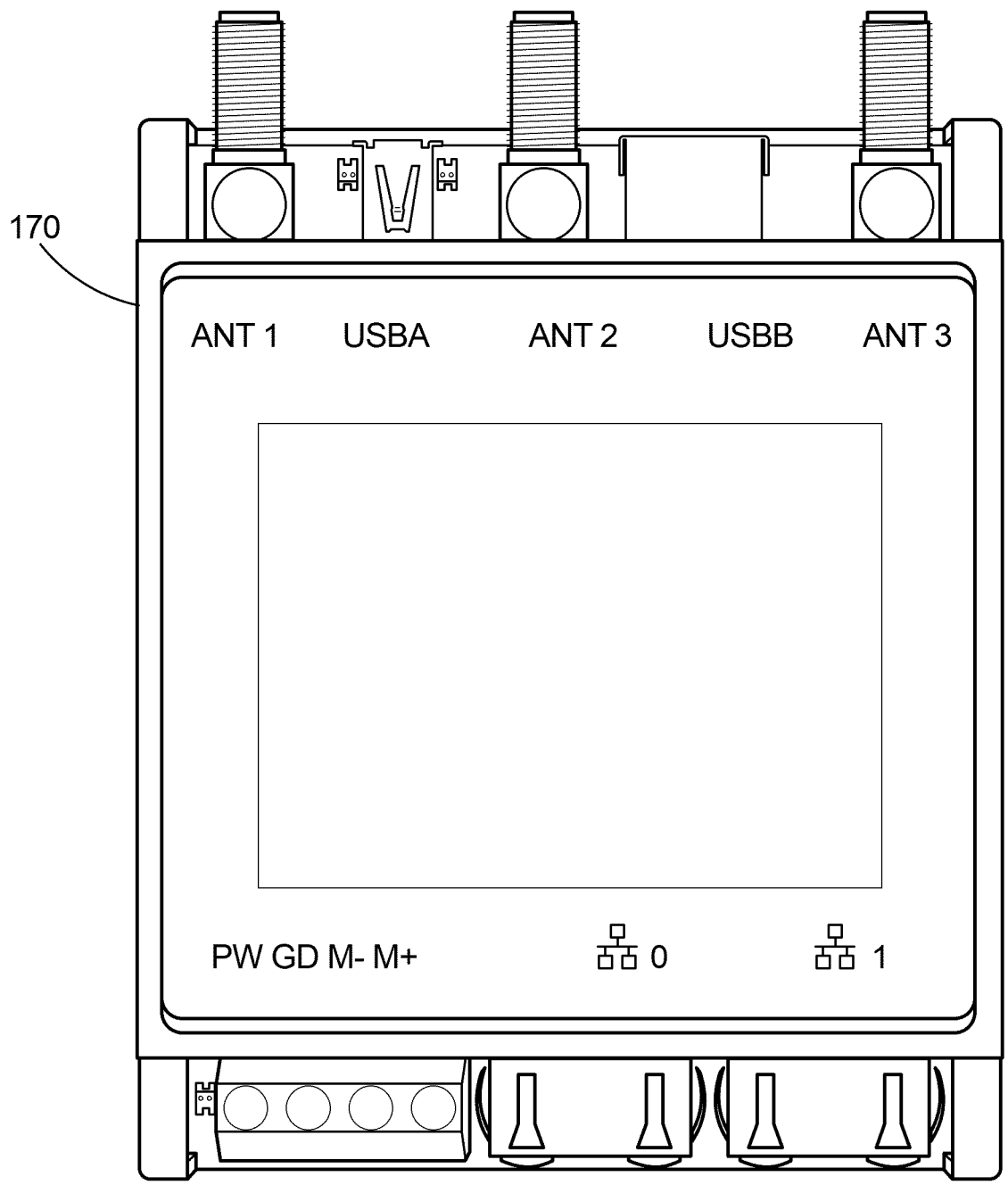
FIG. 44 depicts an exemplary remote communication gateway.

FIG. 44 depicts an exemplary remote communication gateway. In some embodiments, the remote communication gateway 170 may advantageously provide flexibility for data integration. The remote communication gateway 170 may, for example, be provided with a Linux operating system (OS). The OS may, for example, advantageously be easily configured to client specific data infrastructure. For example, the OS of the remote communication gateway 170 may advantageously accept configuration to various cloud infrastructures (e.g., third-party cloud systems). The remote communication gateway 170 may, for example, be customized to interact with custom application programming interfaces (APIs).

Various embodiments may advantageously allow users to write their own computation using popular modern programming languages in custom containers.

In various embodiments, the remote communication gateway 170 may advantageously provide flexibility and customization beyond an inbuilt platform or proprietary components.

For example, in some embodiments, the Linux OS may be configured to run one or more third-party software packages. Such software packages may, for example, implement Internet of Things (IoT) core and/or analytics tools directly on the remote communication gateway 170. Such embodiments may advantageously reduce communication costs (e.g., over cellular networks). Such embodiments may, for example, advantageously reduce processing costs in the cloud (e.g., by performing at least some processing directly on the remote communication gateway 170).

Figure 45:
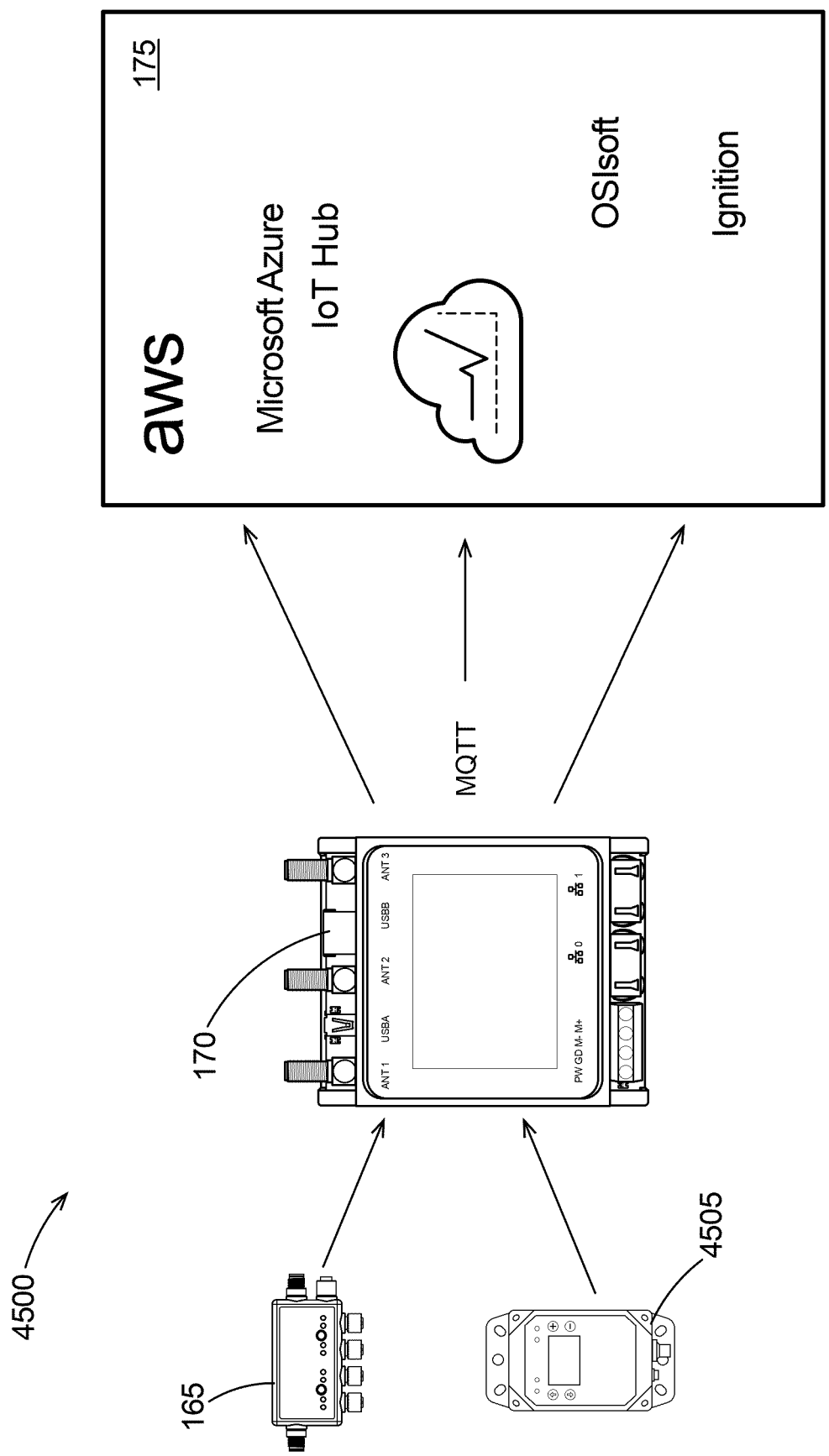
FIG. 45 depicts the exemplary remote communication hub in an illustrative use-case scenario in an exemplary distributed communication and control system.

FIG. 45 depicts the exemplary remote communication hub in an illustrative use-case scenario of an exemplary distributed communication and control system 4500. As shown, the system 4500 includes a control hub 165 and a compatible edge device 4505. The remote communication gateway remote communication gateway 170 receives data from the control hub 165 and the compatible edge device 4505 and transmits the data to various cloud services. For example, the cloud services may include Amazon Web Service provided by Amazon Web Services, Inc. located in Seattle, Washington. For example, the cloud services may include Microsoft Azure IoT Hub provided by Microsoft Corp. located in Redmond, Washington. For example, the cloud services may include OSI Soft PI System provided by OSISoft LLC located in San Leandro, California. For example, the cloud services may include Ignition provided by Inductive Automation located in Folsom, California.

Figure 46:
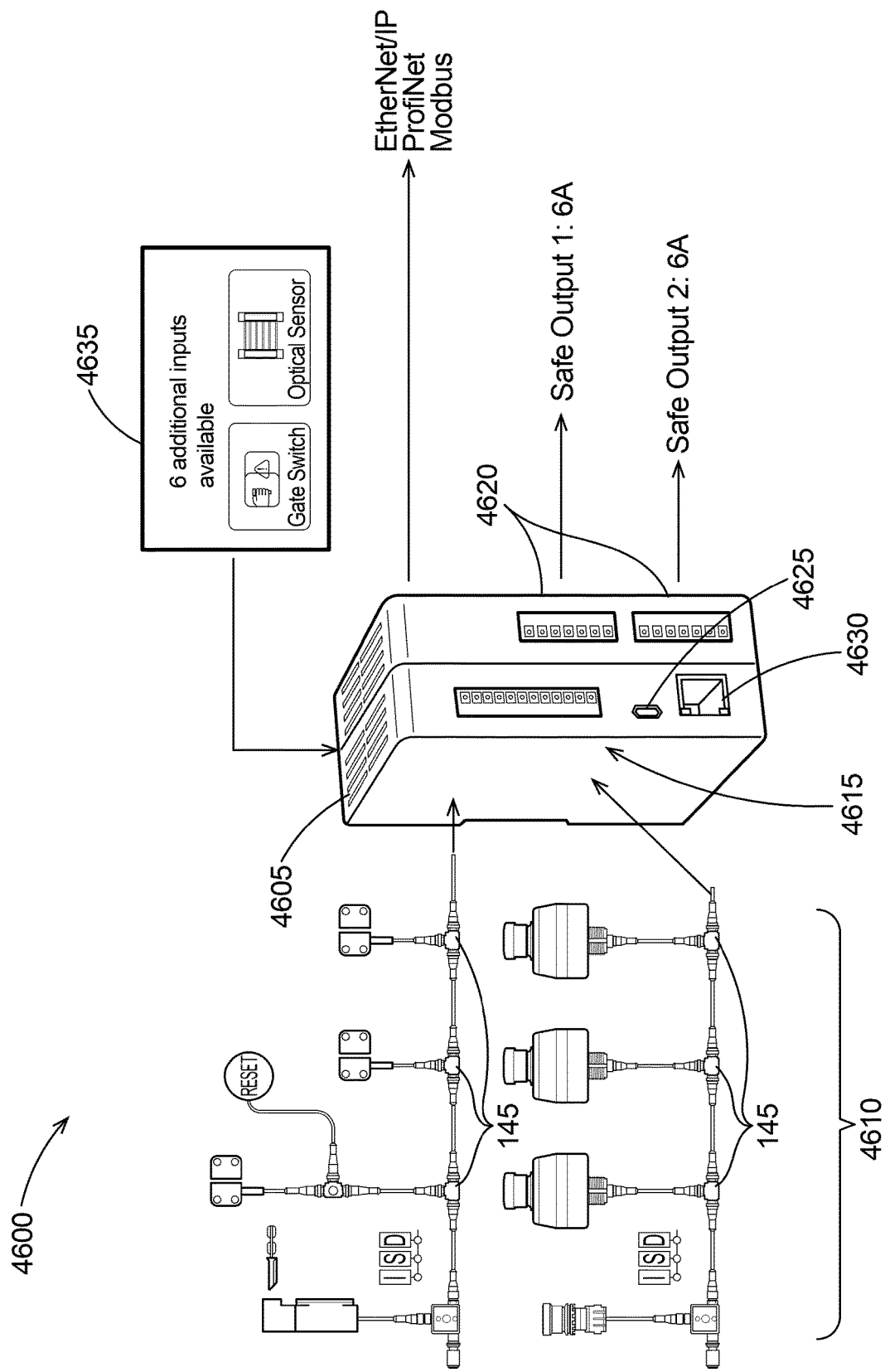
FIG. 46 depicts an exemplary configurable, multi-output safety controller in an illustrative use-case scenario in an exemplary distributed communication and control system.

FIG. 46 depicts an exemplary configurable, multi-output safety controller in an illustrative use-case scenario in an exemplary distributed communication and control system. In an illustrative scenario, a system 4600 may, for example, include multiple edge devices 4610. A safety controller 4605 may, for example, be connected to the multiple edge devices 4610 using the in-line converters 145. For example, the safety controller 4605 may be advantageously configured to provide in-series diagnostics. The safety controller 4605 may, for example, be configured to connect to up to 68 inputs 4615. The safety controller 4605 is configured with two independent in-series diagnostic outputs 4620. For example, the two independent in-series diagnostic outputs 4620 (e.g., chained outputs) may independently shut down hazardous floor areas based on inputs 4615. For example, 32 inputs may be associated per chain in any combination. In the depicted example, 6 terminals 4635 remain for up to 4 other devices. As depicted, the safety controller 4605 may communicate with a USB device via a port 4625. The safety controller 4605 may communicate with a network (e.g., Ethernet/IP, ProfiNet, Modbus TCP/IP) via an RJ45 port 4630.

Although various embodiments have been described with reference to the figures, other embodiments are possible.

Although an exemplary system has been described with reference to the figures, other implementations may be deployed in other industrial, scientific, medical, commercial, and/or residential applications.

In various embodiments, Modbus may advantageously provide a robust communication network. For example, Modbus (using differential signaling) may support communication distances of up to 1200 meters. Systems communication via Modbus may, for example, advantageously provide reliable communication over long distances.

Various embodiments are depicted and/or described with reference to one or more illustrative existing signal types and/or communication standards (e.g., Modbus, IO-Link, Ethernet, Profinet®, SCADA, discrete, analog). A person of ordinary skill in the art will appreciate that these communication standards are exemplary embodiments, and that other signal types and/or communication standards are within the scope of the embodiments disclosed herein. For example, a converter and/or other communication device may have more, less, and/or different signal and/or communication standards options than depicted in a given illustration. In some implementations, for example, a converter and/or other communication device may be dynamically configured (e.g., via hardware, programmatically, remotely) to add, remove, and/or change available signal and/or communication standards options.

Various embodiments may, for example, advantageously reduce cabling. For example, local hubs and/or controllers (e.g., communication hub 155, dual-port communication hub 156, control hub 165) may reduce a number of cables required to be provided to upstream controller(s). Various embodiments may advantageously reduce breakage risk from multiple cables. Various embodiments may, for example, advantageously reduce weight from cables, such as, for example, on buildings, machines, support structures, or some combination thereof.

Various embodiments may, for example, overmold electronics (e.g., one or more circuits). Such embodiments may, for example, totally encapsulate electronic component(s). Overmolding may, for example, bond a body (housing) material to electrical connectors (e.g., and associated connections). Various embodiments may, for example, advantageously provide a slim overmolded design.

Overmolding may, for example, advantageously decrease a size of a housing. Overmolding may, for example, advantageously decrease assembly costs.

In some embodiments (e.g., overmolded embodiments) a device (e.g., in-line converters 145, communication hub 155, dual-port communication hub 156, control hub 165) may be configured to withstand external pressure and/or moisture. For example, some such devices may be configured to withstand washdown. The body may, for example, be configured to withstand ingress of water even when completely submerged. For example, the body may withstand water ingress of water when submerged in 1 meter of water for up to 30 minutes. As such, the body may, for example, obtain a rating of IP67 for use in applications requiring water submersion (e.g., washdown).

Various embodiments (e.g., overmolded) may, for example, be configured to withstand pressure up to about 1100 pounds per square inch (psi). Some embodiments may, for example, be configured to resist ingress of high temperature (e.g., steam), high pressure cleaning such as 80-degree Celsius water sprayed at approximately 1160-1450 psi, for example. The body may resist ingress of water at a flow rate up to 16 liters per minute. As such, the body may, for example, obtain a rating of IP69K for use in applications requiring high-pressure, high temperature washdown to sanitize equipment.

In some overmolded embodiments, electrical components (e.g., component arrays) may be underfilled. For example, material may be deposited (e.g., injected) under the component(s) prior to overmolding. Such embodiments may, for example, advantageously prevent components from breaking during overmolding (e.g., under pressure).

For example, in some embodiments a body configured to resist water and/or dust ingress (e.g., overmolded body) may advantageously simplify installation in various locations. For example, such embodiments may advantageously reduce or eliminate a need for a protective enclosure (e.g., a control cabinet).

In some embodiments, overmolding may be performed in a multi-shot process. For example, a first shot may at least partially encapsulate the circuit(s) in a first polymeric material. A second shot may, for example, at least partially encapsulate the first polymeric material with a second polymeric material.

In some embodiments the first polymeric material may be optically clear. In some embodiments the second polymeric material may be partially translucent. The second polymeric material may, for example, be black. In some embodiments the second polymeric material may, for example, be substantially optically clear. In some embodiments, various color and/or optical translucence combinations may be used (e.g., to achieve a desired aesthetic and/or indication(s) visibility effects).

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, an offset bracket (e.g., 3015) may include a first set of coupling elements (e.g., 3105) distributed along a first mounting plate in a longitudinal axis. The offset bracket may include a second set of coupling elements (e.g., 3110) distributed along a second mounting plate in a direction parallel to the longitudinal axis. The second mounting plate may be located at a predetermined lateral offset distance from the first mounting plate along a lateral axis orthogonal to the longitudinal axis. The first set of coupling elements and the second set of coupling elements may be configured such that, when the first mounting plate releasably couples to a first communication hub and the second mounting plate releasably couples to a second communication hub, the first communication hub and the second communication hub are fixedly held at respective horizontal planes that are substantially parallel, and the first communication hub is offset from the second communication hub in at least two directions. In a first direction, the respective horizontal planes may be offset along a vertical axis by a predetermined first offset distance. In a second direction, the first communication hub and the second communication hub may be offset by a predetermined second offset distance. The first direction may be orthogonal to the second direction, such that connection status of multiple connection ports on an edge surface of the first communication hub and the second communication hub are visible in at least one viewing angle along the vertical axis.

The offset bracket may include the first communication configured such that, when a second offset bracket releasably couples a third communication hub to the first communication hub, the first communication hub and the third communication hub are offset in a third direction. In the third direction, the first communication hub and the third communication hub may be offset by the predetermined second offset distance.

Each of the first set of coupling elements may include a threaded insert such that a lead-in passage for a fastener is provided.

The second set of coupling elements may include through holes.

At least one of the first set of coupling elements and the second set of the coupling element may include a press-in insert.

The offset bracket may include the first communication hub. The first communication hub may include a top face extending on a plane intersecting the edge surface. The top face may include at least one visual indicium configured to indicate the connection status of the multiple connection ports. The at least one visual indicium may include an LED status indicator. The at least one visual indicium may include a liquid-crystal display.

The offset bracket may include the first communication hub and the second communication hub. The multiple connections port may include a configurable Modbus port.

The offset bracket may include the first communication hub and the second communication hub. The multiple connections port may be distributed evenly the edge surface. A distance between adjacent connection ports may be twice the predetermined second offset distance.

In an illustrative aspect, a stackable communication hub (e.g., 155, 156, 165) may include a first communication hub (e.g., 155, 156, 165) extending in a first direction in a horizontal plane. The hub may include at least one peripheral surface (e.g., 3030) which may include multiple connection ports (e.g., 3415) on the at least one peripheral surface. The at least one peripheral surface may extend in a direction intersecting the horizontal plane. The hub may include at least one surface (e.g., 3025) having at least one coupling element (e.g., 3020) configured to releasably couple to an offset bracket (e.g., 3015). When the offset bracket couples the first communication hub and a second communication hub together, the first communication hub and the second communication hub may be fixedly held at respective horizontal planes that are substantially parallel. The first communication hub may be offset from the second communication hub in at least two directions. In a first direction, the respective horizontal planes may be offset along a vertical axis by a predetermined first offset distance. In a second direction, the first communication hub and the second communication hub may be offset by a predetermined second offset distance. The first direction may be orthogonal to the second direction, such that connection status of the multiple connection ports may be visible in at least one viewing angle along the vertical axis.

The least one surface may include a top face extending on a plane intersecting the at least one peripheral surface. The top face may include at least one visual indicium configured to indicate the connection status of the multiple connection port. The at least one visual indicium may include an LED status indicator. The at least one visual indicium may include a liquid-crystal display.

The multiple connection port may include a configurable communication port. The configurable communication port may be selectively configurable into at least one of: a master port, a slave port, and a pass through port.

The multiple connection ports may be distributed evenly. A distance between adjacent connection ports may be twice the predetermined second offset distance.

When a second offset bracket releasably couples a third communication hub to the first communication hub, the first communication hub and the third communication hub may be offset in a third direction. In the third direction, the first communication hub and the third communication hub may be offset by the predetermined second offset distance.

The stackable communication hub may include the offset bracket. The offset bracket may include a first mounting plate extending along a longitudinal axis. The first mounting may include a first set of coupling elements. The offset bracket may include a second mounting plate extending parallel to the longitudinal axis. The second mounting plate may include a second set of coupling elements. The first communication hub and the second communication hub may be offset by a third predetermined offset distance in a fourth direction orthogonal to the first direction and the second direction. The first set of coupling elements of the offset bracket may include a threaded insert such that a lead-in passage for a fastener is provided. The second set of coupling elements of the offset bracket may include through holes. The first set of coupling elements of the offset bracket may include press-in inserts.

A dynamically reconfigurable communication hub may include multiple independent reconfigurable connection ports (IRCP) (e.g., 1920, 1925, 1930, 1935). The hub may include a data store (e.g., 1915). The data store may include a program of instruction (e.g., 1918) configured to reconfigure the multiple IRCPs. The data store may include multiple configuration profiles (e.g., 1917). The configuration profiles may each be associated with a corresponding IRCP among the multiple IRCPs. The hub may include a processor (e.g., 1910) operably coupled to the data store such that, when the processor executes the program of instructions, the processor is configured to perform automatic reconfiguration operations to configure the multiple IRCPs independently. The operations may include receive, from a connected device, a reconfiguration signal at at least one of the multiple IRCPs. The operations may include determine a selected IRCP to be reconfigured. The operations may include retrieve, from the data store, a first predetermined set of rules (e.g., 1835) for identifying a communication profile of the selected IRCP based on the reconfiguration signal. The communication profile may include an operation mode and a communication protocol (e.g., 1825). The operations may include identify a communication profile of the selected IRCP based on the first predetermined set of rules. The operations may include associate the identified communication profile with the selected IRCP based on a second predetermined set of rules (e.g., 1840), such that user intervention in configuring the multiple reconfigurable connection ports may, for example, be unnecessary. The operations may include update, in the data store, the configuration profile associated with the selected IRCP.

The operation mode may include a master mode, a slave mode, and a pass-through mode.

The connection device may include an edge device operably coupled to the selected IRCP. The operations may include automatically associate a preconfigured virtual address to a device address of the edge device such that, the edge device is referenced by the preconfigured virtual address.

The communication profile may include a Modbus TCP protocol. The communication profile may include a ProfiNet® protocol. The communication profile may include an MQTT protocol. The communication profile may include a TCP/IP protocol.

After receiving the reconfiguration signal, the operations may include interrupt a script thread executing at the processor and induce operation at an interrupt thread.

The connected device may include a master controller device. The operations may include configure the selected IRCP as a master port.

The connected device may be connected to an edge device through an in-line converter configured to convert non-compatible signal from the edge device to a signal compatible to the dynamically reconfigurable communication hub.

In an illustrative aspect, a computer-implemented method (e.g., 2600) may be performed by at least one processor to automatically and independently configure an independent reconfigurable connection port (IRCP). The method may include receive a reconfiguration signal at the IRCP (e.g., 2605). The method may include retrieve, from a first data store, a first predetermined set of rules for identifying a communication profile of the IRCP based on the reconfiguration signal. The communication profile may include an operation mode and a communication protocol (e.g., 2610). The method may include identify an operation mode of the IRCP based on the first predetermined set of rules (e.g., 2615). The operation mode may include at least one of: a master port, a slave port, and a pass-through port based on the first predetermined set of rules. The method may include identify the communication protocol with the IRCP based on a second predetermined set of rules (e.g., 2620). The method may include generate a configuration profile based on the operation mode and the protocol profile (e.g., 2625). The method may include store, in a second data store, an association between the configuration profile and the IRCP.

The operation mode may include a master mode, a slave mode, and a pass-through mode.

The reconfigurable signal may be received from an edge device operably coupled to the IRCP. The method may include automatically associate a preconfigured virtual address to a device address of the edge device such that the edge device is referenced by the preconfigured virtual address. The method may include update the configuration profile associated with the IRCP with the association between the preconfigured virtual address and the device address.

The reconfigurable signal may be received from a master controller device. The method may include configure the IRCP to a master port.

The communication profile may include a Modbus TCP protocol. The communication profile may include a ProfiNet® protocol. The communication profile may include an MQTT protocol. The communication profile may include a TCP/IP protocol.

In an illustrative aspect, a distributed communication and control system (e.g., 100) may include at least one edge device (e.g., 105). The system may include a first dynamically reconfigurable communication hub (e.g., 155). The hub may include multiple independent reconfigurable connection ports (IRCPs) (e.g., 1920, 1925, 1930, 1935). The hub may be operably coupled to the at least one edge device. The dynamically reconfigurable communication hub may be configured to perform automatic reconfiguration operations to independently configure each of the multiple IRCPs. The operations may include receive, from one of the at least one edge device, a communication signal at one of the multiple IRCPs. The operations may include determine a selected IRCP to be reconfigured. The operations may include retrieve, from a first data store, a first predetermined set of rules (e.g., 1835) for identifying a communication profile (e.g., 1917) of the selected IRCP based on the received communication signal and a second set of rules (e.g., 1840) for associating the communication profile with the selected IRCP. The communication profile may include an operation mode and a communication protocol (e.g., 1825). The operations may include identify the communication profile of the selected IRCP based on the first predetermined set of rules. The operations may include associate the communication profile with the selected IRCP based on a second predetermined set of rules (e.g., 1840) such that, for example, user intervention in configuring the multiple IRCPs may be unnecessary. The operations may include update, in the data store, the association in a configuration profile associated with the IRCP.

The operations may include automatically associate a preconfigured virtual address to a device address of the at least one edge device such that, the at least one edge device is referenced by the preconfigured virtual address.

The system may include a second dynamically reconfigurable communication hub. The first dynamically reconfigurable communication hub and the second dynamically reconfigurable communication hub may be operably coupled via a control network. The control network may include a Modbus network.

The system may include an in-line converter serially coupled to the edge device and the first dynamically reconfigurable communication hub. The at least one edge device may include a non-compatible device configured to generate a non-compatible signal. The in-line converter may be configured to convert the non-compatible signal to a compatible signal for the first dynamically reconfigurable communication hub.

The non-compatible signal may include an analog signal. The non-compatible signal may include a discrete signal. The non-compatible signal may include an IO-Link signal.

The at least one edge device may include an indicator device. The at least one edge device may include an actuator. The at least one edge device may include a motor. The at least one edge device may include an IO-Link sensor. The at least one edge device may include an IO-Link input device. The at least one edge device may include a robotic device. The at least one edge device may include a sensor.

The first dynamically reconfigurable communication hub may be connected to a remote computer device via a communication network. Configuration signals may be received from the remote computer device via the communication network.

In an illustrative aspect, a communication hub may include multiple independently reconfigurable connection ports (IRCPs) (e.g., 1920, 1925, 1930, 1935) configurable into at least one of: a master port, a slave port, and a pass-through port. The hub may include a memory module (e.g., 1915). The memory module may include at least an interrupt program of instructions (e.g., 1911) and a scripted program of instructions (e.g., 1912). The hub may include a processor (e.g., 1910) operably coupled to the memory module configured to execute the interrupt program of instruction and the scripted program of instructions. The hub may include a shared data register (e.g., 1916) configured to be accessible via the processor. The hub may include a data store storing multiple configuration profiles (e.g., 1917). When the interrupt program of instructions and the scripted program of instructions are executed, one of the multiple configuration profiles may be identified and applied such that, upon receiving an input signal originated from a connected device coupled to one of the multiple IRCPs, based on the applied configuration profile, the processor executes: (a) the interrupt program of instructions to perform at least one of: store data corresponding to the input signal in the shared data register, and configure the multiple IRCP, and, (b) the scripted program of instructions to identify a shared data register associated with the input signal, and to generate output signals at one or more of the multiple IRCPs based on a data stored in the shared data register.

The multiple IRCPs may each be configurable to operably couple to a Modbus network. The multiple IRCPs may be each configurable to operably couple to an IO-Link network.

The shared data register may be configurable to be globally accessible via the multiple IRCPs and the processor. The shared data register may be configured to store 16-bit data. The shared data register may be configured to store 32-bit data.

The memory module may include multiple protocol profiles each corresponding to an IRCP of the multiple IRCPs. Each protocol profile may include, for the corresponding IRCP, rules and operations to be performed by the interrupt program of instructions and the scripted program of instructions.

The connected device may include a non-compatible device configured to generate a non-compatible signal. The communication hub may be serially connected to the non-compatible device through an in-line converter. The in-line converter may be configured to convert the non-compatible signal to a compatible signal with at least one of the multiple configuration profiles.

The non-compatible may include an analog signal. The non-compatible may include a discrete signal.

The compatible signal may include an IO-Link signal.

The connected device may include an indicator device. The connected device may include an actuator. The connected device may include a motor. The connected device may include an IO-Link sensor. The connected device may include an IO-Link input device. The connected device may include a robotic device. The connected device may include a sensor.

In an illustrative aspect, a computer-implemented method (e.g., 2500) may be performed by at least one processor to process communication signals at independently reconfigurable connection ports (IRCPs). The method may include receive an input signal from a connected device at one of the IRCPs (e.g., 2505). The method may include, based on a configuration profile associated with the IRCP receiving the input signal, identify a next operation (e.g., 2515). The method may include, upon determining the next operation is a write operation (e.g., 2530), then store data corresponding to the input signal in a shared data register (e.g., 2535). The method may include, upon determining the next operation is a configuration operation (e.g., 2555), then reconfigure the IRCP based on a predetermined set of rules. The method may include, upon determining the next operation is a read operation (e.g., 2540), then identify a shared data register associated with the input signal (e.g., 2545). The method may include generate an output signal in at least one of the IRCPs based on a data stored in the shared data register (e.g., 2550).

Store data corresponding to the input signal in a shared data register may include identify a device address as a function of the input signal. The device address may be an identification of an edge device transmitting the input signal. Store data corresponding to the input signal in a shared data register may include determine a virtual address of the share data register based on the IRCP corresponding to the input signal. Store data corresponding to the input signal in a shared data register may include store data corresponding to the input signal into the shared data register at the virtual address.

The configuration operations may include retrieve, from a first data store, a first predetermined set of rules for identifying a communication profile of the IRCP based on the input signal and a second set of predetermined rules for associating the communication profile with the IRCP. The communication profile may include an operation mode and a communication protocol. The configuration operations may include identify the communication profile of a corresponding IRCP based on the first predetermined set of rules. The configuration operations may include associate the identified operation mode and communication protocol with the IRCP based on the second predetermined set of rules.

The input signal may be received via a Modbus network. The input signal may be received via a The input signal may be received via a an IO-Link network. The input signal may be received via a Profinet® network. The input signal may be received via an Ethernet network.

The connected device may include an indicating device. The connected device may include an actuator. The connected device may include a motor. The connected device may include an IO-Link sensor. The connected device may include an IO-Link input device. The connected device may include a robotic device. The connected device may include a sensor.

In an illustrative aspect, a distributed communication and control system (e.g., 100) may include at least one edge device (e.g., 105). The system may include a first dynamically reconfigurable communication hub (e.g., 155). The hub may include multiple independently reconfigurable connection ports (IRCPs) (e.g., 1920, 1925, 1930, 1935) configured to be configurable into at least one of: a master port, a slave port, and a pass-through port. The hub may include a memory module (e.g., 1915) including at least an interrupt program of instructions (e.g., 1911) and a scripted program of instructions (e.g., 1912). The hub may include a processor (e.g., 1910) operably coupled to the memory module and configured to execute the interrupt program of instructions and the scripted program of instructions. The hub may include a shared data register (e.g., 1916) configured to be accessible via the processor. The hub may include a data store storing multiple configuration profiles (e.g., 1917) such that, when the interrupt program of instructions and the scripted program of instructions are executed, at least one of the multiple configuration profiles is identified and applied such that, upon receiving an input signal from one of the multiple IRCPs, based on the applied configuration profile, the processor executes: (a) the interrupt program of instructions to perform at least one of: store data corresponding to the input signal in the shared data register, and configure the multiple IRCPs, and, (b) the scripted program of instructions to identify a shared data register associated with the input signal, and to generate output signals at one or more of the multiple IRCPs based on a data stored in the shared data register.

The operations may include automatically associate a preconfigured virtual address to a device address of the at least one edge device such that the at least one edge device is referenced by the preconfigured virtual address.

The system may include a second dynamically reconfigurable communication hub. The first dynamically reconfigurable communication hub and the second dynamically reconfigurable communication hub may be operably coupled via a control network.

The system may include an in-line converter serially coupled to the edge device and the first dynamically reconfigurable communication hub. The at least one edge device may include a non-compatible device configured to generate a non-compatible signal. The in-line converter may be configured to convert the non-compatible signal to a compatible signal.

The non-compatible signal may include an analog signal. The non-compatible signal may include a discrete signal. The compatible signal may include an IO-Link signal.

The at least one edge device may include an indicating device. The at least one edge device may include an actuator. The at least one edge device may include a motor. The at least one edge device may include an IO-Link sensor. The at least one edge device may include an IO-Link input device. The at least one edge device may include a robotic device. The at least one edge device may include a sensor.

The first dynamically reconfigurable communication hub may be connected to a remote computer device via a communication network. Configuration signals may be received from the remote computer device via the communication network.

The first dynamically reconfigurable communication hub may be connected to a remote computer device via a communication network. Configuration signals may be received from the remote computer device via the communication network.

In an illustrative aspect, an in-line signal processing device (e.g., 605) may include a housing (e.g., 635). The in-line signal processing device may include an input port (e.g., 625a) coupled to a first surface of the housing. The in-line signal processing device may include an output port (e.g., 625b) coupled to a second surface of the housing. The in-line signal processing device may include an electronic circuit coupled to the input port and the output port. The electronic circuit may include a data register (e.g., 615). The electronic circuit may include a processing circuit (e.g., 610) configured to generate a signal based on a predetermined conversion. The housing may be overmolded to encapsulate the electronic circuit entirely in one-piece such that a total thickness of the in-line signal processing device is less than a predetermined multiple of a maximum dimension of the input port and the output port, and the in-line signal processing device is dust tight.

The in-line signal processing device may include a light emitting circuit. The light emitting circuit may include at least one status indicator. The housing may include a transparent upper portion.

The in-line signal processing device may include a sensing circuit.

The predetermined conversion may be configured based on a parameter set in the data register. The predetermined conversion may include a conversion between an IO-Link and a Modbus protocol. The predetermined conversion may include a conversion between a pulse width modulation signal and a Modbus protocol. The predetermined conversion may include a conversion between an analog sensor signal and a Modbus protocol.

The input port may be configured to couple to a second in-line signal processing device in a pass-through mode such that the input port directly receives a signal transmitted from an edge device coupled to the second in-line signal processing device.

The predetermined multiple may be a maximum of 1.5.

In an illustrative aspect, a method for producing a compact in-line converter (e.g., 650) may include provide an in-line converter circuit (e.g., 655). The method may include underfill arrays of the in-line converter circuit (e.g., 660). The method may include mold a first polymeric material to directly around the in-line converter circuit to form a body. The first polymeric material may include a first optical transparency (e.g., 665). The method may include mold a second polymeric material around at least some of the first polymeric material. The second polymeric material may include a second optical transparency less than the first transparency (e.g., 670). The first polymeric material may encapsulate entirely the in-line converter circuit such that the compact in-line converter is dust tight.

In an illustrative aspect, an in-line thermistor may include an internal temperature sensing circuit (e.g., 1300). The in-line thermistor may include an analog-to-digital converter (ADC) (e.g., 1315) coupled to the internal temperature sensing circuit. The in-line thermistor may include an output port (e.g., 1425) configured to transmit digital signals corresponding to a measured temperature in a predetermined protocol. The in-line thermistor may include an overmolded housing (e.g., 1405) around the internal temperature sensing circuit and the ADC, such that a total thickness of the internal temperature sensing circuit is less than a predetermined multiple of a maximum dimension of the output port, and the in-line thermistor is dust tight. At each measurement cycle, the internal temperature sensing circuit may be configured to dynamically self-calibrate based on an ADC count generated as a function of a reference voltage, an input voltage, and a ground voltage of the internal temperature sensing circuit, such that an external reference voltage is not required for at least one calibration mode.

The predetermined multiple may be a maximum of 1.5.

The predetermined protocol may include Modbus. The predetermined protocol may include IO-Link.

The in-line thermistor may include a sensor shield threadedly coupled to the overmolded housing.

Various illustrative product names and/or sources (e.g., cloud service providers) are disclosed herein. A person of ordinary skill in the art will appreciate that these sources and/or product names are exemplary embodiments that serve to illustrate specific examples, and that the scope of the claims is not limited by these sources and/or product names.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A dynamically reconfigurable communication hub comprising:
   a plurality of independent reconfigurable connection ports (IRCPs);
   a data store comprising:
      a program of instruction configured to reconfigure the plurality of IRCPs; and,
      a plurality of configuration profiles, each associated with a corresponding IRCP among the plurality of IRCPs; and,
   a processor operably coupled to the data store such that, when the processor executes the program of instructions, the processor is configured to perform automatic reconfiguration operations to configure the plurality of IRCPs independently, the operations comprising:
      receive, from a connected device, a reconfiguration signal at least one of the plurality of IRCPs;
      determine a selected IRCP to be reconfigured;
      retrieve, from the data store, a first predetermined set of rules for identifying a communication profile of the selected IRCP based on the reconfiguration signal, wherein the communication profile comprises an operation mode and a communication protocol, wherein the operation mode comprises a master mode, a slave mode, and a pass-through mode;
      identify the communication profile of the selected IRCP based on the first predetermined set of rules;
      associate the identified communication profile with the selected IRCP based on a second predetermined set of rules configured to independently associate the identified communication profile with one of the plurality of IRCPs, such that user intervention in configuring the plurality of reconfigurable connection ports is unnecessary; and,
      update, in the data store, the configuration profile associated with the selected IRCP.

2. The dynamically reconfigurable communication hub of claim 1, wherein the connected device comprises an edge device operably coupled to the selected IRCP, and the operations further comprise:
   automatically associate a preconfigured virtual address to a device address of the edge device such that, the edge device is referenced by the preconfigured virtual address.

3. The dynamically reconfigurable communication hub of claim 1, wherein the communication profile comprises a Modbus TCP protocol, a ProfiNet® protocol, a MQTT protocol, and/or a TCP/IP protocol.

4. The dynamically reconfigurable communication hub of claim 1, wherein, after receiving the reconfiguration signal, the operations further comprising:
   interrupt a script thread executing at the processor and induce operation at an interrupt thread.

5. The dynamically reconfigurable communication hub of claim 1, wherein the connected device comprises a master controller device, and the operation further comprises configure the selected IRCP as a master port.

6. The dynamically reconfigurable communication hub of claim 1, wherein the connected device is connected to an edge device through an in-line converter configured to convert non-compatible signal from the edge device to a signal compatible to the dynamically reconfigurable communication hub.

7. The dynamically reconfigurable communication hub of claim 1, wherein, when the selected IRCP is configured in the master mode, the selected IRCP is configured to initiate operations in the connected device.

8. The dynamically reconfigurable communication hub of claim 7, wherein initiate operations in the connected device comprise initiate read operations in the connected device.

9. The dynamically reconfigurable communication hub of claim 7, wherein initiate operations in the connected device comprise initiate write operations in the connected device.

10. A computer-implemented method performed by at least one processor to automatically and independently configure an independent reconfigurable connection port (IRCP), the method comprising:
   receive a reconfiguration signal at the IRCP;
   retrieve, from a first data store, a first predetermined set of rules for identifying a communication profile of the IRCP based on the reconfiguration input signal, wherein the communication profile comprises an operation mode and a communication protocol, wherein the operation mode comprises a master mode, a slave mode, and a pass-through mode;
   identify an operation mode of the IRCP based on the first predetermined set of rules, wherein the operation mode comprises at least one of: a master port, a slave port, and a pass-through port based on the first predetermined set of rules;
   identify the communication protocol with the IRCP based on a second predetermined set of rules;

generate a configuration profile based on the operation mode and the protocol profile; and,
store, in a second data store, an association between the configuration profile and the IRCP.

11. The computer-implemented method of claim 10, wherein the reconfigurable signal is received from an edge device operably coupled to the IRCP, the method further comprising:
automatically associate a preconfigured virtual address to a device address of the edge device such that the edge device is referenced by the preconfigured virtual address; and,
update the configuration profile associated with the IRCP with the association between the preconfigured virtual address and the device address.

12. The computer-implemented method of claim 10, wherein the reconfigurable signal is received from a master controller device, and the method further comprises configure the IRCP to a master port.

13. The computer-implemented method of claim 10, wherein the communication profile comprises a Modbus TCP protocol, a ProfiNet® protocol, a MQTT protocol, and/or a TCP/IP protocol.

14. A distributed communication and control system, comprising:
at least one edge device; and,
a first dynamically reconfigurable communication hub comprising a plurality of independent reconfigurable connection ports (IRCPs) and operably coupled to the at least one edge device, wherein the dynamically reconfigurable communication hub is configured to perform automatic reconfiguration operations to independently configure each of the plurality of IRCPs, the operations comprising:
receive, from one of the at least one edge device, a communication signal at one of the plurality of IRCPs;
determine a selected IRCP to be reconfigured;
retrieve, from a first data store, a first predetermined set of rules for identifying a communication profile of the selected IRCP based on the received communication signal and a second set of rules for associating the communication profile with the selected IRCP, wherein the communication profile comprises an operation mode and a communication protocol;
identify the communication profile of the selected IRCP based on the first predetermined set of rules;
associate the communication profile with the selected IRCP based on a second predetermined set of rules configured to independently associate the identified communication profile with one of the plurality of IRCPs such that user intervention in configuring the plurality of IRCPs is unnecessary;
update, in the data store, the association in a configuration profile associated with the IRCP; and,
automatically associate a preconfigured virtual address to a device address of the at least one edge device such that, the at least one edge device is referenced by the preconfigured virtual address.

15. The distributed communication and control system of claim 14, further comprising a second dynamically reconfigurable communication hub, wherein the first dynamically reconfigurable communication hub and the second dynamically reconfigurable communication hub are operably coupled via a control network.

16. The distributed communication and control system of claim 15, wherein the control network comprises a Modbus network.

17. The distributed communication and control system of claim 14, further comprising an in-line converter serially coupled to the edge device and the first dynamically reconfigurable communication hub,
wherein:
the at least one edge device comprises a non-compatible device configured to generate a non-compatible signal, and,
the in-line converter is configured to convert the non-compatible signal to a compatible signal for the first dynamically reconfigurable communication hub.

18. The distributed communication and control system of claim 17, wherein the non-compatible signal comprises an analog signal and/or a discrete signal.

19. The distributed communication and control system of claim 17, wherein the compatible signal comprises an IO-Link signal.

20. The distributed communication and control system of claim 14, wherein the at least one edge device comprises an indicator device, an actuator, a motor, an IO-Link sensor, an IO-Link input device, a robotic device, and/or a sensor.

21. The distributed communication and control system of claim 14, wherein the first dynamically reconfigurable communication hub is connected to a remote computer device via a communication network, wherein configuration signals are received from the remote computer device via the communication network.

22. A communication hub, comprising:
a plurality of independently reconfigurable connection ports (IRCPs), each of the plurality of IRCPs are reconfigurable into at least one of: a master port, a slave port, and a pass-through port;
a memory module comprising at least an interrupt program of instructions and a scripted program of instructions;
a processor operably coupled to the memory module configured to execute the interrupt program of instruction and the scripted program of instructions;
a shared data register configured to be accessible via the processor; and,
a data store storing a plurality of configuration profiles such that,
when the interrupt program of instructions and the scripted program of instructions are executed, one of the plurality of configuration profiles is identified and applied such that,
upon receiving an input signal originated from a connected device coupled to one of the plurality of IRCPs, based on the applied configuration profile, the processor executes:
(a) the interrupt program of instructions to perform dedicated logic comprising predetermined rules, wherein the dedicated logic comprises simultaneous and parallel operations at each of the plurality of, wherein the dedicated logic comprises store data corresponding to the input signal in the shared data register, and configure the plurality of IRCPs, and,
(b) the scripted program of instructions to identify a shared data register associated with the input signal, and to generate output signals at one or more of the plurality of IRCPs based on a data stored in the shared data register, such that simultaneous control operations at the plurality of IRCPs are provided.

23. The communication hub of claim 22, wherein the plurality of IRCPs is each configurable to operably couple to a Modbus network and/or an IO-Link network.

24. The communication hub of claim 22, wherein the shared data register is configurable to be globally accessible via the plurality of IRCPs and the processor.

25. The communication hub of claim 22, wherein the shared data register is configured to store 16-bit data and/or 32-bit data.

26. The communication hub of claim 22, wherein the memory module comprises a plurality of protocol profiles each corresponding to an IRCP of the plurality of IRCPs, wherein each protocol profile comprises, for the corresponding IRCP, rules and operations to be performed by the interrupt program of instructions and the scripted program of instructions.

27. The communication hub of claim 22, wherein:
the connected device comprises a non-compatible device configured to generate a non-compatible signal, and,
the communication hub is serially connected to the non-compatible device through an in-line converter, wherein the in-line converter is configured to convert the non-compatible signal to a compatible signal with at least one of the plurality of configuration profiles.

28. The communication hub of claim 27, wherein the non-compatible signal comprises an analog signal and/or discrete signal.

29. The communication hub of claim 27, wherein the compatible signal comprises an IO-Link signal.

30. The communication hub of claim 22, wherein the connected device comprises an indicator device, an actuator, a motor, an IO-Link sensor, an IO-Link input device, a robotic device, and/or a sensor.

31. The communication hub of claim 22, wherein each of the plurality of configuration profiles comprises a set of rules, when applied to one of the plurality of the IRCPs, induce the processor to access and process data in the shared data register and generate a signal at the applied IRCP.

32. The communication hub of claim 22, wherein the scripted program of instructions is configured to generate an induce signal to the processor, wherein, upon receiving the induce signal, the processor executes the interrupt program of instructions comprising:
identify a shared data register based on the induce signal;
retrieve data stored in the identified shared data register; and,
generate the output signals at one or more of the plurality of IRCPs based on the retrieved data.

33. The communication hub of claim 22, wherein configure the plurality of IRCPs comprises:
retrieve, from a first data store, a first predetermined set of rules for identifying a communication profile of the IRCP based on the input signal and a second set of predetermined rules for associating the communication profile with the IRCP, wherein the communication profile comprises an operation mode and a communication protocol,
identify the communication profile of a corresponding IRCP based on the first predetermined set of rules, and,
associate the identified operation mode and communication protocol with the IRCP based on the second predetermined set of rules.

34. The communication hub of claim 22, wherein the output signal is configured to be generated at one of the plurality of IRCPs coupled to a target device referenced by a preconfigured virtual address, wherein the scripted program of instruction comprises, upon a new connected device is coupled to one of the plurality of the IRCPs, automatically associate the preconfigured virtual address to a device address of the new connected device such that, the new connected device is referenced by the preconfigured virtual address.

35. A computer-implemented method performed by at least one processor to process communication signals at independently reconfigurable connection ports (IRCP), the method comprising:
receive an input signal from a connected device at one of the IRCPs;
based on a configuration profile associated with the IRCP receiving the input signal, identify a next operation;
upon determining the next operation is a write operation, then store data corresponding to the input signal in a shared data register;
upon determining the next operation is a configuration operation, then reconfigure the IRCP based on a predetermined set of rules, wherein the configuration operations comprise:
retrieve, from a first data store, a first predetermined set of rules for identifying a communication profile of the IRCP based on the input signal and a second set of predetermined rules for associating the communication profile with the IRCP, wherein the communication profile comprises an operation mode and a communication protocol;
identify the communication profile of a corresponding IRCP based on the first predetermined set of rules; and,
associate the identified operation mode and communication protocol with the IRCP based on the second predetermined set of rules; and,
upon determining the next operation is a read operation, then identify a shared data register associated with the input signal, and generate an output signal in at least one of the IRCPs based on a data stored in the shared data register.

36. The computer-implemented method of claim 35, wherein store data corresponding to the input signal in a shared data register comprises:
identify a device address as a function of the input signal, wherein the device address is an identification of an edge device transmitting the input signal;
determine a virtual address of the share data register based on the IRCP corresponding to the input signal, and,
store data corresponding to the input signal into the shared data register at the virtual address.

37. The computer-implemented method of claim 35, wherein the input signal is received via a Modbus network, an IO-Link network, a Profinet® network, and/or an Ethernet network.

38. The computer-implemented method of claim 35, wherein the connected device comprises an indicating device, an actuator, a motor, an IO-Link sensor, an IO-Link input device, a robotic device, and/or a sensor.

39. The computer-implemented method of claim 35, wherein the next operation is identified based on the configuration profile and rules defined in a rule based engine associated with the IRCP, wherein the rule based engine is user-configurable, such that edge processing of data received from the connected device is provided.

40. The computer-implemented method of claim 39, wherein the rule based engine is configured to cause the at least one processor to execute a predetermined program of a user-configurable user rule profile, wherein the user rule profile is configurable in a spreadsheet-style interface.

41. The computer-implemented method of claim 35, wherein the operation mode comprises a master mode, a slave mode, and a pass-through mode.

42. A distributed communication and control system, comprising:
- at least one edge device; and,
- a first dynamically reconfigurable communication hub comprising:
  - a plurality of independently reconfigurable connection ports (IRCPs) configured to be reconfigurable into at least one of: a master port, a slave port, and a pass-through port;
  - a memory module comprising at least an interrupt program of instructions and a scripted program of instructions;
  - a processor operably coupled to the memory module configured to execute the interrupt program of instructions and the scripted program of instructions;
- a shared data register configured to be accessible via the processor; and,
- a data store storing a plurality of configuration profiles such that,
  - when the interrupt program of instructions and the scripted program of instructions are executed, at least one of the plurality of configuration profiles is identified and applied such that,
  - upon receiving an input signal from one of the plurality of IRCPs, based on the applied configuration profile, the processor executes:
    - (a) the interrupt program of instructions to perform dedicated logic comprising predetermined rules, wherein the dedicated logic comprises simultaneous and parallel operations at each of the plurality of IRCPs, wherein the dedicated logic comprises store data corresponding to the input signal in the shared data register, and configure the plurality of IRCPs and,
    - (b) the scripted program of instructions to identify a shared data register associated with the input signal, and to generate output signals at one or more of the plurality of IRCPs based on a data stored in the shared data register, such that simultaneous control operations at the plurality of IRCPs are provided.

43. The distributed communication and control system of claim 42, wherein the operations further comprise: automatically associate a preconfigured virtual address to a device address of the at least one edge device such that the at least one edge device is referenced by the preconfigured virtual address.

44. The distributed communication and control system of claim 42, further comprising a second dynamically reconfigurable communication hub, wherein the first dynamically reconfigurable communication hub and the second dynamically reconfigurable communication hub are operably coupled via a control network.

45. The distributed communication and control system of claim 42, further comprising an in-line converter serially coupled to the edge device and the first dynamically reconfigurable communication hub,
wherein:
- the at least one edge device comprises a non-compatible device configured to generate a non-compatible signal, and,
- the in-line converter is configured to convert the non-compatible signal to a compatible signal.

46. The distributed communication and control system of claim 45, wherein the non-compatible signal comprises an analog signal and/or a discrete signal.

47. The distributed communication and control system of claim 45, wherein the compatible signal comprises an IO-Link signal.

48. The distributed communication and control system of claim 42, wherein the at least one edge device comprises an indicating device, an actuator, a motor, an IO-Link sensor, an IO-Link input device, a robotic device, and/or a sensor.

49. The distributed communication and control system of claim 42, wherein the first dynamically reconfigurable communication hub is connected to a remote computer device via a communication network, wherein configuration signals are received from the remote computer device via the communication network.

50. The distributed communication and control system of claim 42, wherein the first dynamically reconfigurable communication hub is connected to a remote computer device via a communication network, wherein configuration signals are received from the remote computer device via the communication network.

* * * * *